US012720491B2

(12) United States Patent
Esswie et al.

(10) Patent No.: US 12,720,491 B2
(45) Date of Patent: Aug. 25, 2026

(54) METHOD AND WIRELESS TRANSMIT/RECEIVE UNIT DIRECTED TO LOW-POWER PROXIMITY-BASED SERVICE PAGING FOR MULTI-CARRIER SIDE-LINK COMMUNICATIONS

(71) Applicant: InterDigital Patent Holdings, Inc., Wilmington, DE (US)

(72) Inventors: Ali Esswie, Montreal (CA); Hussain Elkotby, Conshohocken, PA (US); Ravikumar Pragada, Warrington, PA (US)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 345 days.

(21) Appl. No.: 18/289,716

(22) PCT Filed: May 6, 2022

(86) PCT No.: PCT/US2022/028102
§ 371 (c)(1),
(2) Date: Nov. 6, 2023

(87) PCT Pub. No.: WO2022/236074
PCT Pub. Date: Nov. 10, 2022

(65) Prior Publication Data

US 2024/0244581 A1 Jul. 18, 2024

Related U.S. Application Data

(60) Provisional application No. 63/239,993, filed on Sep. 2, 2021, provisional application No. 63/185,504, filed on May 7, 2021.

(51) Int. Cl.
*H04W 68/02* (2009.01)
*H04W 68/00* (2009.01)

(52) U.S. Cl.
CPC ......... *H04W 68/02* (2013.01); *H04W 68/005* (2013.01)

(58) Field of Classification Search
CPC ............................ H04W 68/00; H04W 68/005
(Continued)

(56) References Cited

U.S. PATENT DOCUMENTS

2017/0332359 A1* 11/2017 Tsai ...................... H04W 68/02
2020/0170075 A1* 5/2020 Xu ....................... H04B 7/2606

FOREIGN PATENT DOCUMENTS

EP 3499975 A1 6/2019
EP 3562212 A1 10/2019
(Continued)

OTHER PUBLICATIONS

Lien et al., "3GPP NR Sidelink Transmissions Toward 5G V2X", Institute of Electrical and Electronics Engineers (IEEE), IEEE Access, vol. 8, Feb. 13, 2020, 15 pages.
(Continued)

*Primary Examiner* — Qutbuddin Ghulamali
(74) *Attorney, Agent, or Firm* — VOLPE KOENIG

(57) ABSTRACT

Procedures, methods, architectures, apparatuses, systems, devices, and computer program products directed to low-power proximity-based service paging for multi-carrier side-link (SL) communications are described. A first wireless transmit and receive unit (WTRU) may receive, from a second WTRU a request message indicating a set of SL monitoring occasions to be monitored, wherein the set of SL monitoring occasions may be associated with a SL service. The first WTRU may receive one or more transmissions indicating whether the second WTRU is being paged for the SL service. On a condition that the second WTRU is being paged for the SL service, the first WTRU may receive one or more SL messages associated with the SL service and
(Continued)

directed to the second WTRU. The first WTRU may transmit to the second WTRU, SL paging information indicating availability of the received one or more SL messages.

20 Claims, 29 Drawing Sheets

(58) Field of Classification Search
USPC .......................................................... 455/458
See application file for complete search history.

(56) References Cited

FOREIGN PATENT DOCUMENTS

| | | | |
|---|---|---|---|
| WO | WO 2017196611 | A1 | 11/2017 |
| WO | WO 2018083381 | A1 | 5/2018 |

OTHER PUBLICATIONS

"3rd Generation Partnership Project; Technical Specification Group Radio Access Network; Overall description of Radio Access Network (RAN) aspects for Vehicle-to-everything (V2X) based on LTE and NR (Release 16)", 3GPP TR 37.985 V16.0.0, Jun. 2020, 35 pages.

Garcia et al., "A Tutorial on 5G NR V2X Communications", Institute of Electronics and Electrical Engineers (IEEE), IEEE Communications Surveys & Tutorials, vol. 23, Issue No. 3, Feb. 3, 2021, 55 pages.

Ganesan et al., "5G V2X Architecture and Radio Aspects", Institute of Electronics and Electrical Engineers (IEEE), 2019 IEEE Conference on Standards for Communications and Networking (CSCN), Granada, Spain, Oct. 28, 2019, 7 pages.

* cited by examiner

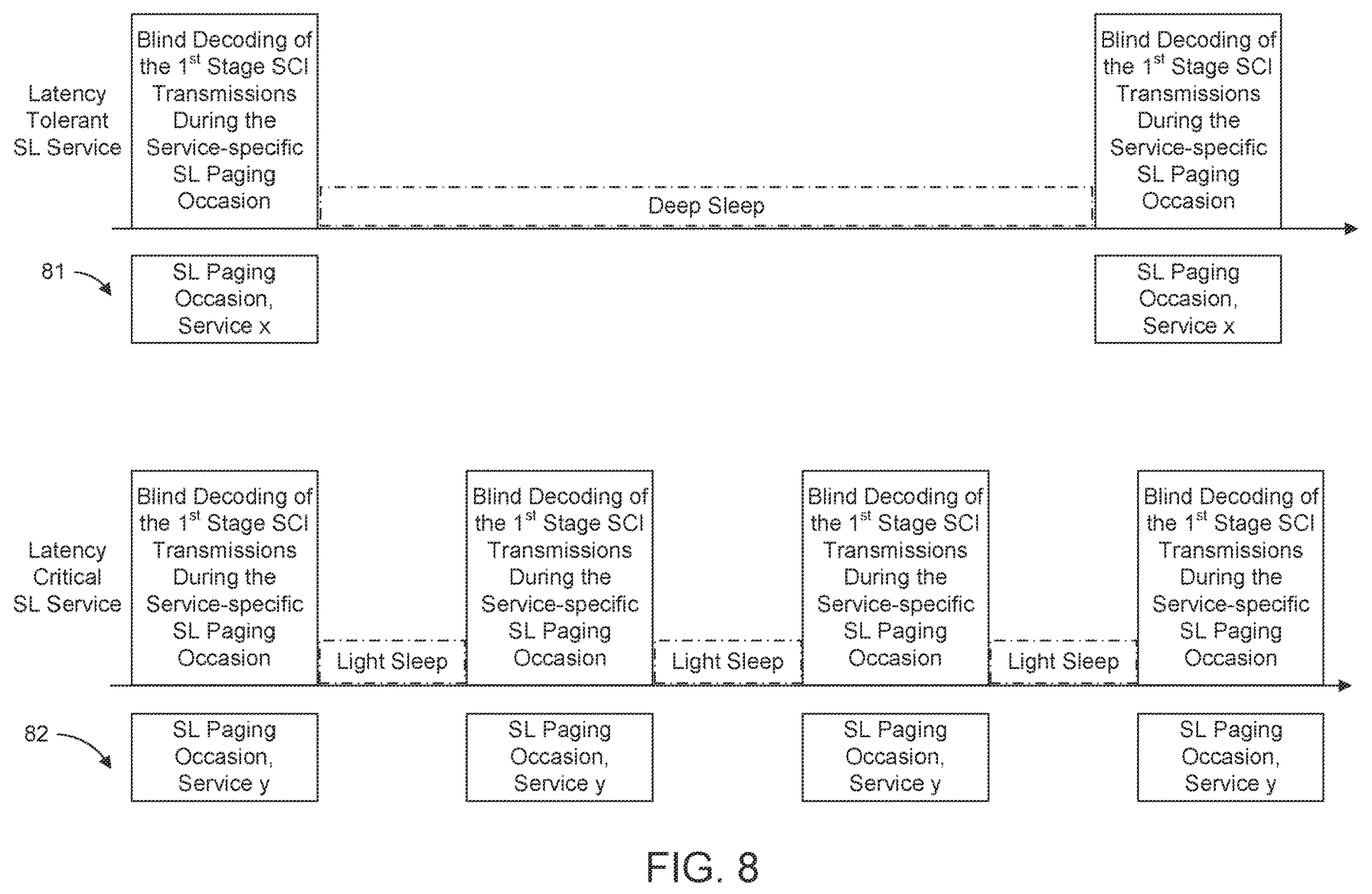

Latency Tolerant SL Service

Blind Decoding of the 1st Stage SCI Transmissions During the Service-specific SL Paging Occasion Deep Sleep Blind Decoding of the 1st Stage SCI Transmissions During the Service-specific SL Paging Occasion

81

SL Paging Occasion, Service x

SL Paging Occasion, Service x

Latency Critical SL Service

Blind Decoding of the 1st Stage SCI Transmissions During the Service-specific SL Paging Occasion Light Sleep Blind Decoding of the 1st Stage SCI Transmissions During the Service-specific SL Paging Occasion Light Sleep Blind Decoding of the 1st Stage SCI Transmissions During the Service-specific SL Paging Occasion Light Sleep Blind Decoding of the 1st Stage SCI Transmissions During the Service-specific SL Paging Occasion

82

SL Paging Occasion, Service y

SL Paging Occasion, Service y

SL Paging Occasion, Service y

SL Paging Occasion, Service y

FIG. 8

METHOD AND WIRELESS TRANSMIT/RECEIVE UNIT DIRECTED TO LOW-POWER PROXIMITY-BASED SERVICE PAGING FOR MULTI-CARRIER SIDE-LINK COMMUNICATIONS

CROSS-REFERENCE TO RELATED APPLICATIONS

This application is a U.S. National Stage Application under 35 U.S.C. 371 of International Patent Application No. PCT/US2022/028102, filed May 6, 2022, which claims the benefit of U.S. Patent Application Nos. 63/185,504, filed May 7, 2021; and 63/239,993, filed Sep. 2, 2021, each of which is incorporated herein by reference in its entirety.

TECHNICAL FIELD

The present disclosure is generally directed to the fields of communications, software and encoding, including, for example, to methods, architectures, apparatuses, systems directed to low-power proximity-based service (ProSe) paging for multi-carrier side-link communications.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref") in the FIGs. indicate like elements, and wherein:

FIG. 8 is a diagram illustrating an example of a SL service specific paging method;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

FIG. TA is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

Figure 1A:
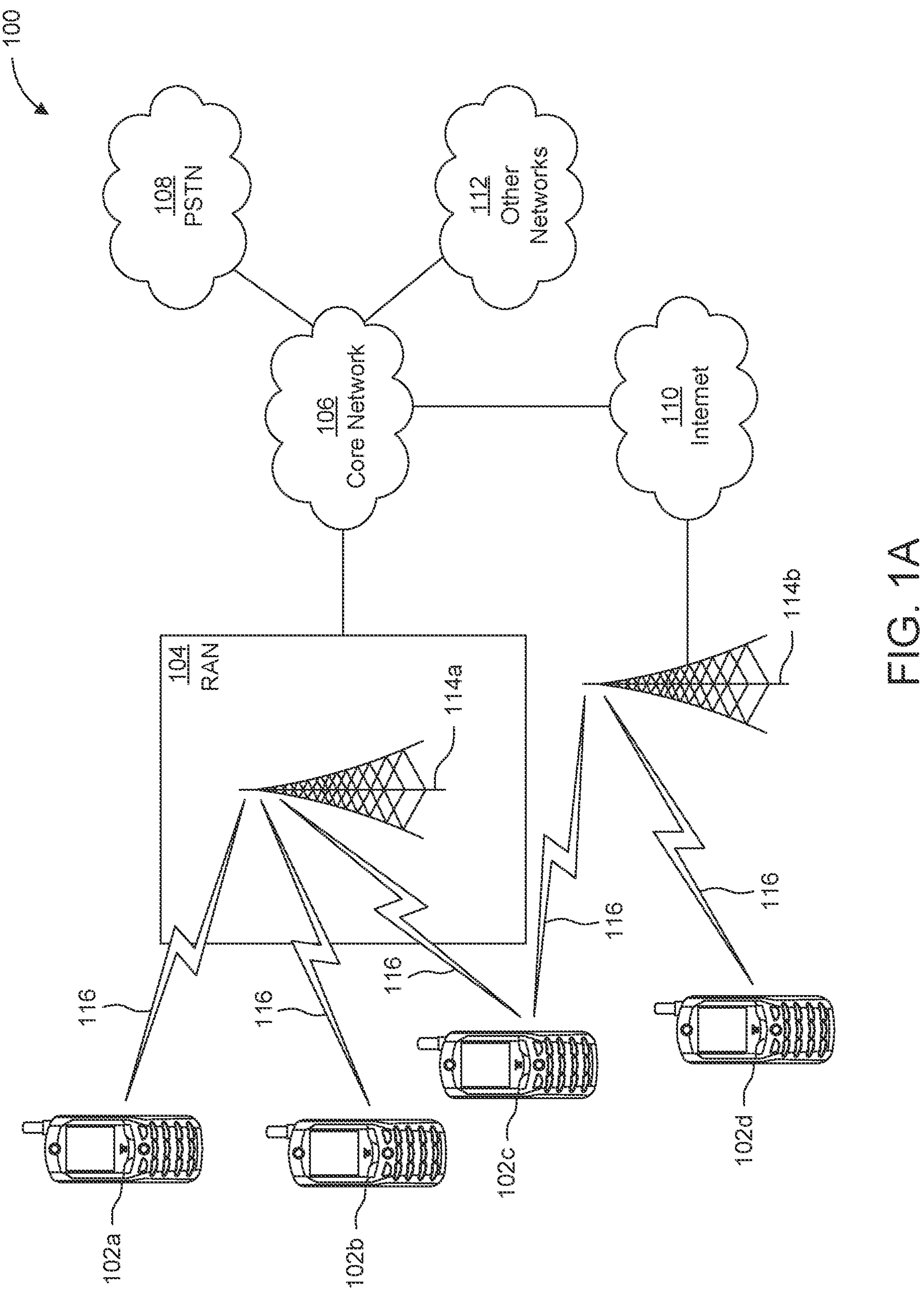
FIG. 1A is a system diagram illustrating an example communications system.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station **114*a* and the WTRUs 102*a*, 102*b*, 102*c*** may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station **114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115**.

The RAN 104/113 may be in communication with the CN 106/115, which may be any type of network configured to provide voice, data, applications, and/or voice over internet protocol (VoIP) services to one or more of the WTRUs **102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115** may also be in communication with another RAN (not shown) employing any of a GSM, UMTS, CDMA 2000, WiMAX, E-UTRA, or Wi-Fi radio technology.

The CN 106/115 may also serve as a gateway for the WTRUs **102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114** or a different RAT.

Some or all of the WTRUs **102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b***, which may employ an IEEE 802 radio technology.

Figure 1B:
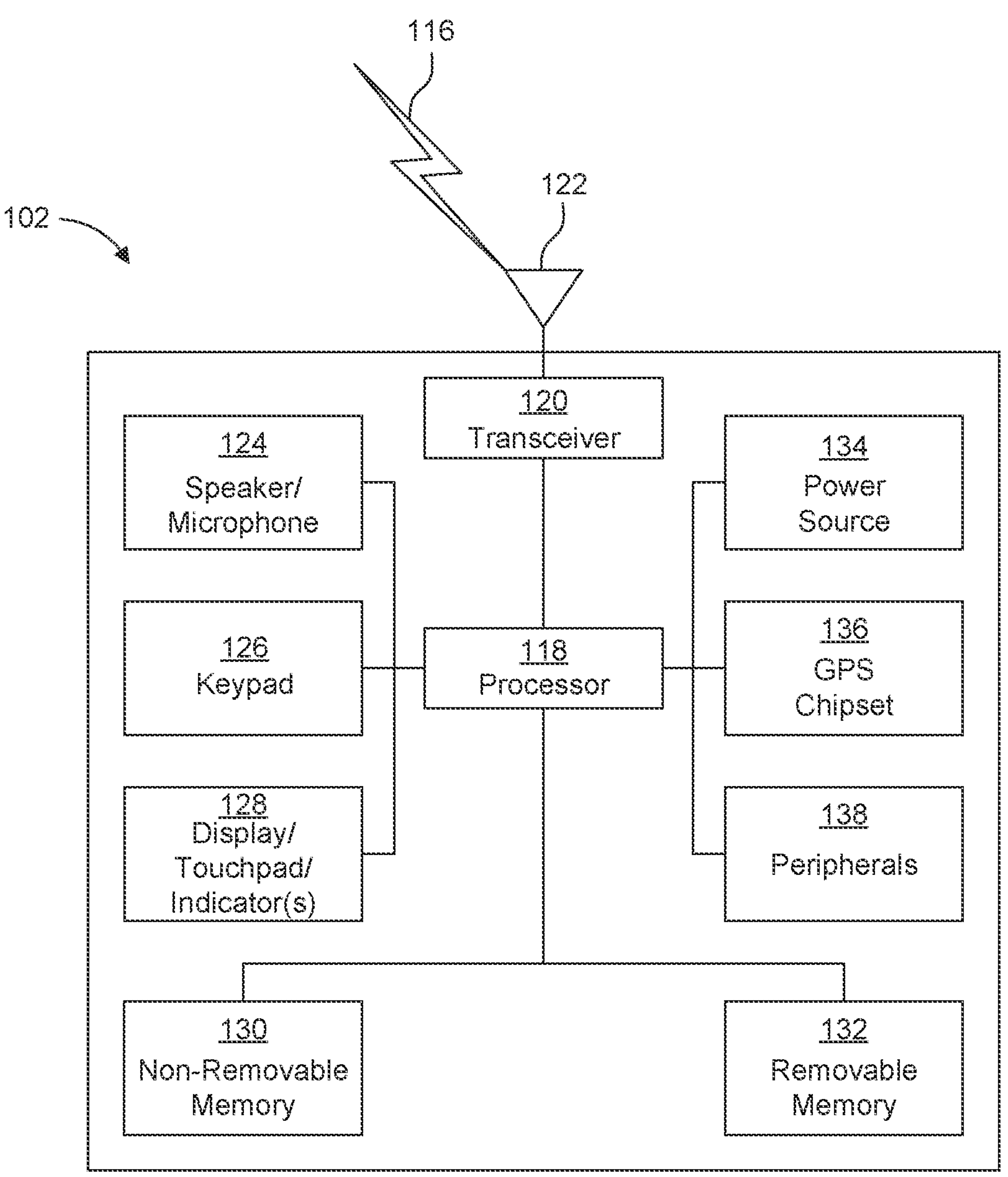
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station **114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122** may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
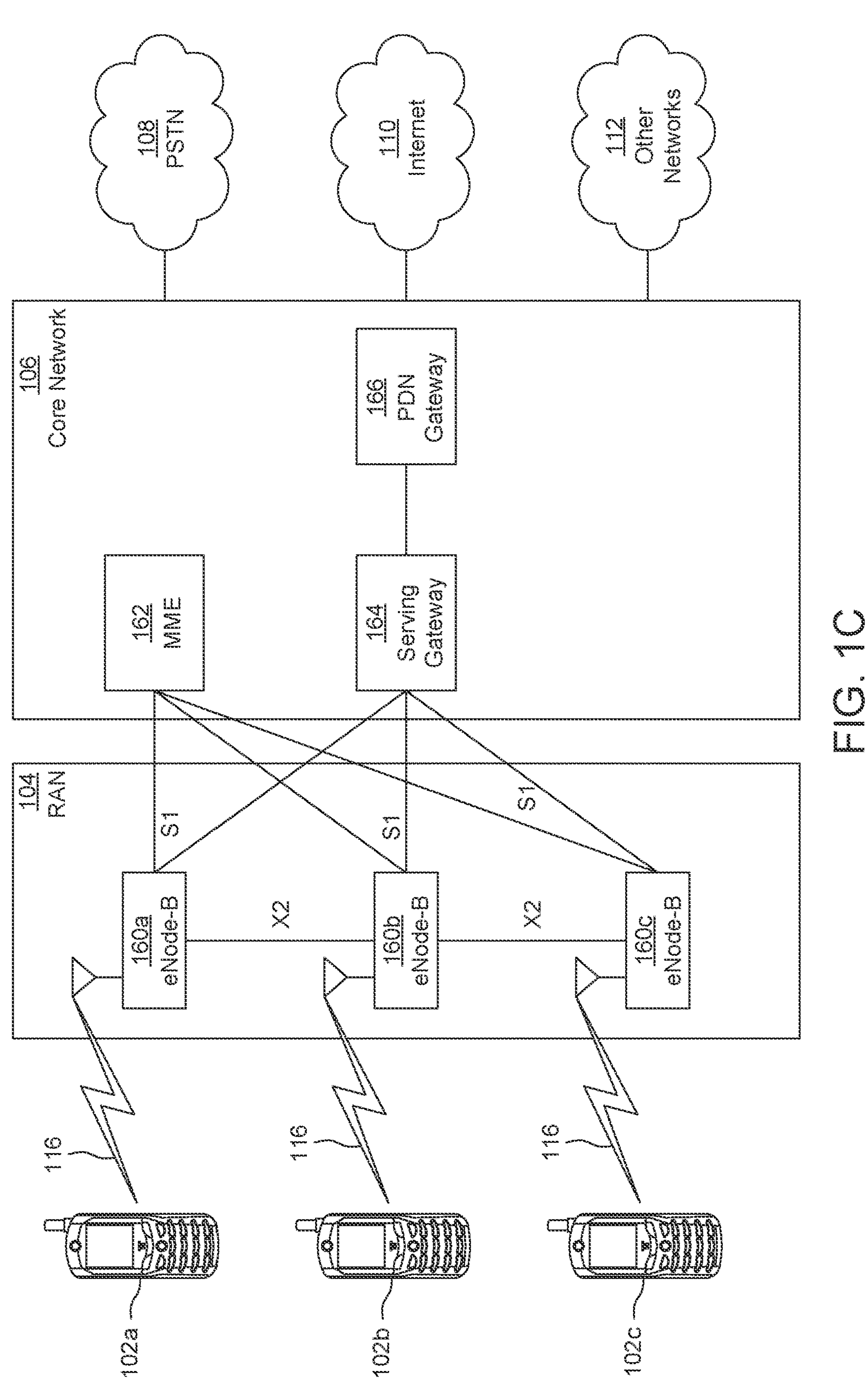
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-ID as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a longer battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
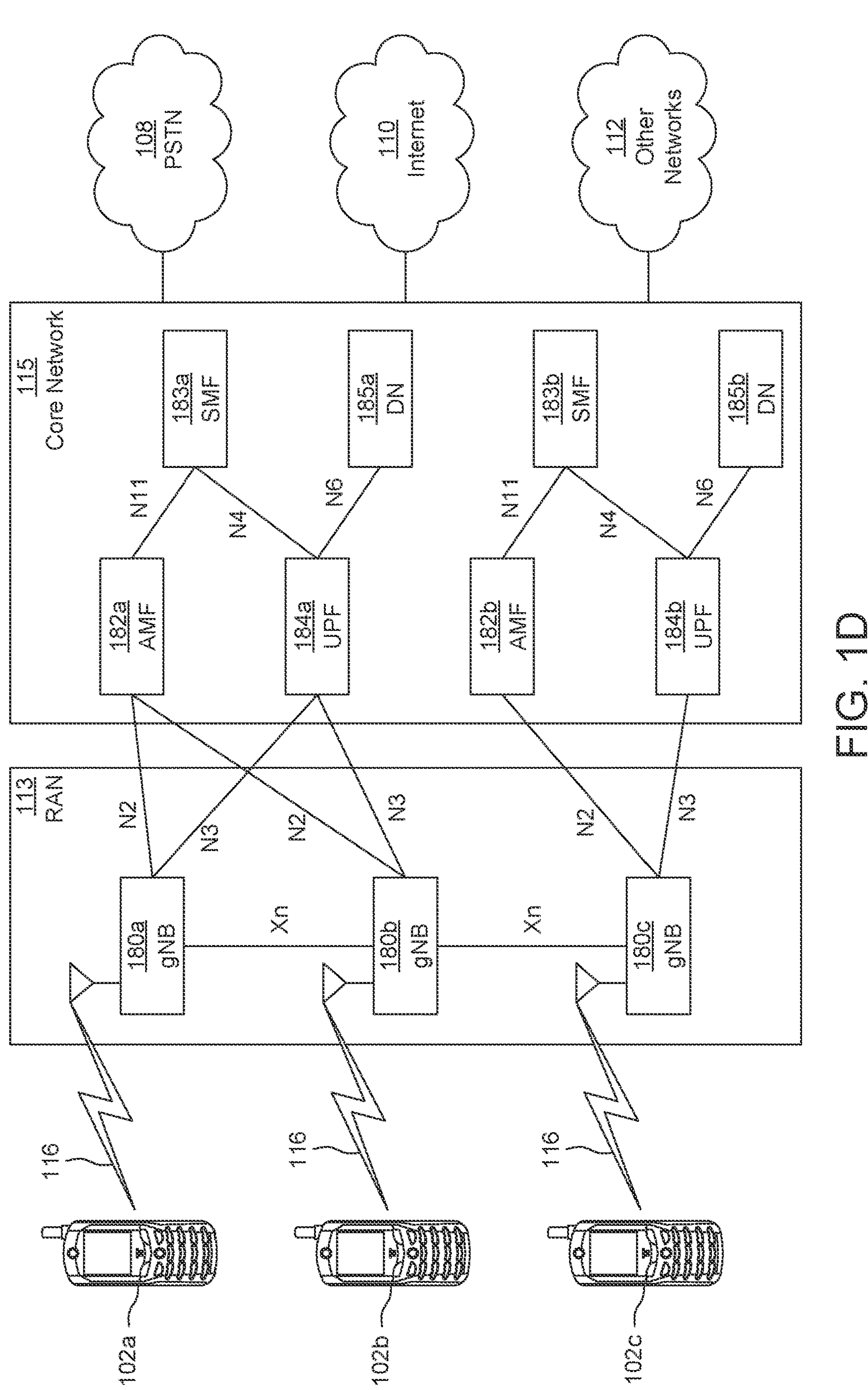
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In anon-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* maybe connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-ID, and the corresponding description of FIGS. 1A-ID, one or more, or all, of the functions described herein with regard to any of: WTRUs 102*a-d*, base stations 114*a*-b, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example of LTE Side-Link Communications

LTE may be seen as the first major cellular technology able to support advanced side-link (SL) communications. LTE vehicular to anything (V2X) may be based on the single-carrier frequency-division multiple access and may support any of 10 MHz and 20 MHz channels. LTE V2X communications may be based (e.g., only) on broadcast transmissions, and the side-link (SL) traffic arrivals may be considered as (e.g., only) periodic. For example, LTE V2X WTRUs may be always on (e.g., awake) in order to any of sense, transmit, and receive the periodical traffic. Power saving and energy efficiency of the V2X WTRUs have not been addressed in LTE.

For LTE SL communications, the physical resource block (PRBs) may be grouped into any number of sub-channels. A sub-channel may include any number of RBs within the duration of a (e.g., single) subframe. For example, the (e.g., exact) number of PRBs per sub-channel may be configurable and may depend on e.g., the deployment scenario. The sub-channels may be used to transmit and receive any of data and control information. The data payload transmissions may be performed (e.g., organized) on the SL interface in a similar way as on the LTE (e.g., RAN) interface. For example, a payload may be organized (e.g., structured) in transport blocks (TBs), where a TB may include any number of packets. For example, a TB may occupy (e.g., be transmitted over) any number of sub-channels depending on e.g., any of the size of the packet, the configured number of PRBs per sub-channel, and the used modulation and coding scheme (MCS). For example, as regular data over the LTE radio interface, SL TBs may be transmitted using any of QPSK, 16-QAM and 64QAM.

For example, on the control SL plane, a (e.g., each) TB transmission may be associated with a side-link control information (SCI) message. For example, the SCI may be analogous to the LTE downlink control information (DCI). The SCI may include information such as e.g., any of an indication of the PRBs/sub-channels occupied (e.g., used) by the associated TB transmission, an indication of the MCS used for the TB, an indication of the priority of the message that may be transmitted, an indication of whether the associated TB transmission is a first (e.g., initial) transmission or a blind retransmission of the TB, and an indication of the resource reservation interval (RRI).

The LTE V2X may be (e.g., mainly) based on blind retransmissions to enhance the SL transmission reliability without receiver feedback (e.g., since LTE V2X transmissions may be in broadcast mode). For example, the transmission of a TB may be repeated in any of time and frequency domains and combined at the receiver side. For example, the RRI indication may denote (e.g., indicate) the periodicity of the resource reservation over the indicated sub-channels (e.g., PRBs). For example, an LTE V2X may reserve the channel for any of current and future transmissions by a single SCI transmission.

Example of 5G New Radio Side-Link Communications

Mobile communications are in continuous evolution and are already at doorsteps of its fifth incarnation, which is called 5th Generation, and may be referred to herein as any of 5G, NR, collectively NR. NR SL communications may be seen as inheriting most of the LTE V2X overall functionalities, with some system updates. For example, unlike LTE V2X, NR SL may support (e.g., be capable of) any of unicast, groupcast and multicast transmission over e.g., the ProSe communication 5 (PC5) SL interface. For example, NR SL may support (e.g., be capable of transmitting) hybrid automatic repeat request (HARQ) feedback over the SL PC5 interface to improve the SL communication reliability. For example, NR SL may provide SL link quality of service establishment and tracking. For example, NR may be applicable to a diversity of new V2X uses cases such as e.g., any of vehicle platooning, advanced driving, extended seniors, and remote driving. For example, NR SL may support aperiodic traffic arrivals (e.g., and transmissions), e.g., in complement of the LTE-alike periodic SL traffic arrivals and transmissions.

Transmissions in NR V2X SL may be based on the orthogonal frequency division multiplexing (OFDM) waveform. The majority of the NR radio functionalities may be available for (e.g., applicable to) NR side-link communications such as e.g., any of the flexible numerology, slot-based transmissions, and bandwidth parts. For example, mini-slot SL transmissions may not be supported due to the respective short coverage and lower WTRU transmission power. For example, for scheduling SL transmissions in NR V2X a slot may be the smallest unit of time and a sub-channel may be the smallest frequency unit. The slots and the sub-channels for scheduling SL transmissions in NR V2X may have the same structure as in LTE V2X.

For example, NR V2X SL may be based on bandwidth parts (BWP). For example, a SL BWP may occupy (e.g., extend over) a contiguous portion of bandwidth e.g., within a carrier. For example, (e.g., only) one SL BWP may be configured for (e.g., all) WTRUs (e.g., performing SL transmissions). SL WTRU transmissions and receptions may be included (e.g., contained) within the SL BWP and may be based on the same numerology. For example, (e.g., all) physical channels, reference signals and synchronization signals in NR V2X SL may be transmitted within the SL BWP.

Throughout embodiments described herein, the terms SL transmitting WTRU, SL transmitter, SL Tx WTRU, and SL transmit WTRU may be used interchangeably to designate a SL WTRU with transmission capabilities that may perform a SL (e.g., data) transmission. Throughout embodiments described herein the terms SL receiving WTRU, SL Rx WTRU, SL receiver, and SL receive WTRU may be used interchangeably to designate a SL WTRU with reception capabilities that may perform a SL data reception.

Example of NR SL Channels

For example, in a configured BWP, a WTRU may transmit any of a physical side-link control channel (PSCCH), a physical side-link shared channel (PSSCH), a physical side-link broadcast channel (PSBCH), and a physical side-link feedback channel (PSFCH).

For example, the physical side-link control channel (PSCCH) may include (e.g., carry) the side-link control information (SCI) over the side-link interface. For NR SL, the SCI information may be divided into two stages (e.g., parts). The first stage SCI may be transmitted over the PSCCH channel and may include a smaller set of the SL scheduling information. For example, the first stage SCI may include an indication of the timing and frequency resources of the reserved SL resources and an indication of the timing and frequency resources of the second stage SCI. The second stage SCI may include indications of the transmission configurations of the scheduled SL transmission, such as e.g., any of used MCS, channel state information (CSI) request, HARQ process ID and configuration, etc. The second stage SCI may be transmitted over the PSSCH channel.

For example, the physical side-link shared channel (PSSCH) may include any of the (e.g., actual) SL data payload over the side-link interface and additional control information (such as e.g., the second stage SCI).

For example, the physical side-link broadcast channel (PSBCH) may include information for supporting synchronization over the side-link interface. The PSBCH may be sent within a side-link synchronization signal block (S-SSB) from any number of active SL WTRUs. The PSBCH may include an identifier (which may be referred to herein as SL ID) of the SSB-transmitting WTRU. The SL ID may be, for example, the radio-network temporary identifier (RNTI) of the SSB-transmitting WTRU. The PSBCH may indicate whether the PSBCH is originally synchronized with the RAN interface or a satellite, or an SSB-transmitting WTRU clock. For example, the PSBCH may include synchronization information indicating the direct frame number (DFN) of the SL interface (e.g., which may be similar to the RAN system fram9SFN). In a case where the SL WTRU, receiving the SSB, is out of coverage (OOC) of the RAN interface, the synchronization information of the PSBCH may allow the OOC SL receiving WTRU to get synchronized to the SL PC5 interface.

For example, the physical side-link feedback channel (PSFCH) may include HARQ feedback information related to any of a successful and a failed reception of a SL transmission. For example, the HARQ ACK/NACK from different receiving SL WTRUs may be multiplexed over the same timing and frequency resources e.g., using code division multiplexing, which may result in a PSBCH of a small (e.g., limited) bandwidth.

Example of NR SL Channel Structure and Resource Allocation

For example, the SL slot structure such as e.g., any of the placement of the SL data symbols, SL control symbols, SL SSB transmission periodicity and timing, and PSBCH opportunities within a slot (e.g., any of number and placement of PSBCH opportunities) may be configured (e.g., by the 5G RAN). For example, the PSCCH and PSSCH may be multiplexed and (e.g., simultaneously) transmitted. A SL WTRU may blindly search and decode (e.g., monitor for) the information sent over the PSCCH, in order to determine (e.g., identify) the corresponding PSSCH channel transmissions. For example, the transmissions of the SL SSBs may not be multiplexed with any of the SL data and control channel, so that SL SSBs may be detected from NR SL WTRUs without performing blind decoding (e.g., monitoring).

In NR V2X, (e.g., only) one or more slots may be configured to accommodate (e.g., to be used for) any of SL data and SL control transmissions. For example, (e.g., available) side-link resources may comprise any of slots that may be allocated for side-link (e.g., time resources) and common PRBs within a SL BWP (e.g., frequency resources). For example, a subset of the (e.g., available) SL resources may be (e.g., pre-) configured to be used by any number of WTRUs for their SL data/control transmissions. This subset of (e.g., available) SL resources may be referred to herein as a resource pool. For example, a resource pool may be a set of (e.g., contiguous) subchannels over a one or more symbols (e.g., or slots), and may be scheduled for SL WTRUs on a (e.g., configured) periodicity. For example, the placement of the SL demodulation reference signals (DMRS) may be configured (e.g., by a RAN network element transmitting configuration information) such that receiving SL WTRUs may tune their receivers, by the SL channel estimate, for data decoding.

For example, the SL SSBs may be transmitted outside of the configured (e.g., data/control) SL resource pools and inside the configured SL BWP. For example, the RAN (e.g., service base station) node may configure (e.g., send configuration information to) one of the SL WTRUs to (e.g., always) transmit SL SSB independently on whether that SL WTRU is transmitting SL data or not. In another example, a SL WTRU may receive bad coverage (e.g., low signal level) from the SL WTRU that may be transmitting the SL SSB, in such a case, the SL WTRU may self-promote itself (e.g., may determine) to transmit the SL SSB (e.g., instead). SL SSBs from different WTRUs may not be prone to collisions as the location of frequency resources for SL SSB may depend on the transmitting SL WTRU ID (e.g., RNTI), and may be shifted in the frequency domain based on the source SL WTRU ID.

In NR V2X, there may be two SL resource allocation modes. In the first SL resource allocation mode the SL WTRU may be in coverage of the NR RAN interface. For example, a SL WTRU may receive a SL scheduling grant from the serving RAN node (e.g., base station) and may transmit a SL payload based on the SL scheduling grant. For example, any of a (e.g., typical) RAN dynamic grant and a configured grant scheduling may be used for scheduling a SL grant. Dynamic grant scheduling may lead to increase the end-to-end latency of the SL transmissions. Configured grant scheduling may lead to resource underutilization for configured grant type 1 or to SL scheduling collisions for configured grant type 2.

In the second SL resource allocation mode, a SL WTRU may be, for example, out of coverage (OOC) of the RAN interface (e.g., serving base station). For example, the SL WTRU may be configured to use the second mode in order to reduce the control overhead of the RAN interface. In the second SL resource allocation mode, the SL WTRU may (e.g., autonomously) transmit and receive over the SL PC5 interface, e.g., without a connection to the RAN interface (e.g., base station). For example, the configurations of the resource pools that the SL WTRU may select for any of SL transmissions and SL reception may be (e.g., pre) configured from the serving RAN node (e.g., base station). For example, the resource pools may be shared across any number of SL WTRUs. For example, SL WTRUs may (e.g., autonomously) sense the channel, and may select free available resources over which they may transmit a SL payload.

Example of NR SL Channel Sensing

For example, a SL WTRU operating in the second resource allocation mode may perform a three-step baseline procedure as described herein before a SL payload may be transmitted.

For example, in a first step the SL WTRU may sense the channel, e.g., during the sensing window. For example, independently of having a SL payload to transmit or not, the SL WTRU may sense and blindly decode (e.g., all) possible locations of the PSCCH during the configured symbols, e.g., blindly searching and decoding the PSCCH search space. The SL WTRU may obtain (e.g., identify) the first stage SCI from other active SL WTRU(s) that may be (e.g., currently, and potentially on the future) transmitting a SL payload. For example, by sensing the channel, the SL WTRU may obtain (e.g., identify) the reserved (e.g., current and future) resources for other SL WTRUs. For example, a future channel reservation may be obtained based on (e.g., detecting) the RRI.

For example, in a second step the SL WTRU may down-select SL resources from the sensed resource pools. SL resources may be (e.g., down-) selected from the (e.g., sensed) resource pools based on different rules (e.g., techniques). For example, the SL WTRU may (e.g., down-) select resources from the (e.g., sensed) resource pools by excluding the SL resources which may be determined (e.g., identified) to be reserved for other transmitting WTRUs in any of the current and a future time. The SL WTRU may obtain (e.g., a list of) free available resources which may be used to transmit a SL payload (e.g., after a SL packet may arrive).

For example, in a second step the SL WTRU may perform resource re-evaluation and selection. For example, resource re-evaluation may allow the SL WTRU to re-sense the channel (e.g., shortly) before the SL payload transmission, e.g., to avoid resource collision with any (e.g., aperiodic) SL payload transmission from any other SL WTRU, which may not have been detected by the (e.g., full) channel sensing in the first step. For example, after re-evaluation (e.g., channel being re-sensed), the SL WTRU may adjust its SL transmission configuration, to reduce the SL interface congestion. For example, the SL WTRU may (e.g., randomly) pick the proper amount of resources, from the selected free available resources, to transmit the SL payload.

Example of NR SL Congestion Control

The SL interface may be seen as a distributed multi-access medium over shared resources, where a congestion may occur. For example, the SL interface congestion may be controlled based on any of a channel busy ratio (CBR) metric and a channel occupancy ratio (CR) metric.

For example, the channel busy ratio (CBR) may be defined as the ratio of the number of sub-channels that may experience a received signal strength indication (RSSI) higher than a (pre-)configured threshold to the total number of sub-channels in e.g., the previous 100 subframes.

For example, the channel occupancy ratio (CR) may quantify the channel occupancy generated by a transmitting WTRU (e.g., vehicle). For example, the CR may be obtained in subframe n as the ratio between the number of sub-channels that may have been utilized by the transmitting WTRU in (e.g., preceding) subframes [n−a, n−1] and that may be selected by the WTRU for its remaining reselection counter transmissions in (e.g., future) subframes [n, n+b] and the total number of sub-channels, where a and b may be integer numbers.

For example, before transmitting a TB over the SL interface, a SL WTRU may obtain (e.g., measure) the CBR and may map it to one of (e.g., the predefined and preconfigured) ranges to get the (e.g., maximum) CR limit that the SL WTRU may be allowed to use. For example, the SL WTRU may obtain its own CR and may determine whether the obtained CR is higher than the CR limit. In such a case, the SL WTRU may, for example, terminate its SL transmission. In another example, the SL WTRU may increase the utilized MCS in order to reduce the amount of the SL resources for such SL transmission, which may reduce the CR below e.g., the maximum allowed CR limit for the current conditions of the SL interface.

Example of NR SL Relays

SL relaying may allow, for example, to extend the network coverage of a remote WTRU by relaying on a WTRU-to-Network relay. In another example, SL relaying may allow to save power of power-limited remote WTRUs by transmitting to any of a lower-pathloss WTRU-to-Network and a WTRU-to-WTRU relay.

A SL WTRU may discover and connect to surrounding available SL relays based on any of a model A (which may be referred to herein as “I am here”) and a model B (which may be referred to herein as “who is there?”/“are you there?”).

For example, in the model A (“I am here”), a first WTRU, which may be referred to herein as the announcing WTRU may transmit (e.g., announce) information indicating that may be used by WTRUs in proximity that may have permission to discover. A second WTRU, which may be referred to herein as the monitoring WTRU may monitor (e.g., transmissions including) information of interest in proximity of announcing WTRUs. In this model, the announcing WTRU may broadcast discovery messages e.g., at pre-defined discovery intervals and the monitoring WTRUs that may be interested in these messages may receive (e.g., read) them and process them.

For example, in the model B (“who is there?”/“are you there?”), a first WTRU, which may be referred to herein as the discoverer WTRU may transmit a request message including information indicating what the WTRU is interested to discover. A second WTRU, which may be referred to herein as the discoveree WTRU may receive the request message, and may respond (e.g., transmit a response message) including information related to the discoverer’s request. In this model, the discoverer WTRU may send a request message including information about other WTRUs from which the discoverer WTRU may receive responses. For example, the information may indicate a ProSe application identity (ID) that may correspond to a group of WTRUs and the members of the group may respond (e.g., transmit a response message).

For example, a (e.g., remote) WTRU may connect to a relay WTRU. The (e.g., remote) WTRU may determine whether the PC5 link quality with the relay WTRU satisfies a relay reselection criterion, e.g., based on side-link reference signal received power (SL-RSRP) measurements on the SL unicast link to. For example, for relay (re-)selection, the (e.g., remote) WTRU may compare the PC5 radio measurements of a relay WTRU with the threshold which may have been any of configured by the serving base station and preconfigured. For example, a relay reselection may be triggered in a case where the NR SL signal strength of the current SL relay is below a (pre)configured threshold. For example, a relay reselection may be triggered in a case where a radio link failure (RLF) of the PC5 link with the current Relay WTRU is detected by the (e.g., remote) WTRU.

Example of Release 17 SL and SL Relays

Partial Sensing Example

In LTE SL, power may be saved for WTRUs (such as e.g., pedestrian WTRUs) by (e.g., only) performing sensing periodically and on a sub-sensing window.

For example, the width of the sub-sensing window may be configured. The location may be set based on (e.g., each) WTRU on its own. This mechanism may be adapted to a Tx-only (e.g., pedestrian) WTRU periodically communicating with an always active WTRU.

In NR V2X, for aperiodic traffic, an additional short-term sensing may be performed for resource selection based on partial sensing. For example, additional short sensing based on partial sensing may allow to evaluate whether the selected resource is reserved by other WTRUs (e.g., specifically for aperiodic services).

In NR V2X, for periodic traffic, partial sensing may allow a re-evaluation at least on subsequent periods.

SL Discontinuous Reception Example

For example, discontinuous reception (DRX) may allow power saving of a SL (e.g., pedestrian) WTRU with a similar operation as in NR DRX.

For example, any of the DRX ON and OFF durations (e.g., for the Rx) may be aligned to the partial (e.g., limited) sensing definition (e.g., for Tx candidate resource selection).

For example, a WTRU may operate the sensing and Rx decoding during (e.g., possible) DRX active opportunities.

For example, options for inter-WTRU coordination may allow to communicate the DRX setup and the WTRU-specific partial sensing cycles.

For example, the WTRUs may extend any of their sub-sensing window and reception activity timers based on the actual conditions.

For example, the length of the sub-sensing window (e.g., DRX ON duration) and the inactive sensing period (e.g., DRX OFF duration) may be adaptively (e.g., dynamically) selected.

For example, in a case where a WTRU is approaching a spot (e.g., an area) where the channel is (e.g., more) congested (with a high CBR value), the WTRU may expand (e.g., increase) its sub-sensing/DRX ON duration for a better reception e.g., under such a condition.

Embodiments described herein may allow to improve the energy efficiency of WTRUs on the side-link interface. Although embodiments are described herein in the context of cellular communications, they are not limited to cellular communications and may be applicable to any kind of wireless technologies such as, for example, and without limitation, IEEE 802.11 Wi-Fi systems.

TABLE 1 side-link use cases (from ETSI TR 22.886)

| Communication scenario | | | | Payload | Tx rate (Mes- | Max end-to-end | Reli-abil- | Data | Commu-nication |
|---|---|---|---|---|---|---|---|---|---|
| Section # | Description | | CPR # | (Bytes) | sage/Sec) | latency (ms) | ity (%) | rate (Mbps) | range (meters) |
| 5.1 | Among a group of WTRUs (or two WTRUs) supporting V2X application | | [CPR.P-004] | 50-1200 (NOTE 1) | 30 | 10 | | | |
| | | | [CPR.P-005] | 300-400 | 30 | 25 | 90 | | |
| 5.2 | Between WTRU supporting V2X application and RSU via another WTRU supporting V2X application | | [CPR.P-006] | [50-1200] | 2 | 500 | | | |
| 5.5 | Between WTRUs supporting V2X application | Driver control | [CPR.P-007] | 300-400 (NOTE 2) | | 25 | 90 | | |
| | | Fully automated driving | [CPR.P-008] | 1200 | | 10 | 99.99 | | 80 |
| 5.12, 5.13 | Between WTRUs supporting V2X application | Conditionally automated driving | [CPR.P-009] | [6500] | 50 | [20] | | | [10] sec * (max. relative speed) [m/s] |
| | | Highly/fully automated driving | [CPR.7.P-010] | | | [20] | | [65] | [5] sec * (max. relative speed) [m/s] |

TABLE 1-continued side-link use cases (from ETSI TR 22.886)

| Communication scenario | | | | Tx rate (Mes- | Max end-to-end | Reli-abil- | Data | Commu-nication |
|---|---|---|---|---|---|---|---|---|
| Section # | Description | CPR # | Payload (Bytes) | sage/Sec) | latency (ms) | ity (%) | rate (Mbps) | range (meters) |
| 5.12, 5.13 | Between WTRU supporting V2X application and RSU — Conditionally automated driving | [CPR. 7.P-011] | [6000] | 50 | [20] | | | [10] sec * (max. relative speed) [m/s] |
| | Highly/Fully automated driving | [CPR. 7.P-012] | | | [20] | | [50] | [5] sec * (max. relative speed) [m/s] |

NOTE 1:
This value may not include security related messages component.
NOTE 2:
This value may be applicable for both triggered and periodic transmission of data packets Table 1, which is extracted from ETSI TR 22.886 version 16.2.0, describes several target communication scenarios for NR SL. The use cases may be characterized by different packet transmission rates and with various target end to end latency budgets. For example, based on ETSI TR 22.886 version 16.2.0, any of SL WTRUs and SL relays (SLRs) may be (e.g., always) active, e.g., waking up for monitoring the channel reservations, (e.g., channel sensing). In other words, any of SL WTRUs and SLRs may (e.g., always) monitor the SL control channel opportunities to determine, for example, the SL channel reservation from other SL WTRUs. For example, any of SL WTRUs and SLRs may (e.g., always) monitor the SL control channel opportunities to determine whether there is a potential SL scheduled data reception for the SL WTRU of interest. This may (e.g., significantly) degrade the SL WTRU power. For example, in a case where a SL WTRU receives SL packets with a low packet arrival rate, e.g., a single SL packet per 500 milliseconds as from Table 1, the SL WTRU may monitor the SL PSCCH opportunities, including blind decoding of may channels, in order to determine whether a PSSCH SL transmission has been scheduled or not. For example, the PSCCH blind decoding and monitoring may be performed at least once per SL slot (e.g., of a duration of 1 millisecond for the 15 kHz sub carrier spacing). In a case where the average packet reception is around 1 packet per 500 milliseconds, this may result in useless (e.g., unnecessary) wake up time of the SL WTRUs, and useless (e.g., unnecessary) PSCCH channel blind decoding, respectively. Embodiments described herein may allow to improve the power efficiency of any of SL WTRUs and SLRs by reducing the number of useless (e.g., unnecessary) PSCCH channel blind decoding, via e.g., a SL service specific (e.g., service-based) paging procedure (e.g., method).

In other words, SL WTRUs by monitoring the PSCCH channel opportunities within a (e.g., each) SL slot, independently of their Rx packet rate may degrade their power performance (e.g., by operating many blind decoding in (e.g., each) SL slot). Embodiments described herein may allow to improve the power consumption of SL WTRUs, especially in situations where a low rate of packets may be received.

Overview

Enabling procedures for SL paging of (e.g., power limited) WTRUs are described herein.

In an embodiment, a SL WTRU may stay in low power mode e.g., until any of a (e.g., potential) SL transmission and reception may occur (e.g., may be due). The enabling procedure for SL paging may be based on determining (e.g., a plurality of) any of repeated, periodic, and non-periodic SL paging occasions. The enabling procedure for SL paging may be based on a coordination between the distributed SL transmitters and (e.g., potential) SL receivers. The plurality of SL paging occasions may be determined per any of (e.g., each) SL WTRU, (e.g., each) SL WTRU group, and (e.g., each) SL service. SL paging as described herein may allow to meet (e.g., operate, perform) the various SL services and applications which may be of interest to a group of SL WTRUs, where a SL idle WTRU may be paged simultaneously for any number of SL services, or for specific cast receptions. For example, any of potential Rx SL WTRUs and SL relays between SL WTRUs may transmit (e.g., any of announce and relay) a message indicating any of their SL paging capabilities and multiplexing codes such that potential Tx SL WTRUs may multiplex the corresponding paging requests using the indicated codes, which may allow Rx SL WTRUs monitoring those paging requests to decode them.

In an embodiment, the SL paging procedure may be service specific (e.g., service-based). For example, any number of SL paging settings may be determined for (e.g., each specific) available SL service. For example, any of the frequency of the SL paging occasions and the length of a (e.g., each) SL service specific paging occasion may vary (e.g., be different) across different SL service specific paging settings. Varying the length of the SL paging occasions may allow to provide a dynamic SL paging capacity for a (e.g., each) service, depending on e.g., any of the number of SL (e.g., interested) WTRUs and the amount of SL traffic for the SL service. SL WTRUs with, for example, best effort SL traffic may deep sleep further (e.g., for longer periods) and (e.g., only) monitor (e.g., for a paging SCI in) the SL paging occasions corresponding to the best effort traffic. In another example, the SL WTRUs which may operate more latency stringent SL services may monitor (e.g., blindly decode) the configured additional and more frequent SL paging occasions for such services. Throughout embodiments described herein monitoring for a (e.g., paging) SCI and blindly decoding a (e.g., paging) SCI ay be used interchangeably to refer to e.g., the process of determining whether a (e.g., paging) SCI may be received by a SL WTRU.

In an embodiment, the SL paging procedure may allow an early SL paging and wake-up. For example, a (e.g., potential) Tx SL WTRU may transmit an early SL paging indication message over a (e.g., preconfigured limited) search space such that the (e.g., potential) SL Rx WTRUs may decode it and may monitor the corresponding paging occasion in a case where any of their IDs, their paging group IDs, and multicast (e.g., broadcast) group IDs have been paged. This may allow low power SL WTRUs to be early paged without wasting power by performing (e.g., a considerable amount of) blind decoding in the paging procedure (e.g., in a case where they are not paged).

In an embodiment, partial sensing may allow an SL WTRU to retain synchronization with the SL interface. For example, the sources for synchronization may be any of the NR Uu interface and the SyncRefWTRU (e.g., SL WTRU transmitting the SL-SSBs). For example, in a case where the SL WTRU is in idle mode (e.g., sleep mode, low power) the SL WTRU may not perform partial sensing and may lose the synchronization of the SL interface (e.g., and may not be able to detect and blindly decode the SL paging occasion). For example, an (e.g., assisting) SL reference signal may be transmitted prior to a (e.g., each, any number of) SL paging occasion(s). For example, low power SL WTRUs may wake up to detect the on-demand SL reference signal(s) to retain the SL synchronization, and accordingly, may read and blindly decode the SL early paging wake-up search space.

A dynamic (e.g., power-based) SL relay offloading method is described herein. In an embodiment, a (e.g., power limited) remote WTRU(s) may send a (e.g., SL paging relaying) request (e.g., message, transmission) to any number (e.g., one or more) of the connected SL relays. For example, a SL relay WTRU(s) may accept the request and may monitor the configured (e.g., any of group-based and service-based) SL paging occasions of the remote WTRU(s). In a case where one or more remote WTRU(s) is paged, the SL relay WTRU may buffer the respective SL traffic and may transmit a SL paging indication (e.g., message) towards the one or more remote WTRU(s), e.g., to indicate availability of buffered SL traffic. For example, the SL relay WTRU may forward (e.g., transmit) the buffered SL traffic towards the one or more remote WTRU(s).

With the SL paging methods described herein, there may be resource alignment between the Uu and the SL interfaces. For example, for single receiver WTRU(s), (e.g., where a single channel may be decoded at a time) the WTRU(s) may (e.g., any of partially and fully) skip detecting one of the Uu or SL paging occasions. In an embodiment, SL WTRTU(s) may (e.g., announce and) transmit a message including information indicating (e.g., a list of) resources to be excluded for SL paging, where the resource sets to be excluded from the resources to be used for SL paging may correspond to paging resources of the Uu interface, such that any resource overlap (e.g., between Uu paging resources and SL paging resources) may be avoided.

With periodical discovery signaling, SL WTRU(s) may announce (e.g., transmit indications of) any of their presence and their request for SL services (e.g., of interest) to the other SL WTRU(s) in proximity. For example, discovery operation may represent a (e.g., significant) power burden on power limited SL WTRU(s), especially in SL deployments where many SL services may be available within a limited coverage (such as e.g., malls, airports, etc). A discovery aggregation method is described herein where, with a low number of discovery instants (e.g., messages), a SL WTRU may be able to identify (e.g., all) SL services, and corresponding SL paging settings within the (e.g., reachable) coverage.

Examples of Side-Link Proximity SL Paging Mechanisms

In an embodiment, a SL WTRU may receive and/or exchange configuration information describing the SL paging. Throughout embodiments described herein the term SL paging configuration information is used to designate information describing one or more SL paging configurations. A SL paging configuration may be associated with one or more SL paging occasions (e.g., any of time and frequency resources, where time resources may be associated with a repetition property (e.g., any of a periodicity and a time pattern).

For example, SL paging configuration information may include any of the SL paging resources e.g., of one or more SL paging occasions (e.g., in terms of the paging resource frequency pools, and corresponding time slots (e.g., periodicity, time pattern)), and the mode of the SL paging occasion transmission. A mode for transmitting in the SL paging occasion, which may be referred to herein as SL paging mode, may indicate how different SL transmitters may share a configured SL paging occasion. In a first example, the SL paging mode may be based on code division multiplexing (CDM). In a second example, the SL paging mode may be based on sensing-based time multiplexing (e.g., sensing-based channel access). For example, SL paging configuration information may be any of signaled by (e.g., received from) the RAN node (e.g., serving base station) over the radio interface and forwarded by (e.g., received from) SL relays over the SL interface for remote WTRUs which may be in or out of coverage of the RAN interface. For example, a SL Tx WTRU may intend to page any number of SL Rx WTRU(s) (e.g., over SL). The SL Tx WTRU may transmit a (e.g., corresponding) first stage SCI, according to the configured SL paging mode (e.g., only) over the configured SL paging occasion. The first stage SCI transmission may indicate (e.g., be scrambled with) an identifier (such as e.g., SL-RNTI) of the Rx SL WTRU(s) that may be SL paged. For any of broadcast and multicast SL transmissions, the source Tx WTRU may indicate the identifier (e.g., SL-RNTI) of any of the groupcast, multicast groups, and service groups, as part of the first stage SCI during the configured SL paging occasion(s).

Figure 2A:
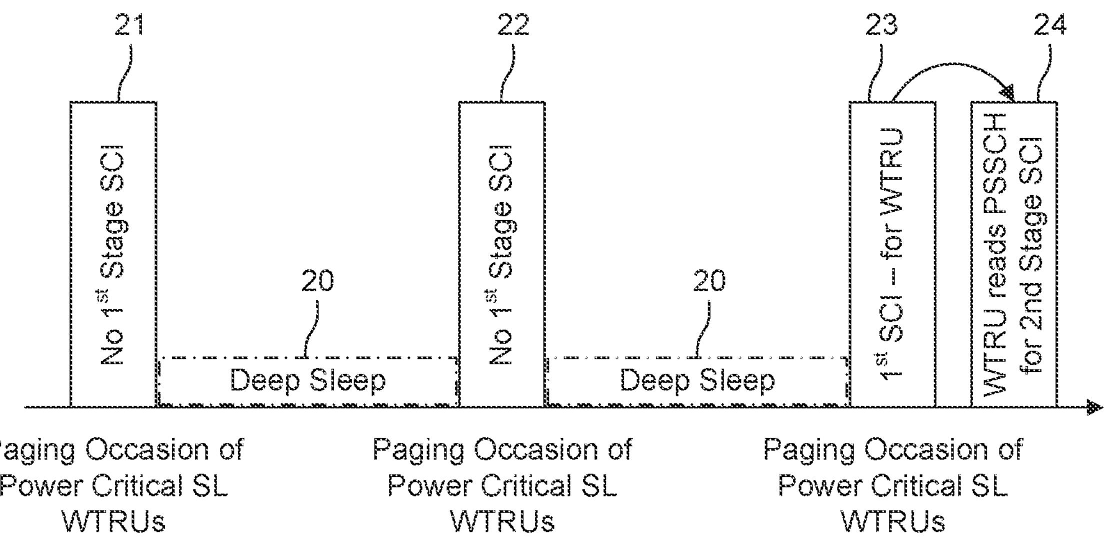
FIG. 2A is a diagram illustrating an example of SL paging occasions.

FIG. 2A is a diagram illustrating an example of SL paging occasions. For example, an SL idle WTRU may deep sleep (e.g., be in low power mode) during deep sleep periods 20 and may wake up (e.g., outside of the deep sleep periods) at periods of time corresponding to the (e.g., time) resources of the configured SL paging occasions 21, 22, 23. For example, the SL WTRU may blindly decode (e.g., each) of the SL paging occasions 21, 22, 23 in order to determine (e.g., detect) whether the SL WTRU has been paged or not. For example, at least one of the transmitted first stage SCI messages in the paging occasion 23 may indicate any of an ID (e.g., the SL-RNTI) of the destination idle SL WTRU, an ID (e.g., the SL-RNTI) of a multicast group to which the destination idle SL WTRU may belong to, and a broadcast ID (e.g., SL-RNTI). In an embodiment, an idle SL WTRU may be paged any number of times (e.g., more than once) at the same configured SL paging occasion from different transmitting SL WTRUs and/or for different supported SL services (e.g., that the idle SL WTRU may be interested in, e.g., may have subscribed to).

For example, the idle SL WTRU, which may be paged, may decode the PSSCH resources 24 (which may be indicated by the first stage SCI which may have been detected during the configured SL paging occasion 23) which may carry the second stage SCI and the corresponding SL payload. For example, the SL WTRU may deep sleep up to the upcoming configured SL paging occasion(s), e.g., in a case where no further SL HARQ retransmissions or SL payload repetitions may be performed.

SL Paging Mode Examples

SL paging may differ from the RAN Uu paging at least in that, any number of SL Tx WTRUs may send a paging SCI message towards a same or different SL WTRUs(s) (e.g., or groups of WTRUs) during a SL paging occasion. A SL paging mode may allow different SL Tx WTRUs to share the SL paging resources.

In a first example, a code division multiplexing (CDM) may be used over the SL paging resources to scramble the first stage transmissions from different SL transmitters during the SL paging occasion.

For example, the RAN nodes may transmit over the Uu interface the SL paging codes that may be associated with any of (e.g., each of) the SL services, cast types, and the WTRU SL RNTIs.

For example, one SL paging code may be associated (e.g., by the RAN) with one (e.g., each) SL RNTI of one (e.g., each) SL WTRU. For example, different SL paging codes may be associated with different SL WTRU IDs (e.g., SL RNTIs). For example, for paging a SL Rx WTRU, a SL Tx WTRU may scramble the corresponding first stage SCI with a CRC of the assigned code (e.g., associated with the SL-RNTI of the SL Rx WTRU). In another example, a single SL paging code may be associated (e.g., by the RAN) with a (e.g., each) SL service type. The latter may be applicable, for example, to service specific multicast SL transmissions where Tx SL WTRUs may use the common SL paging codes that may be assigned to (e.g., associated with) those particular services and may be decoded (e.g., and identified) by a group of (e.g., or all) SL Rx WTRUs which may be interested in (e.g., receiving) those services, e.g., service utilizing WTRUs.

In another example, paging-capable SL WTRUs may transmit, e.g., in broadcast e.g., over the PC5 interface, SL paging configuration information including their respective SL paging codes and paging groups to which they belong, for potential reachable SL Tx WTRUs and SL relays to obtain (e.g., identify) their SL paging configurations. For example, a potential Tx SL WTRU may adopt (e.g., use) any of those indicated SL WTRU-specific and service specific paging settings as described herein for performing a SL transmission towards any of those idle SL WTRUs.

In a second example, a sensing-based channel access may be used over the SL paging occasion resources. For example, with sensing-based channel access paging mode, a SL Tx WTRU may start sensing the paging occasion resources to determine whether any of the paging resources is available (e.g., free). In a case where (some of) those resources are available (e.g., free), the Tx SL WTRU may transmit a (e.g., the corresponding) first stage paging SCI. In a case where the SL paging resources are busy, e.g., by other first stage SCI transmissions, the sensing Tx SL WTRU may keep sensing the paging occasion resources, deferring their transmissions e.g., up to a point in time in the paging occasion where the paging resources may be available. In a case where the paging occasion resources are limited, e.g., any of a short time duration and a limited search space, a Tx SL WTRU may defer its SL paging transmissions to the next available SL paging occasion.

Figure 2B:
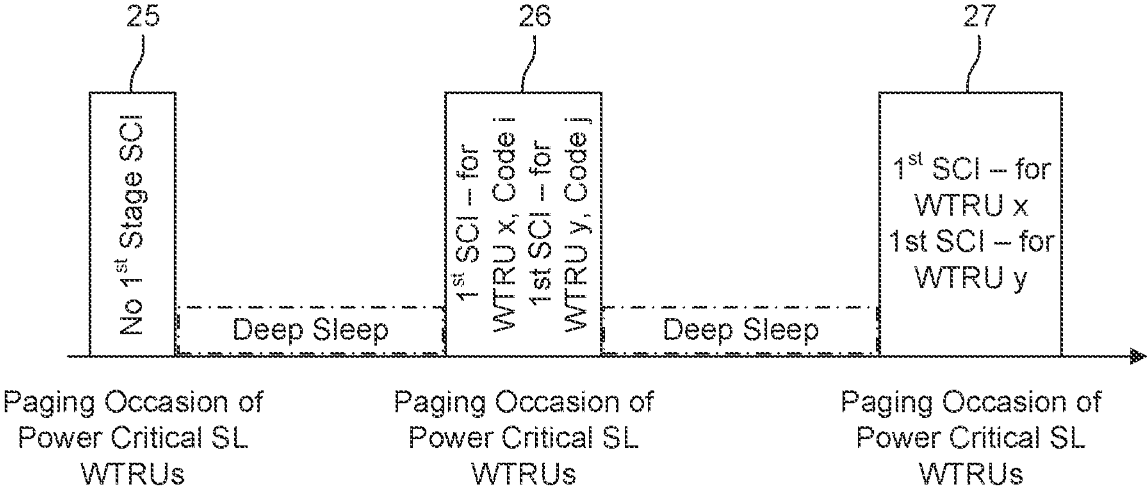
FIG. 2B is a diagram illustrating an example of multiplexing paging information during an SL paging occasion.

FIG. 2B is a diagram illustrating an example of multiplexing paging information during an SL paging occasion. For example, no first stage paging from any SL WTRU may be transmitted during the configured first SL paging occasion 25. For example, an SL idle WTRU may continue deep sleeping (e.g., after blind decoding in the first SL paging occasion). During a second SL paging occasion 26, two potential SL Tx WTRUs may be configured to use CDM as the access mean over the SL paging occasion, where each of them may use a different access code (scramble codes) that may depend on any of the destination WTRU SL ID (e.g., SL-RNTI) and the SL transmission cast type. During a third SL paging occasion 27, SL Tx WTRUs may use the sensing-based channel access for transmitting the first stage paging SCI. For example, any of the duration and the frequency resources of the SL paging occasion 27 may allow to provide a (e.g., reasonable) SL paging capacity.

According to embodiments, SL paging settings may be applicable to a (e.g., each of the) configured SL carriers, e.g., in case of SL multi-carrier support. For example, the delivery of the SL paging configurations may be associated with any number of the supported SL carrier IDs. For example, the SL paging configuration information (e.g., describing the SL paging configurations) may indicate any number of carrier IDs and with which carrier ID a paging occasion may be associated. According to embodiments, the idle SL WTRU may be able to receive SL paging occasions independently on the (e.g., each) supported SL carriers. For example, the SL idle WTRU may not monitor the PSCCH occasions within (e.g., each) SL slot of both (e.g., all) carriers.

Figure 3:
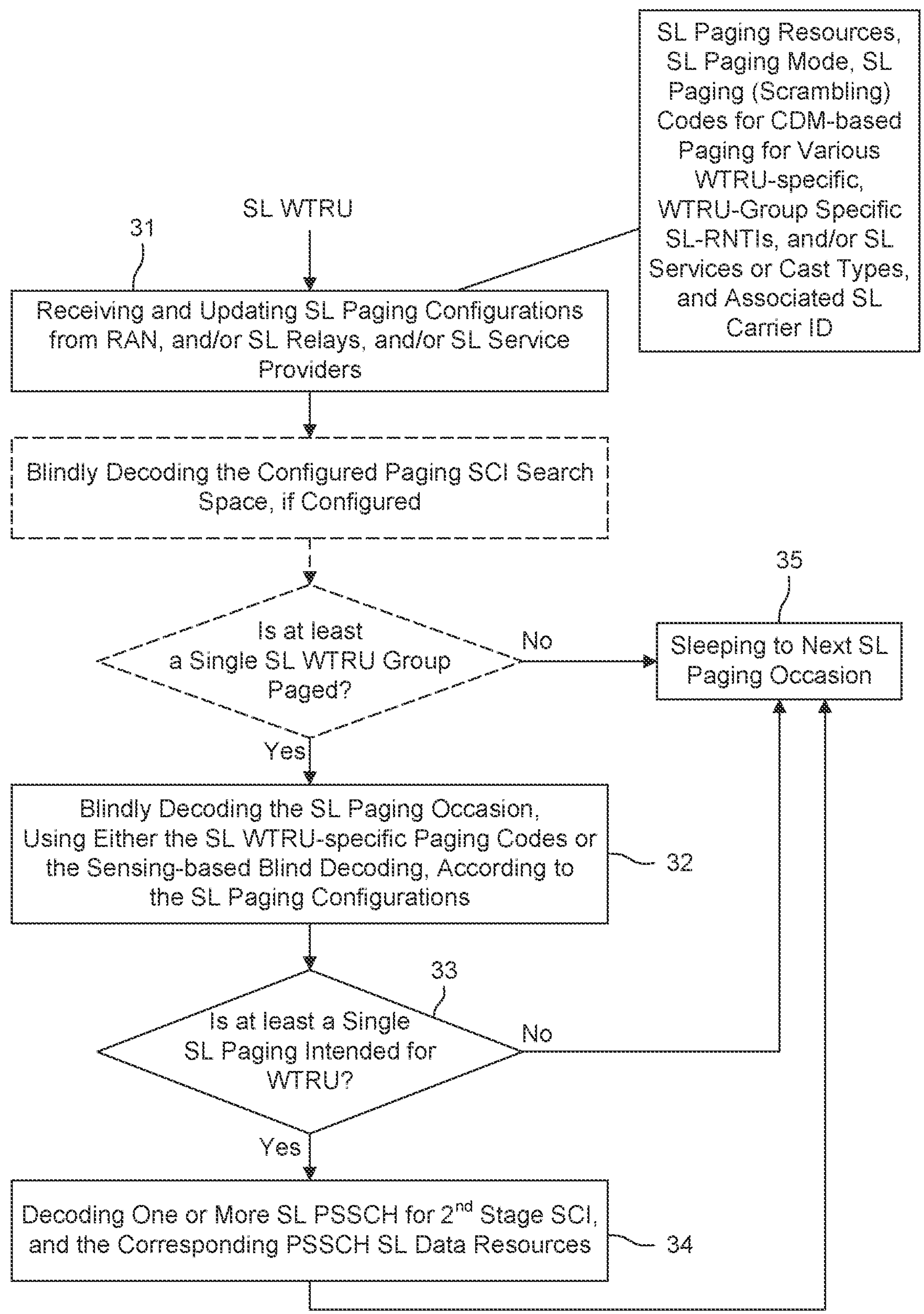
FIG. 3 is a flow diagram illustrating an example of a SL paging and SL idle mode method.

FIG. 3 is a diagram illustrating an example of a SL paging and SL idle mode method. For example, in a step 31, a RAN (e.g., serving base station) node may transmit the SL (e.g., idle-mode and) paging configurations (e.g., information) on the Uu interface, which may be forwarded using SL-relays to out-of-coverage SL WTRUs e.g., on the PC5 interface. SL (e.g., idle-mode and) paging configuration information may include any of the SL-paging-RNTI(s), the uniform or non-uniform SL paging occasion periodicity (e.g., pattern, time distribution), the SL paging occasion Tx/Rx resources (e.g., frequency resource pools), the SL paging multiplexing code of any of (e.g., each) SL paging-RNTI, SL cast type, SL WTRU group, and service. For example, any of the configurations (e.g., parameters) may be associated with a SL carrier ID indication (e.g., so that there may be a configuration per (e.g., each) configured SL carrier). For example, a SL idle-capable WTRU may deep sleep and may monitor (e.g., only) the configured SL paging occasions of interest. For example, in a step 32, the SL WTRU may detect and blindly decode a first stage paging SCI during the current paging occasion for e.g., a scheduled SL reception. For example, the SL WTRU may determine, in a step 33, (based on the first stage blind decoding) whether the SL WTRU is paged. In a case where the SL WTRU is paged, the SL WTRU may wake up, and may decode, in a step 34, the second stage SCI over the configured PSSCH resources (e.g., that may be received) from the first stage SCI during the SL paging occasion. For example, after the (e.g., scheduled) resources may have expired, the SL WTRU may transition to SL idle mode, and may deep sleep in a step 35. For example, the SL WTRU may not monitor and blindly decode (e.g., every possible) first stage SCI from surrounding transmissions outside the configured SL paging occasions. In other words, the SL WTRU may only monitor and blindly decode possible first stage SCI from surrounding transmissions within configured SL paging occasions of interest.

Figure 4:
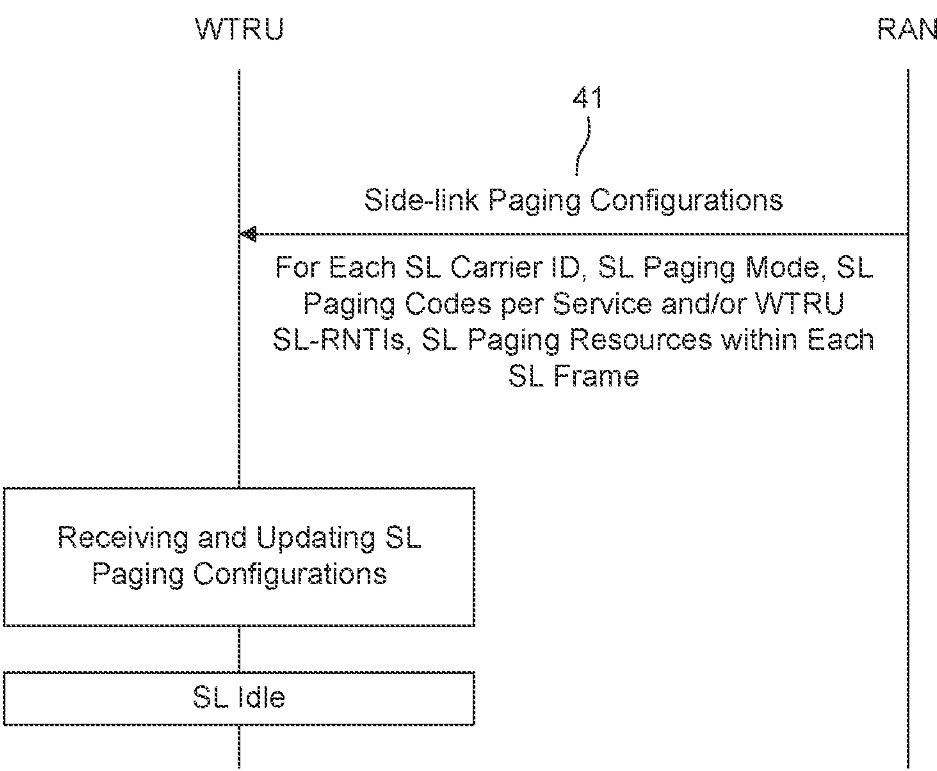
FIG. 4 is a diagram illustrating an example of delivering SL paging configuration information over the RAN interface for in coverage SL WTRUs.

FIG. 4 is a diagram illustrating an example of delivering SL paging configuration information over the RAN interface for in coverage SL WTRUs. For example, the RAN node (e.g., serving base station) may transmit SL paging configuration information (e.g., directly) to the SL WTRUs, e.g., in a case where they are in coverage of the RAN interface. For example, SL paging configuration information may include indication(s) of any of the SL paging resources (e.g., any of time and frequency resources), SL paging modes (e.g., any of CDM and sensing-based), and the SL-RNTI of (e.g., each) connected SL WTRU(s). For example, in a case where the CDM-based SL paging mode is used, SL paging configuration information may further include, the multiplexing (e.g., scrambling) codes of the SL paging occasions, corresponding to (e.g., each of) the SL-RNTIs, RNTI group, and/or SL services. For example, SL paging configuration information may further include identifiers of any of the SL paging group and SL service to which the SL WTRU may belong (e.g., have subscribed). For example, configured SL service IDs may enable SL idle WTRUs to monitor the SL paging opportunities towards those available SL services, e.g., if their subscriptions allow for such. For example, this may be applicable to multicast transmissions that may be of interest to (e.g., each of) the SL WTRUs, depending on the SL service.

Figure 5:
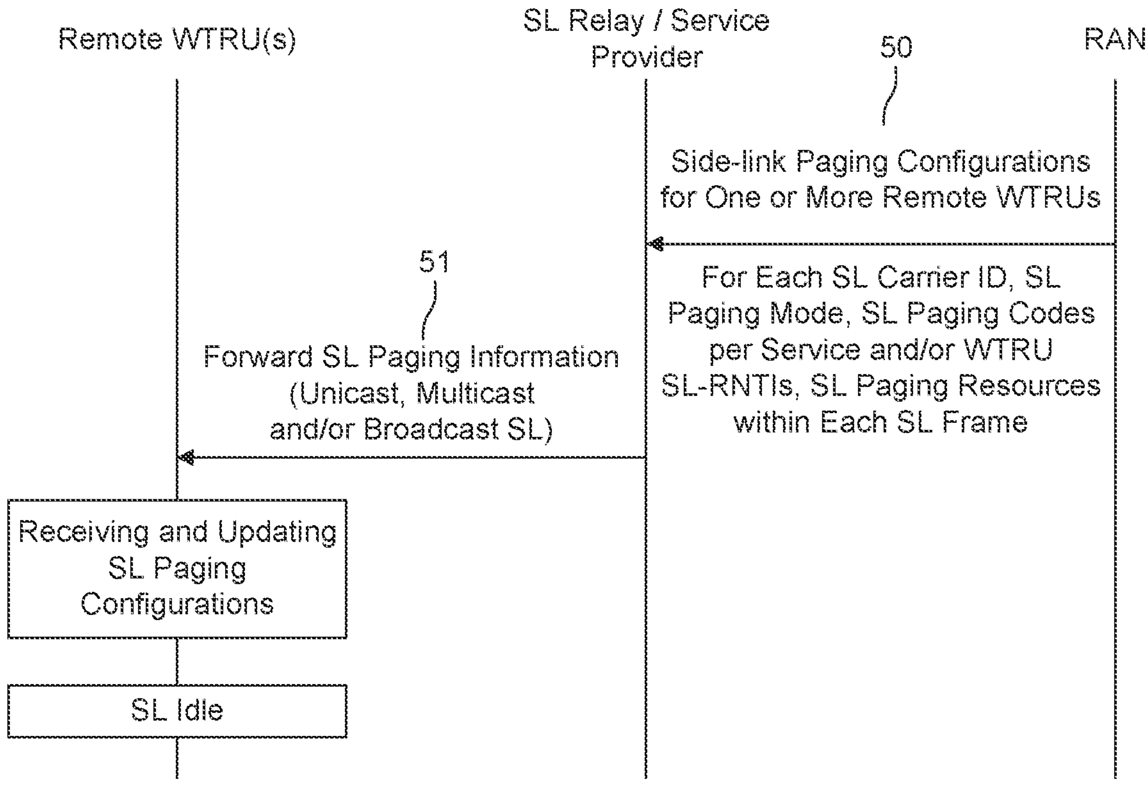
FIG. 5 is a diagram illustrating an example of delivering SL paging configuration information over the SL PC5 interface for out of coverage SL WTRUs.

FIG. 5 is a diagram illustrating an example of delivering SL paging configuration information over the SL PC5 interface for out of coverage SL WTRUs. For example, SL paging configuration information 50, 51 may be relayed through any of a SL relay and a SL service provider to a remote WTRU that may be out of the RAN coverage, over the PC5 SL interface.

Figure 6:
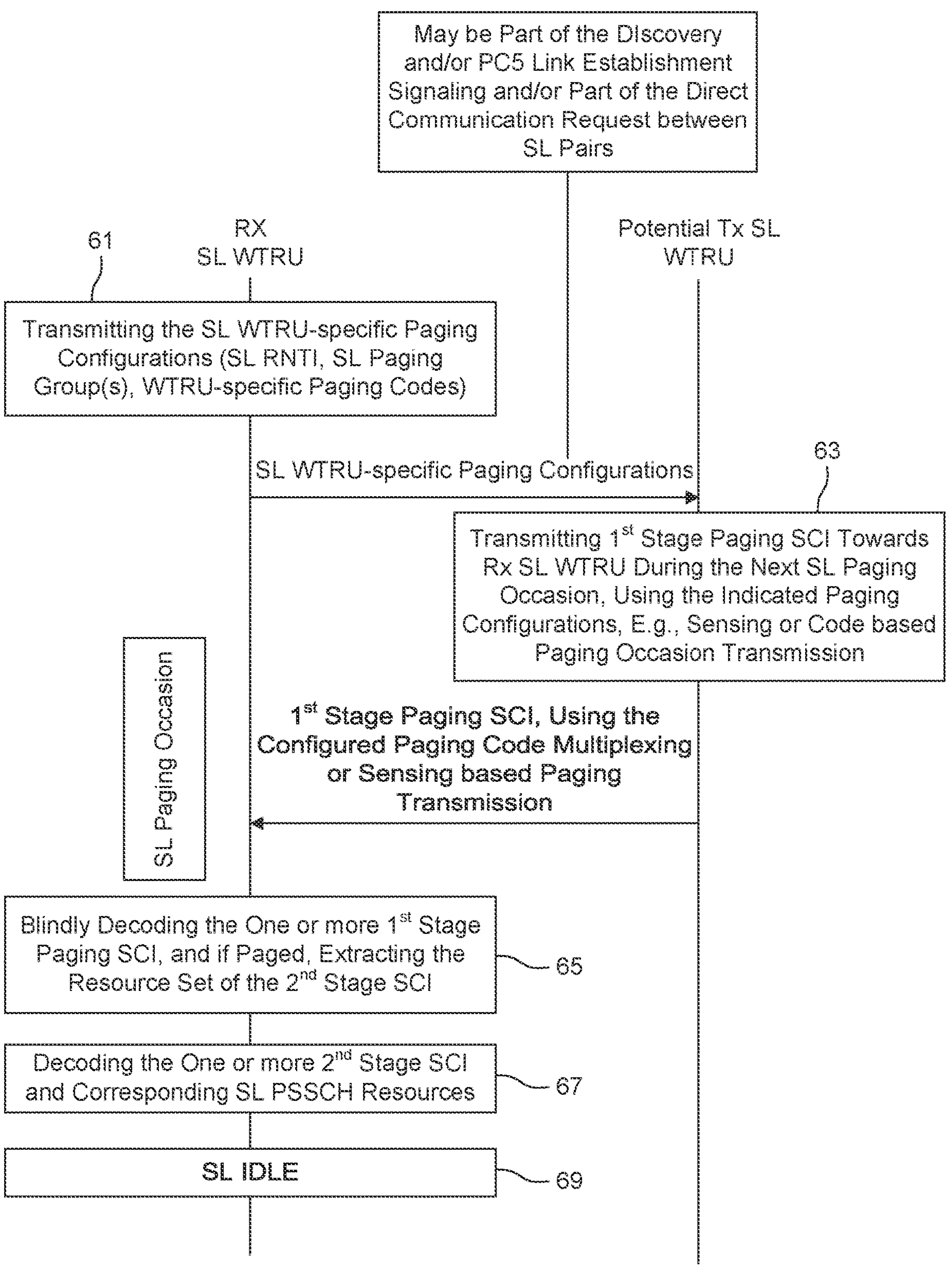
FIG. 6 is a diagram illustrating an example of a SL paging method.

FIG. 6 is a diagram illustrating an example of a SL paging method. For example, FIG. 6 illustrates an overall timeline of the SL paging method on a WTRU-specific basis, which may also be referred to herein as WTRU-based. Throughout embodiments described herein the terms "WTRU-specific" and "WTRU-based" may be used interchangeably. In that example, the Rx SL WTRU may receive its WTRU-specific SL paging configuration information from the RAN interface. For example, received WTRU-specific SL paging configuration information may include indication(s) of any of WTRU-specific SL paging occasions and corresponding SL paging multiplexing/scrambling codes. For example, in a step 61, the Rx SL WTRU may announce and transmit SL paging configuration information indicating those WTRU-specific configurations in any of unicast, multicast, and broadcast, to surrounding SL WTRUs that may be of interest to transmit to such Rx SL WTRU. Such announcement (e.g., SL paging configuration information transmission) may be part of any of configured discovery and link establishment signaling, for example, as specific (e.g., additional) information elements.

For example, in a step 63, a (e.g., potential) Tx SL WTRU may transmit a first stage paging SCI over a configured paging occasion corresponding to the Rx SL WTRU, using any of the CDM-based and the sensing-based paging mode.

For example, in a step 65, the Rx SL WTRU may blindly decode the configured SL paging occasion, to determine whether it has been paged or not.

For example, in a case where the SL-RNTI of the destination Rx SL WTRU has been detected, the Rx SL WTRU may decode, in a step 67, the corresponding second stage SCI and the associated SL payload on the PSSCH resources.

For example, in a case where no further SL HARQ retransmissions may be performed, the Rx SL WTRU may transition back to SL idle mode in a step 69, and may deep sleep, e.g., until the upcoming SL paging occasion associated with the SL Rx WTRU.

For example, a discovery message may include information objects (e.g., elements) such as e.g., any of ProSe application IDs which the announcing WTRU may be interested in, a WTRU identity (e.g., any of a SL-RNTI and a temporary mobile subscriber identity (TMSI)), an announce command and an indication of a PC5 technology over which the SL communication may occur (such as e.g., any of E-UTRA/NR and WLAN).

According to embodiments, WTRU-specific SL paging configuration information may be included and transmitted (e.g. or announced) by a SL WTRU as part of the configured discovery request signaling towards any of surrounding potential Tx SL WTRUs and SL service providers.

For example, a SL Rx WTRU may send a SL discovery message including a WTRU-specific SL paging configurations information object, which may include any of the following indications (e.g., information elements). (i) an indication of SL paging occasions, which may include any of the periodicity of the configured paging occasions and an indication of an activated SL occasion pattern, for example, in a case where multiple-paging occasions (e.g., patterns) are predefined (e.g., predetermined); (ii) any of SL-RNTIs, IDs of the SL WTRU groups, SL service and cast types which the SL WTRU may any of belong to and be interested in.

More generally, a SL Rx WTRU may send any of a discovery message, a PC5 link establishment message and a direct communication request message, including SL paging configuration information, which may indicate any of (e.g., configurations of) a plurality of paging occasions (e.g., including any of time and frequency resource information), and identifiers of any of the SL Rx WTRU, group(s) of WTRUs and SL services of interest.

According to embodiments, after transmission of any SL paging configuration information (e.g., in a discovery message), SL WTRUs may be able to announce (e.g., transmit a message indicating) any of their services, their SL groups of interest and the associated SL paging settings to reachable surrounding WTRUs. In a presence of a nearby SL service provider, a SL service provider WTRU may respond by sending a message including an adjusted (e.g., new optimized) set of the SL paging configurations (e.g., information) that may better fit several connected remote SL WTRUs. For example, the SL paging settings may be dynamically adapted based on an inter-SL WTRU coordination, as described herein.

Example of a Side-Link Proximity-Service-Based Paging Method

For example, NR SL may enable different examples of communication use cases such as e.g., any of SL group services, vehicle platooning, advanced driving, extended sensors, and remote driving.

In an SL group services example, a group of SL-WTRUs, may be interested in any number of SL services and applications, e.g., if the corresponding subscription allows such. SL group services may be deployed, for example, in any of airports, conferences, university campuses, schools, and malls. For example, SL WTRUs may be interested in (e.g., willing to receive) any number of the SL services that may be provided (e.g., offered, delivered) by any of a nearby SL service provider and a SL relay.

In an SL Platooning example, the SL service may enable the dynamic formation and management of vehicles in a platoon. For example, any of the inter-vehicle distance and QoS may be exchanged (e.g., transmitted between SL WTRUs) to dynamically adjust any of the platoon size and direction.

In an SL advanced driving example, the SL service may enable any of semi-automated and fully automated driving. The different reachable WTRUs (e.g., vehicles) may share the data that may be obtained from their local sensors in order to coordinate any of their driving intentions and maneuvers, e.g., to enhance the driving safety.

In an SL extended sensors example, the SL services may enable any of collecting and exchanging sensor data between different WTRUs (e.g., devices), which may not be in the form of vehicles. Devices may, for example, include any of roadside units, SL WTRUs of pedestrians, V2X application servers, etc.

In an SL remote driving example, the SL services may enable the teleoperated driving, for example, in a case where drivers may not themselves drive the vehicles in dangerous places such as e.g., risky construction sites.

In the above-described examples, a SL service may be provided (e.g., offered) by a SL service provider WTRU(s) and may be utilized (e.g., received) by SL service utilizing WTRUs. For example, SL WTRUs may be interested in receiving SL packets for a particular service or a subset of SL services (e.g., only), and may not be interested in receiving SL traffic for other SL services. For example, an autonomous driving pilot SL WTRU may be (e.g., mainly) interested in receiving any of multicast and broadcast SL updates associated with the application(s) (e.g., service(s)) of interest, such as e.g., any of relative positions, road maneuvers, inter-vehicle distance, relative speed, etc. For example, such SL WTRU may not be interested in receiving the SL traffic that may be broadcasted, for example, on the SL interface, and that may be associated with (e.g., relevant to), for example, a restaurant advertisements or platooning SL traffic.

Figure 7:
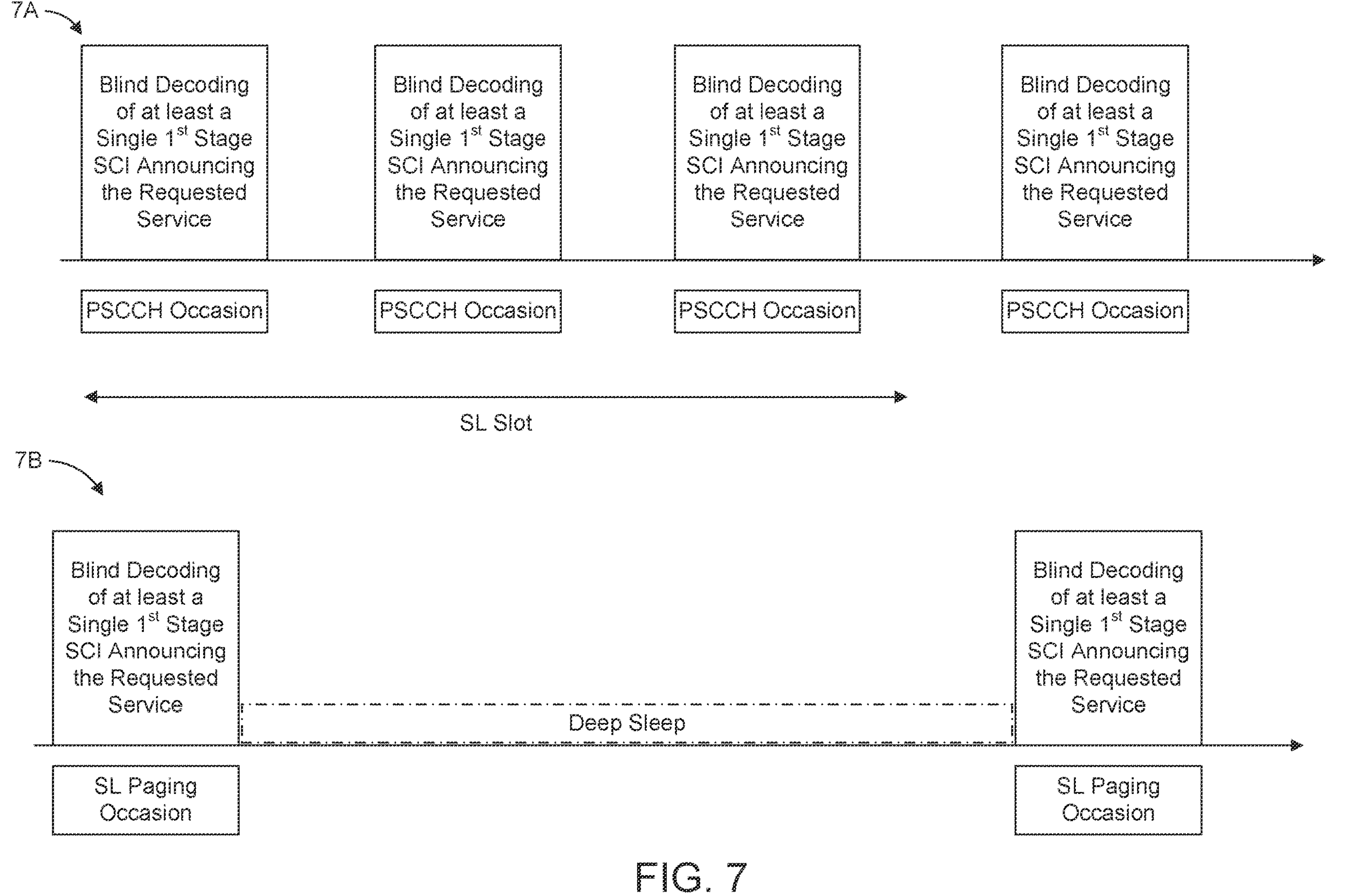
FIG. 7 is a diagram illustrating two examples of service independent SL paging.

FIG. 7 is a diagram illustrating two examples of service independent SL paging. In a first example 7A (illustrating SL service reception without applying a SL paging method), a SL WTRU which may be interested in a particular SL service, may monitor and blindly decode (e.g., each possible) PSCCH occasion within the SL slot. For example, the SL WTRU may determine whether at least a single first stage SCI transmission within those PSCCH occasions may be associated with (e.g., relevant to) the service of interest. After the SL WTRU may have determined that a first stage SCI transmission may be associated with a service of interest, the SL WTRU may decode the corresponding second stage SCI and respective PSSCH resources.

In a second example 7B (illustrating SL service reception applying a service independent SL paging method), a power-limited SL WTRU may not blindly decode (e.g., every possible) PSCCH opportunity within (e.g., each) SL slot. For example, the SL WTRU may deep sleep and (e.g., only) monitor the configured SL paging occasions, to determine whether at least a single first stage transmission may be associated with the service(s) of interest. For example, different SL services and applications may be associated with different end to end latency properties. For example, a latency property (e.g., expectation) may allow to prevent an outage to occur, e.g., a dangerous condition for autonomous driving to continue operating. For example, a common and SL service-independent paging procedure may lead to SL outage for one or more SL services. For example, for SL services with expected latency and reliability, reducing the frequency (e.g., the occurrences) of configured SL paging occasions may increase the SL end to end latency. For example, increasing the number of configured SL paging occasions may allow to enhance the reliability of such SL services and may increase the power consumption for other SL WTRUs that may not be interested in such SL services, and may monitor and blindly decode (e.g., all possible) service independent paging occasions.

Example of Proximity-Service-Specific SL Paging Method

FIG. 8 is a diagram illustrating an example of a SL (e.g., proximity) service specific paging method, which may also be referred to herein as any of a SL service dependent and a SL service-based paging method. Throughout embodiments described herein the terms “service specific” and “service-based” may be used interchangeably. According to embodiments, a service dependent SL paging method may be a SL paging method, where a SL paging configuration may be associated with a (e.g., particular available) SL service. For example, any number of paging occasions may be service specific (e.g., associated with a SL service). For example, two subsets 81, 82 of service specific SL paging occasions may be configured (e.g. and may correspond to two service specific SL paging configurations). The first subset 81 of SL paging occasions may comprise a lower number of (e.g., less frequent) SL paging occasions and may be applicable to latency-tolerant SL services. For example, a latency-limited SL service such as autonomous driving, may operate with (e.g., expect) more frequent SL paging occasions in order to reduce the end-to-end latency of the SL traffic corresponding to the indicated service. The second subset 82 of SL paging occasions may comprise a higher number of (e.g., more frequent) SL paging occasions. For example, the overall SL power saving gain may result from the fact that the power-limited SL WTRUs may (e.g., only) wake up and monitor the particular SL paging occasions associated with the SL service(s) of interest, and may be skipping (e.g., not monitoring, not decoding) the other SL paging occasions associated with the other services that may not be of interest.

Figure 9:
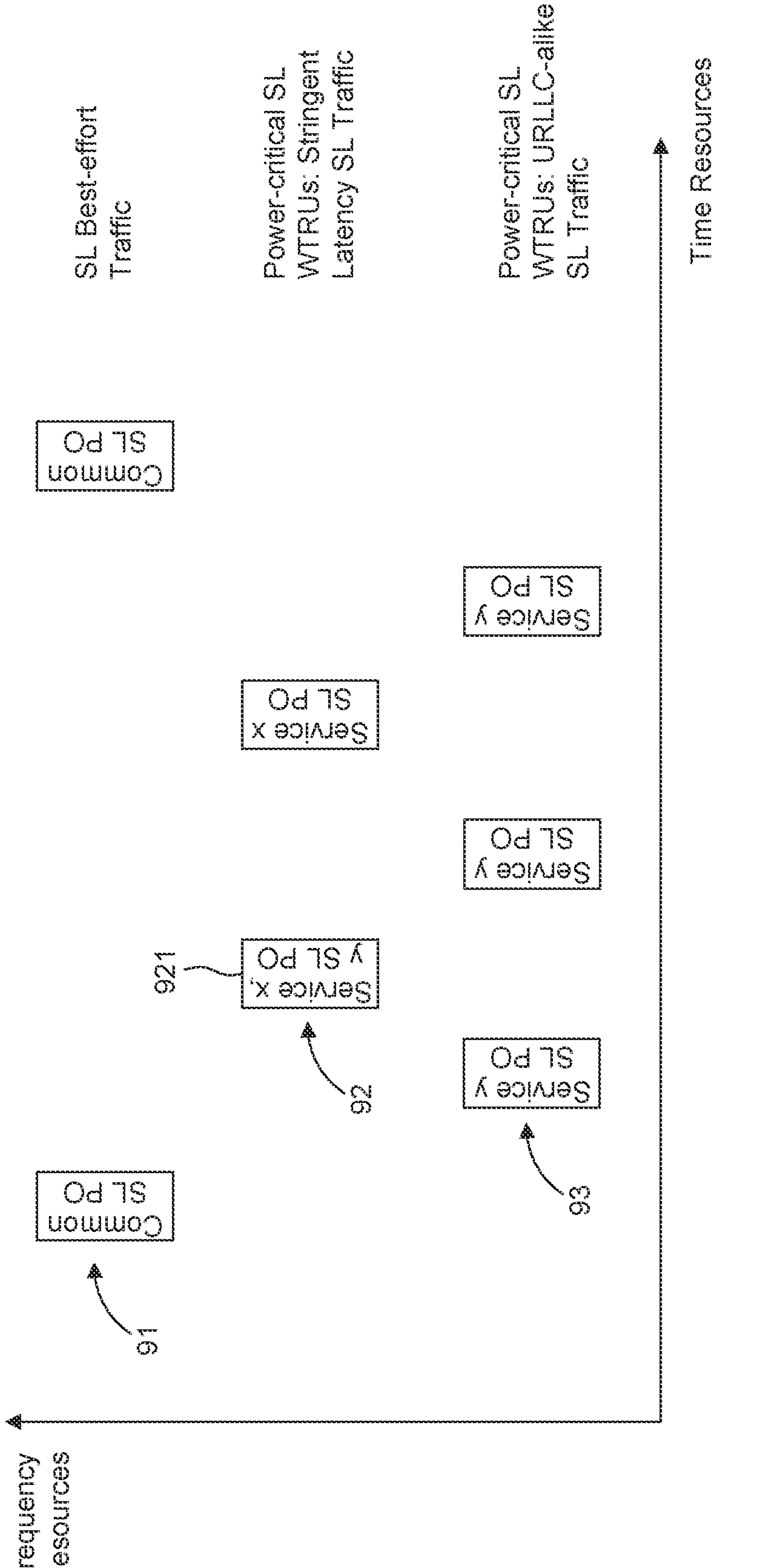
FIG. 9 is a diagram illustrating an example of a SL resource grid for service specific SL paging occasions.

FIG. 9 is a diagram illustrating an example of a SL resource grid for service specific SL paging occasions. For example, and without loss of generality, three different services may be available over the SL interface. A first configured subset of SL paging occasions 91 may be associated with best effort SL traffic, for example corresponding to any of entertainment, statistical, and ads applications. For example, the SL paging occasion resources may be lowered (e.g., relaxed) to a level allowing the interested SL WTRUs to obtain a (e.g., decent) power saving gain. In another example, in a case where the SL service is associated with more stringent latency and reliability conditions such as e.g., platooning services, a second subset of (e.g., service specific) SL paging occasions 92 may be more frequent to shorten the associated end to end SL latency. For a URLLC-alike SL service such as autonomous driving, the SL link reliability and latency may not be relaxed and/or traded off for a decent power saving gain. For example, a third subset of SL paging occasions 93 may be associated with the URLLC-alike SL service. The associated third subset of SL paging occasions 93 may be dense in the time domain such that those service specific SL transmissions/updates may not likely to be missed by some power-limited SL WTRUs, based on their deep sleeping periods.

For example, (as illustrated by FIG. 9), some 921 of the configured SL paging occasions 92, 93 may be shared between various SL services at the same time. This may, for example allow to reduce the complexity of the implementation and to reduce the amount of the reserved SL resources for the paging channels.

Example of Proximity-Service-Specific SL Paging Method Message Exchange

According to embodiments, the service specific SL paging method may be based on message exchange (e.g., transmissions) comprising procedural signaling and associated information elements that may be any of signaled and relayed to the power-limited SL (e.g., SLR) WTRUs. For example, a SL WTRU may receive from a RAN (e.g., a serving base station) node service-based SL paging configuration information (which may also be referred to herein as service specific SL paging configuration information).

For example, service-based SL paging configuration information may include an indication of the resources of the prose-service-specific SL paging occasions. For example, service-based SL paging configuration information may include an indication of any number of resource patterns and an indication of the selected SL paging patterns that may be associated with the corresponding SL service ID(s).

For example, service-based SL paging configuration information may include an indication of the associated service specific IDs to which subsets of SL paging occasions may be relevant. For example, the service-based SL paging configuration information may indicate which (e.g., subsets of) SL paging occasions may be associated with which service(s) (e.g., ID(s))

For example, service-based SL paging configuration information may include an indication of a SL carrier ID over which the corresponding SL paging configuration(s) may be applied.

For example, a (e.g., power-limited) SL WTRU, which may be SL paging capable, may receive a message including SL paging configuration information (e.g., that may be service specific). For example, (e.g., depending on SL service(s) of interest) the SL (e.g., power-limited) WTRU may wake up and monitor (e.g., blindly decode) any of the service specific and service-shared SL paging occasions associated with a service (e.g., of interest) based on the received SL service specific paging configuration information. For example, the WTRU may obtain a power saving gain depending on the SL services of interest and on the latency and reliability characteristics. For example, the power saving gain that may be obtained, may be isolated among (e.g., be independent from) other power-limited SL WTRUs that may request different SL services with e.g., different SL link properties.

According to embodiments, a service specific SL paging method may be based on a SL paging method as described herein, without defining multiple service specific dedicated or shared SL paging occasions (e.g., without associating subsets of (dedicated or shared) paging occasions with SL service(s). In such a case a SL WTRU that may request different SL services, may monitor and blindly decode (e.g., each possible) configured SL paging occasion. For example, SL paging configuration information (e.g., that may be received from any of a RAN node and a SL relay), may further include an indication of any of the SL RNTI and scrambling codes associated with (e.g., each) SL service(s).

For example, a SL Tx WTRU may scramble first stage SCI messages, that may be transmitted during the configured SL paging occasions, with the signaled service specific scrambling code (e.g., the code that may be associated with the SL service). For example, an idle SL WTRU may monitor a (e.g., each) configured SL paging occasion, e.g., for the services of interest, using the associated scrambling codes. In a case where a SL WTRU obtains (e.g., calculates) a correct CRC by using the indicated scrambling code for a service of interest, the SL WTRU may determine (e.g., identify) it is paged for a SL service of interest. The SL WTRU may decode the second stage SCI and respective PSSCH resources for receiving the SL traffic corresponding to the service of interest.

According to embodiments, a RAN (e.g., serving base station) node may transmit proximity-service-specific SL paging configuration information, including any of the configured resources for SL paging occasions, an indication to activate a SL paging occasion pattern from a (e.g., predefined) set of paging occasion patterns, the SL services (e.g., and/or service IDs) that may be associated with the (e.g., each) paging occasion(s), and the SL carrier ID to which those configurations (e.g., parameters) may be applicable. For example, an idle SL WTRU may deep sleep and may monitor (e.g., based on blind decoding) the configured SL paging occasions that may be associated with any SL service(s) of interest.

Figure 10:
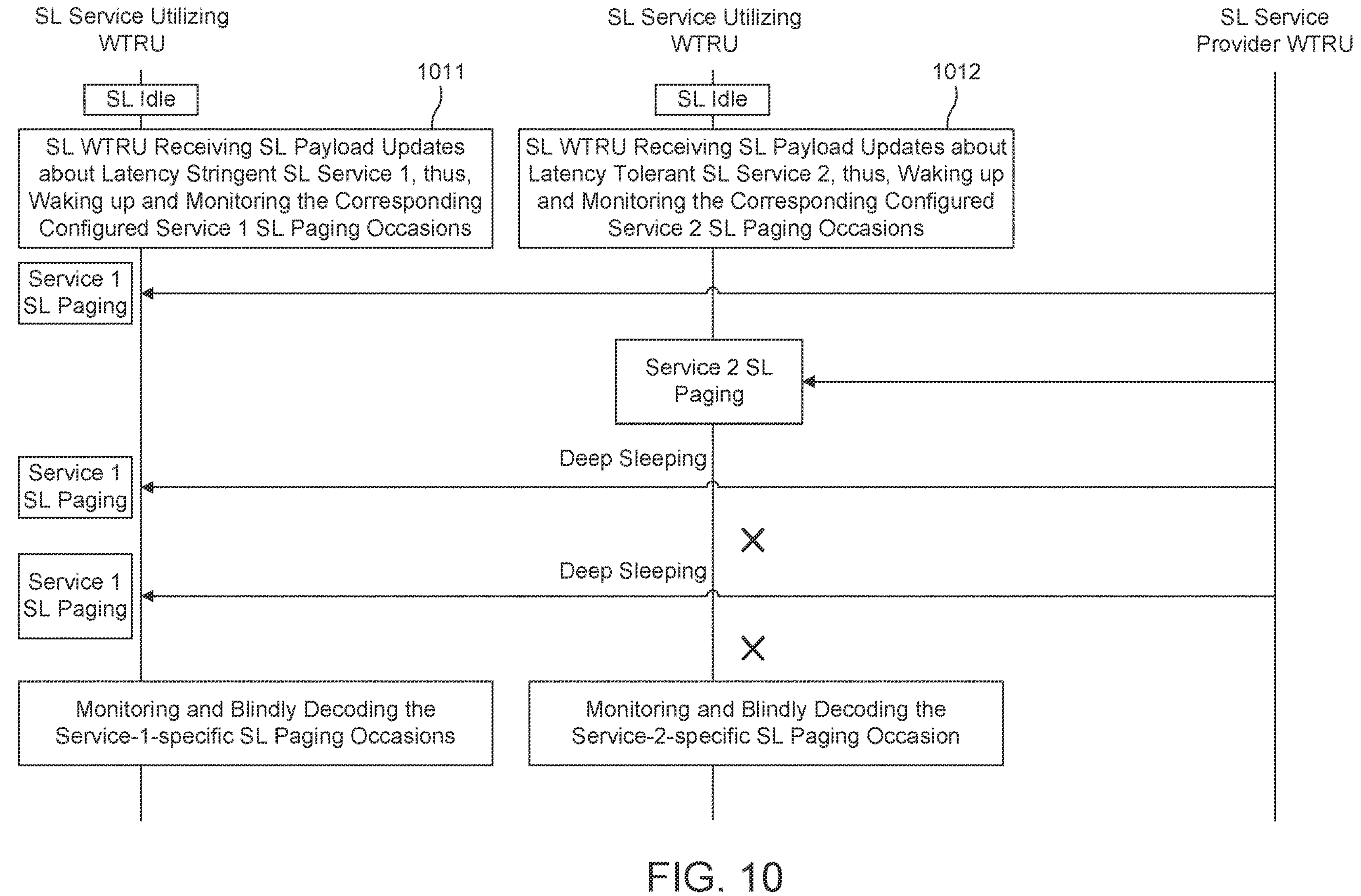
FIG. 10 is a diagram illustrating an example of a service specific SL paging method.

FIG. 10 is a diagram illustrating an example of a service specific SL paging method. For example, two SL services with different latency and reliability characteristics may coexist. The first SL service may have more stringent latency and reliability characteristics than the second SL service (which may demand a relaxed latency SL communication). For example, a first WTRU that may be interested in the first SL service may receive an update message 1011 including first service SL specific configuration information. For example, a second WTRU that may be interested in the second SL service may receive an update message 1012 including second service SL specific configuration information. For example, there may be more (e.g., frequent) configured first service specific SL paging occasions (e.g., than configured second service specific SL paging occasions) to reduce the end-to-end SL latency of the first service SL traffic. For example, as the second SL service may be best effort, less frequent SL paging occasions may be configured for such service to trade off the link latency with a (e.g., decent achievable) power saving gain. For example, the SL WTRU, requesting a latency-tolerant SL service, may not monitor the frequent SL paging occasions associated with other (e.g., more stringent) SL services, allowing to improve the power saving for the SL WTRU.

Example of SL Group-Specific Proximity-Service-Specific Paging Method

According to embodiments, a service provider SL WTRU may provide (e.g., offer) different SL services. For example, for a (e.g., each) SL service, there may be any number of any of applications, preferences, and subservices. For example, a service provider SL WTRU in an airport may provide entertainment services such as e.g., any of restaurant ads, store sales, and flight tracking services, etc. For example, reachable SL WTRUs may be interested in those various subservices.

Figure 11:
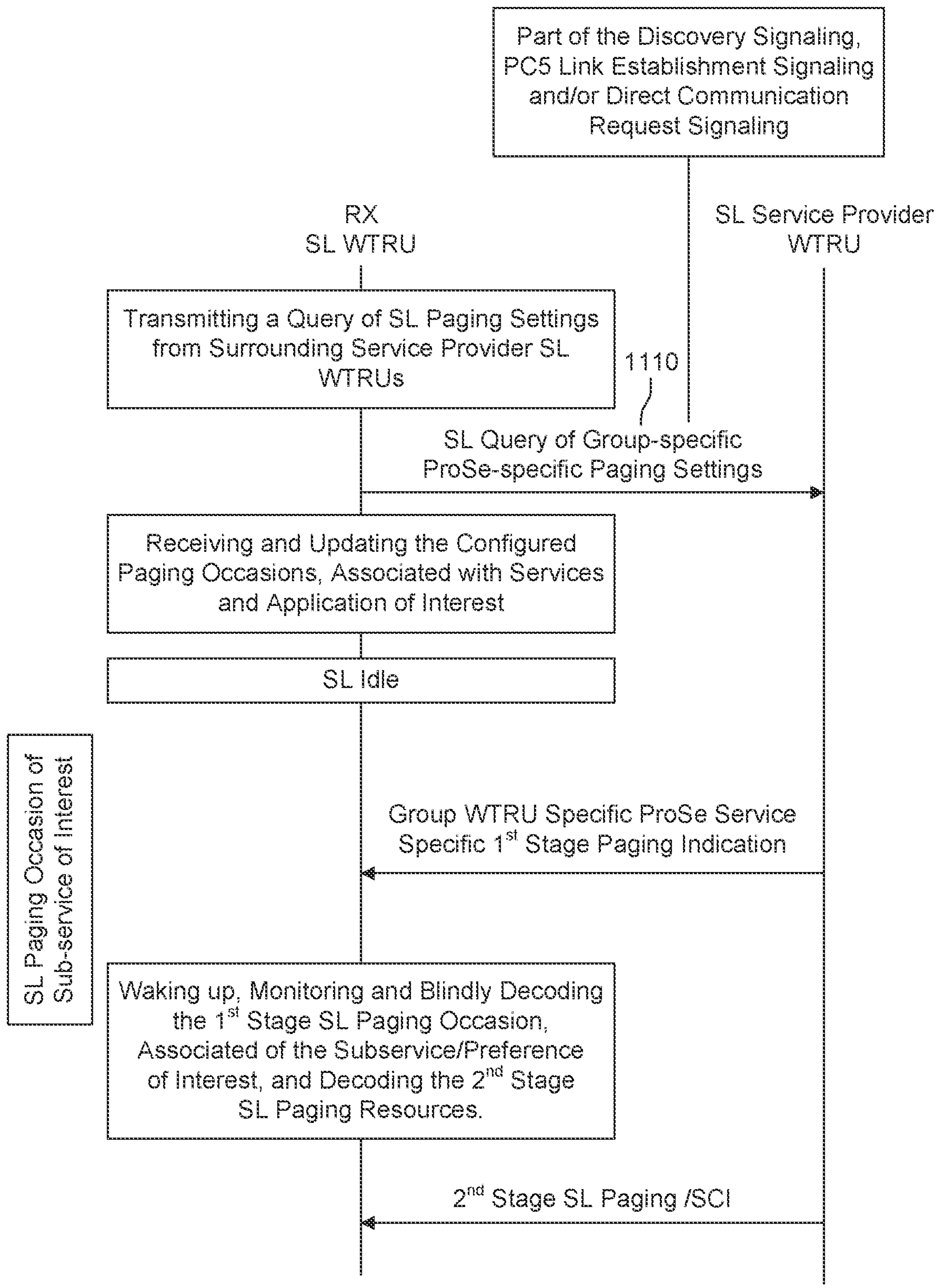
FIG. 11 is a diagram illustrating an example of a group-WTRU ProSe service specific paging method.

FIG. 11 is a diagram illustrating an example of a group-WTRU ProSe service specific paging method, which may also be referred to herein as a group-based method. Throughout embodiments described herein the terms "group-specific" and "group-based" may be used interchangeably. For example, a SL group-specific request message 1110 may be transmitted by source SL WTRU(s). For example, the SL group-specific request 1110 may be a discovery message that may be part of the discovery signaling, on the configured discovery resources. In another example, the SL group-specific request 1110 may be any of a link establishment message that may be part of the afterwards PC5 link establishment, and a direct communication message that may be part of the direct communication request signaling.

For example, an (e.g., available) service provider SL WTRU may respond with (e.g., send a response message including SL paging configuration information indicating) the group-specific ProSe service specific SL paging occasions (e.g., according to any embodiment described herein).

For example, group-specific ProSe service specific SL paging configuration information may indicate a (e.g., subset of) paging occasion(s) that may target (e.g., be used for paging, be associated with) a group (of e.g., any of WTRUs, services, and subservices). For example, a SL service provider may provide (e.g., deliver, offer) a service that may comprise any number of sub-services. Grouping a plurality of subservices (e.g., of a same service), and associating a (e.g., subset of) paging occasion(s) with a group of subservices may allow a SL WTRU (e.g., interested by the sub-services of the service) to be (e.g., efficiently) paged via the (e.g., associated) subset of paging occasion(s). For example, the response message may be any of a discovery response message and a link establishing (e.g., acceptance) message that may be part of the (e.g., discovery, link establishment) signaling. For example, the source SL WTRU may transition back to SL idle, may deep sleep, and may monitor the SL paging occasion(s) which may be associated with subservices of interest.

Figure 12:
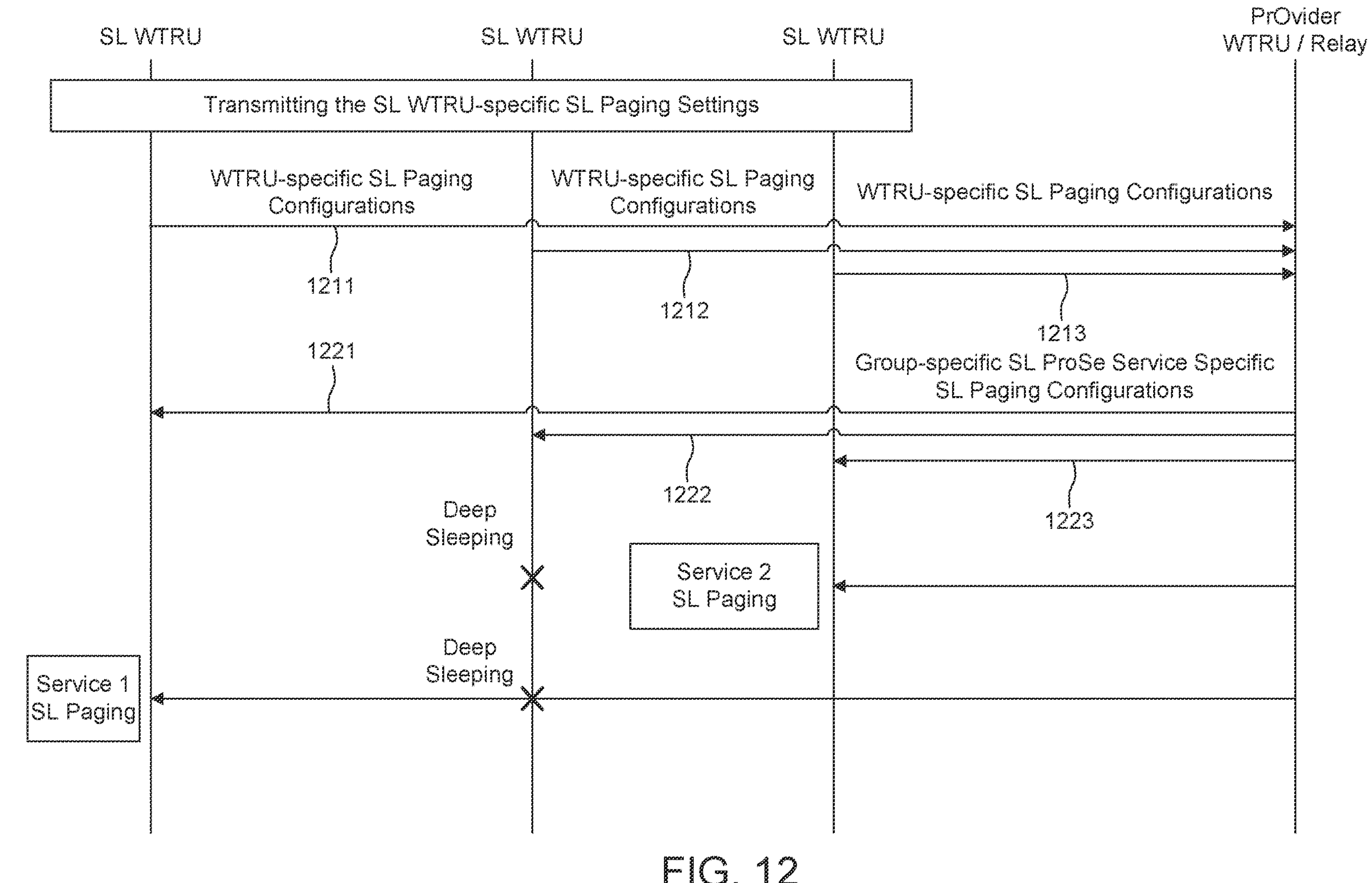
FIG. 12 is a diagram illustrating an example of a dynamic coordination of ProSe service specific paging configurations.

FIG. 12 is a diagram illustrating an example of a dynamic coordination of ProSe service specific paging configurations. For example, several SL WTRUs may have been configured by (e.g., receiving) WTRU-specific SL paging configuration information according to any embodiment described herein (e.g., indicating repeated paging occasions). For example, SL WTRUs may approach the coverage (e.g., area) of a service provider SL WTRU which may provide (e.g., offer) any number of SL services of interest. For example, SL WTRUs may perform (e.g., trigger) a discovery procedure and announce their WTRU-specific preferred SL paging configurations in WTRU-specific paging announcements. For example, the SL WTRUs may include information indicating their WTRU-specific preferred SL paging configurations in a discovery signaling message 1211, 1212, 1213. For example, the SL service provider WTRU may receive WTRU-specific paging announcements (e.g., including SL paging configurations (e.g., preferences)). For example, the SL service provider WTRU may determine (e.g., define) the ProSe service specific configuration(s) which may best satisfy (e.g., match) the received WTRU-specific SL paging settings (e.g., information). For example, the SL service provider WTRU may send a response message 1221, 1222, 1223 including the determined ProSe service-specific SL paging settings (e.g., configuration information) to the respective SL WTRUs. For example, the response message may be any of a discovery response message and a link establishment message. For example, the SL WTUs may wake up, may monitor and may blindly decode (e.g., only) the SL service specific paging occasion which may be associated with the SL service(s) of interest.

Figure 13:
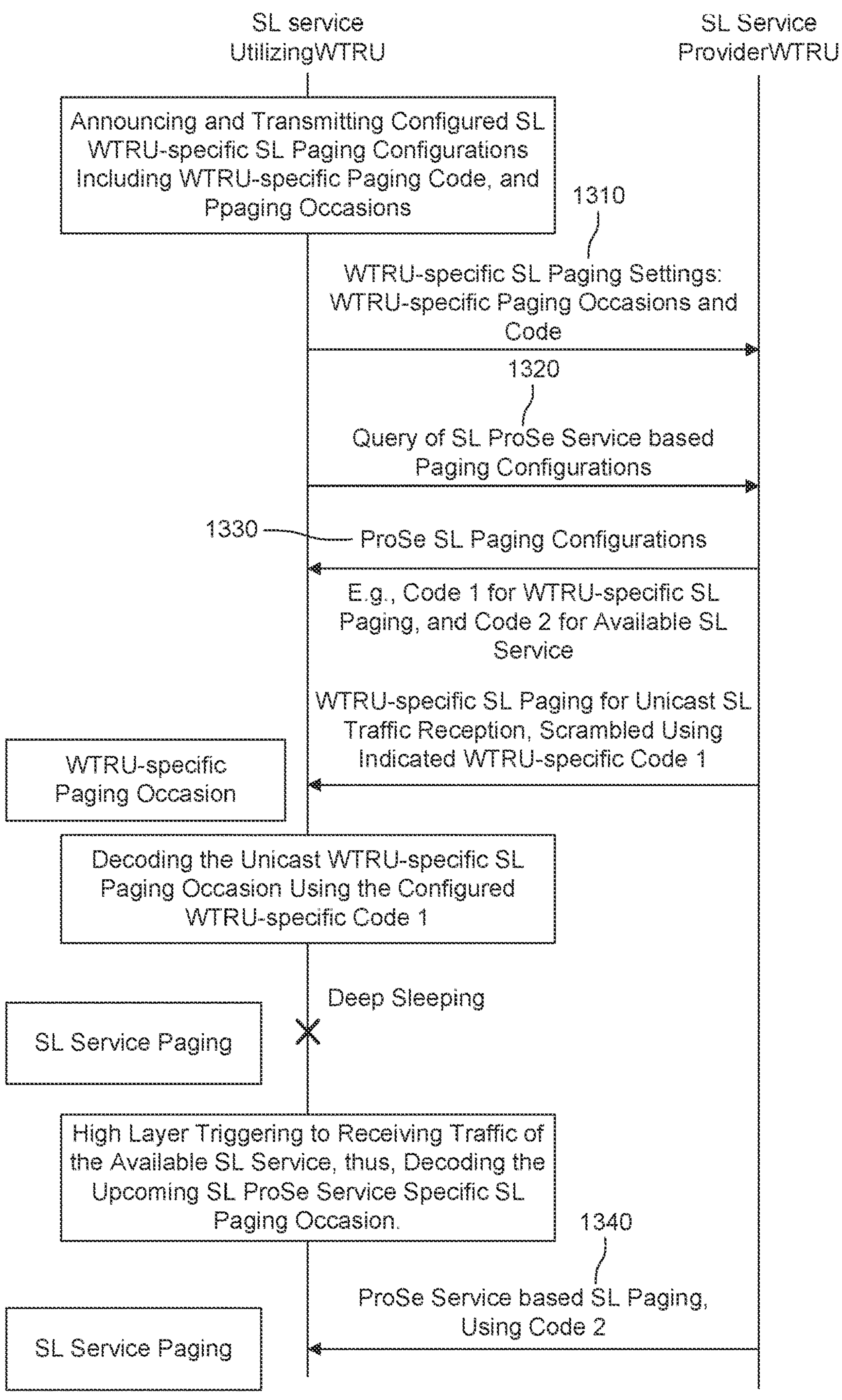
FIG. 13 is a diagram illustrating an example of a SL multi paging method.

FIG. 13 is a diagram illustrating an example of a SL multi paging method. For example, a SL WTRU may approach (e.g., enter in) the coverage (e.g., area) of a SL service provider WTRU, and may announce (e.g., transmit) a message 1310 indicating its WTRU-specific SL paging settings (e.g., including SL paging configuration information). This may include the WTRU-specific paging codes that the SL WTRU may monitor for different cast receptions and the corresponding SL paging occasions. For example, the SL WTRU may transmit a query message 1320 for requesting the SL paging settings (e.g., SL paging configuration information) of the available SL services, that may be provided (e.g., offered) by the service provider. Those announcement messages 1310, 1320 may be any discovery message of the discovery signaling (e.g., procedure) where the SL WTRU may identify (e.g., determine) which services may be offered by the service provider SL WTRU and the respective paging settings. For example, the service provider SL WTRU may respond back with (e.g., transmit a response message 1330 indicating) the SL paging settings of (e.g., SL paging configuration information dedicated to) the available SL service. For example, the service provider SL WTRU may indicate the source SL WTRU (e.g., associated) with the ProSe service-specific code(s) that may be monitored to receive the SL traffic for such service and the respective (e.g., associated) ProSe service paging occasions.

For example, based (e.g., depending) on the high layer triggers (such as e.g., an executed application that may request SL traffic updates of such service), the SL WTRU may be interested (e.g., willing) to receive available SL service. For example, the SL WTRU may wake up and decode the ProSe service specific paging occasions 1340, based on the signaled (e.g., received ProSe service-specific codes).

Example of SL Two-Stage SL Paging Including an Early Paging (e.g., Wake-Up) Paging for Idle Mode SL WTRUs According to embodiments, an idle SL WTRU may blindly decode (e.g., each of) the (e.g., service specific) SL paging occasions, which may include scheduled transmissions from any number of other Tx SL WTRUs to other Rx SL WTRUs. Those blind decoding's may be a burden, from the power consumption perspective. Embodiments described herein may allow to further improve power consumption for the SL WTRUs which, for example, may have an (e.g., average) low rate of packet receptions, by e.g., enabling them to not monitor (e.g., all possible) SL paging occasions. For example, an early SL paging SCI (e.g., wake-up) may be configured (e.g., transmitted) with a SL search space that may be e.g., more limited (reduced) with regards to the SL space corresponding to (e.g., all possible) SL paging occasions. This may be performed by a two-stage SL paging procedure (e.g., comprising two stage SL paging transmissions). For example, a first paging stage (e.g., transmission) may signal (e.g., indicate) an idle SL WTRU any of with which WTRU groups and with which SL service the idle SL WTRU may be paged. For example, the first paging stage (e.g., transmission) may indicate the corresponding resources (e.g., IDs) of any number second paging stage occasions. For example, an early SL paging SCI that may be transmitted (e.g., received) during the first stage paging, may include (e.g., carry) an indication of whether there is a potential SL paging coming for any of at least one SL WTRU, at least one SL service, and that may correspond to an activated SL paging occasion during the second stage paging. For example, the early SL paging SCI may be scrambled by any of the WTRU-specific ID (e.g., SL RNTI), SL WTRU-group-based ID (e.g., SL-RNTI), and SL service (cast)-specific ID (e.g., SL-RNTI(s)). In another example, the early SL paging SCI may be scrambled by a common identifier (e.g., RNTI) which may be targeted for (e.g., all) SL WTRUs e.g., without dedicated scrambling.

Figure 14:
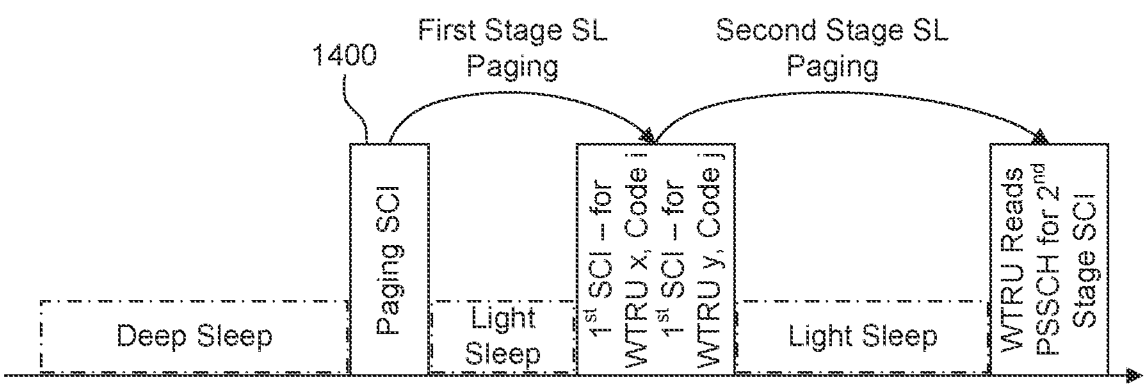
FIG. 14 is a diagram illustrating an example of an early SL paging of a limited SL search space.

FIG. 14 is a diagram illustrating an example of an early SL paging (e.g., wake-up) of a limited SL search space. FIG. 14 illustrates an example of a service-independent SL two-stage paging, where the early SL paging SCI may be enabled with the corresponding SL search space. For example, an idle SL WTRU may (e.g., always) monitor the early paging SCI search space 1400. In a case where the idle WTRU belongs to at least one SL-RNTI(s) (e.g., a multicast SL-RNTI group), the idle SL WTRU may further blindly decode the (e.g., current) SL paging occasion, during the second stage paging, to determine (e.g., identify) whether it has been SL paged or not, and accordingly to extract the scheduled first stage SCIs of interest. In a case where it is determined that none of the configured SL-RNTIs have been SL paged (e.g., in the early SL paging occasion 1400), the SL WTRU may remain in idle mode and may not blindly decode the (e.g., current) full SL paging occasion. This may allow to further improve the SL WTRU energy consumption. Any of the search space and (e.g., timing) resources of the early SL paging SCI may be configured from the RAN (e.g., serving base station) node and transmitted any of (e.g., directly) to the SL WTRUs on the RAN interface and relayed to the SL WTRUs using an SL relay e.g., on the PC5 SL interface. For example, any of the search space and (e.g., frequency/timing) resources of the early SL paging SCI may be included in SL paging configuration information that may be received by any SL WTRU from any of the RAN (e.g., serving base station) node and a relay.

For example, for a service specific two-stage SL paging, the early SL paging SCI may be scrambled with the service specific ID (e.g., RNTI) such that any (e.g., all) SL WTRU(s) may be able to determine (e.g., identify) whether that SL service of interest (e.g., among any number of services) is paged. For example, a SL WTRU may decode any number of second-stage paging occasion(s) for receiving that service of interest. For example, SL WTRU(s) that may not be interested in any of the (e.g., early) paged SL services may transition back to deep sleeping, skipping the second-stage paging occasion(s).

Figure 15:
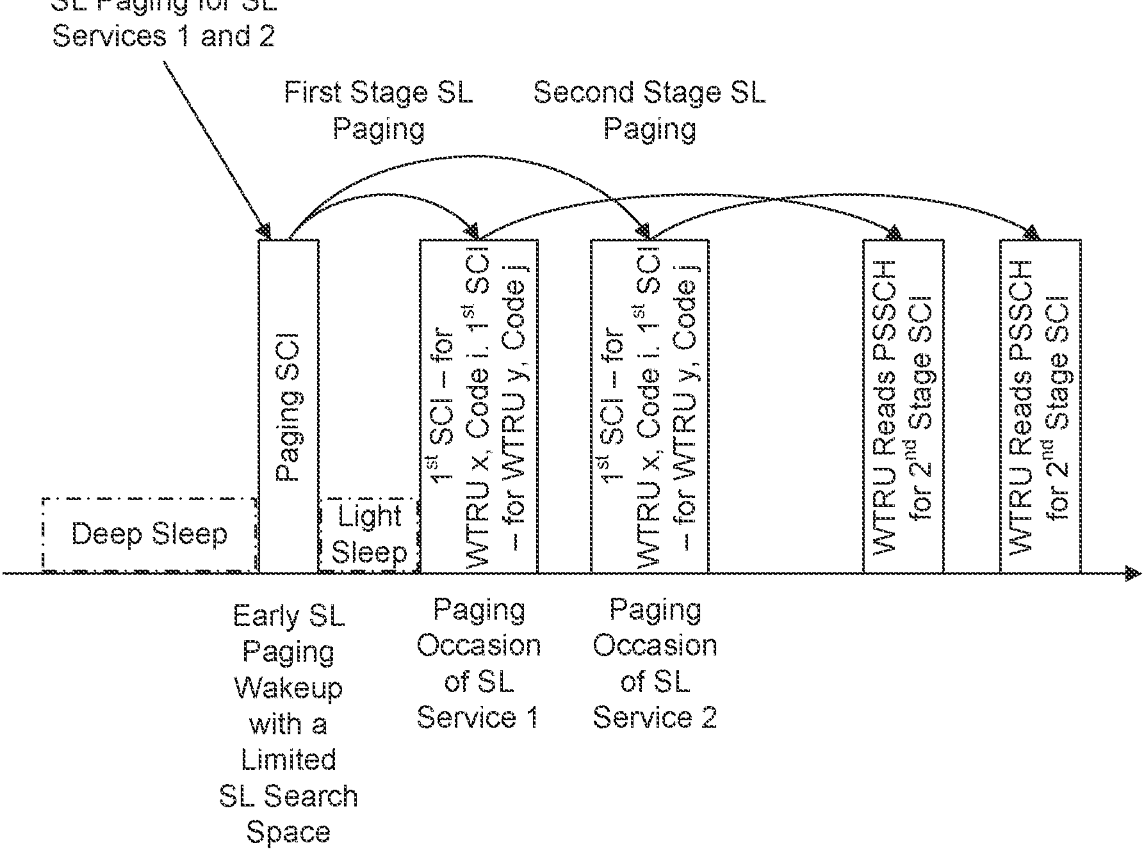
FIG. 15 is a diagram illustrating an example of a service specific two stage SL paging method.

FIG. 15 is a diagram illustrating an example of a service specific two stage SL paging method. There may be different possibilities for a SL WTRU to determine (e.g., identify) the resources of the second-stage service specific paging occasions with a two stage SL paging method.

In a first example, after receiving and detecting any number of SL paging indication(s) for any number of SL service(s) in (e.g., during) the first stage paging SCI, a SL WTRU may search and decode the second-stage paging based on e.g., the (e.g., preconfigured) service specific paging occasions, that may have been received in (e.g., service specific) SL paging configuration information. The SL WTRU may determine (e.g., identify) the PSSCH data resources carrying the traffic of the SL service(s), by decoding the second-stage paging. For example, service specific SL paging configurations may be received from any of the RAN (e.g., serving base station) node and available SL relays.

In a second example, after receiving and detecting any number of SL paging indication(s) for any number of SL service(s) in (e.g., during) the first stage paging SCI, (e.g., each of) the received early paging SCI may include (e.g., early paging SCI) information indicating the corresponding service specific second-stage paging occasion(s) to be decoded by any WTRU that may be interested in those services. The (e.g., early paging SCI) information (e.g., resource indication) may indicate any of the timing and frequency resources of the subsequent service specific occasion(s). In another example, a (e.g., predefined) set of second-stage paging resources may be configured, and the early paging SCI may (e.g., only) indicate the index of the activated second-stage paging resources for the associated SL service. For example, including information in the early paging SCI to indicate service specific second-stage paging occasion(s) to decode may increase the size of the first stage (e.g., early paging) SCI (e.g., due to the additional carried information).

Figure 16:
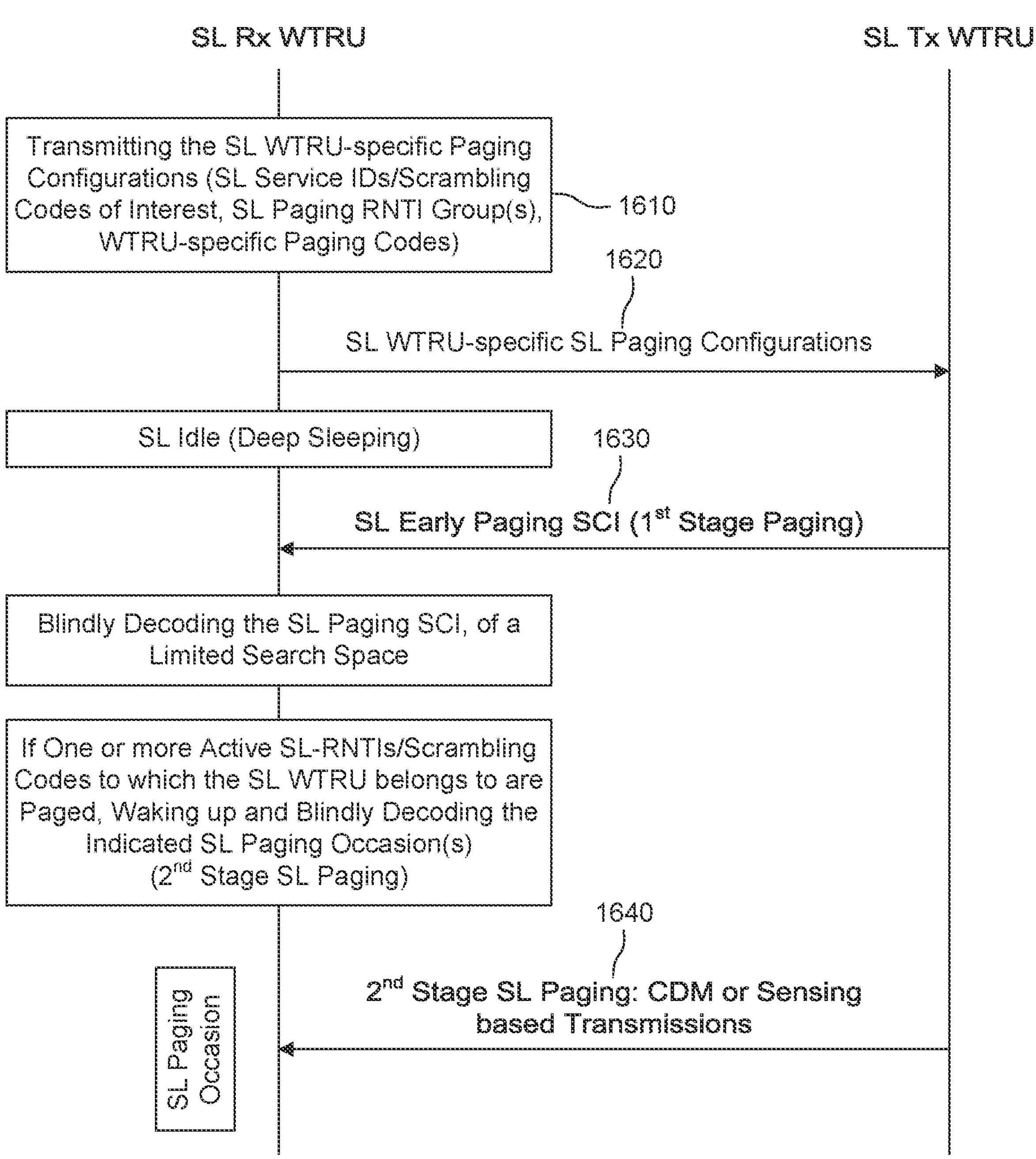
FIG. 16 is a diagram illustrating an example of an information flow for transmitting an early SL paging SCI.

FIG. 16 is a diagram illustrating an example of an information flow for transmitting an early SL paging SCI. For example, in a step 1610, any of a RAN node and a SL relay may transmit configurations for two-stage SL paging. For example, two-stage SL paging may include an early SL paging (e.g., wake up) SCI. The configurations for two-stage SL paging may be referred to herein as any of early SL paging configuration information and early SL paging SCI information. For example, early SL paging configuration information may include any of the SL search space (Tx/Rx resource pools) over which the SL early paging SCI indication may be sent by potential SL Tx WTRUs (e.g., first stage paging), the scrambling codes associations with any of SL WTRU groups, and SL services. In a case where resource patterns are enabled (e.g., configured), early SL paging configuration information may include the resource patterns of the service specific SL paging occasions (e.g., second stage paging). For example, early SL paging configuration information may include, an indication, as part of the paging SCI, to activate a second-stage service specific paging occasion. For example, early SL paging configuration information may include an indication of the carrier ID with which the SL early paging SCI configuration(s) may be associated.

For example, a SL Rx WTRU may transmit a message 1620 including SL WTRU specific early SL paging configuration information to a (e.g., potential) SL Tx WTRU, based on the received early SL paging configuration information. For example, an idle SL WTRU may monitor and blindly decode the configured first stage SL paging 1630, e.g., based on the SL early paging search space. For example, the idle SL WTRU may determine whether there is an early SL page for any of any number of SL WTRU(s) and any number of service(s). In a case where any of a SL RNTI group(s) and a SL service(s) to which the SL WTRU may belong (e.g., may be associated with) is (are) SL paged, the SL WTRU may monitor and blindly decode (e.g., transmissions) 1640 in the indicated SL second-stage paging occasion. For example, other SL WTRUs, belonging to (e.g., associated with) any of non-paged SL RNTI group(s) and non-paged services, may skip monitoring the next SL paging occasion(s).

Example of Side-Link On-Demand Synchronization

According to embodiments, an idle SL WTRU may remain synchronized with any of the RAN interface and the SL PC5 interface (e.g., via a SL relay). For example, RAN out of coverage SL WTRUs may retain synchronization with the SL interface by detecting SL-SSBs, that may be transmitted from any number of SL WTRUs, such as e.g., the synchronization reference WTRU (which may be referred to herein as SynchRefUE). For example, a SL WTRU may re-sync with the SL interface by searching and detecting the available SL-SSBs for the other SL WTRUs, e.g., based on periodic partial sensing. For example, in a case where an idle SL WTRU is SL paged according to embodiments described herein, the idle SL WTRU may any of lose synchronization and retain a coarse synchronization with the SL interface due to the deep sleeping times, especially in situations where the waking up time (where the 1st stage SL paging may be detected) for the SL paging opportunity may be aligned with the time where there may not any available SL-SSBs that may be reachable. For example, the SL WTRU may not be able to re-sync with the SL interface and may not be able to detect and blindly decode the SL early paging SCI nor the SL paging occasion. For example, the SL idle WTRU may wake up prior to (e.g., each) paging occasion(s) by an amount of time that may enhance the probability of retaining the synchronization with the SL interface, by e.g., any of detecting available reachable SL-SSB(s) and using the SynchRefUE self-promotion approach.

In a first example, an SL WTRU may retain synchronization of the SL interface by detecting early paging SCI sequences, according to any embodiment described herein. For example, the early paging SCI sequences may be a multiplexed set of CDM sequences, where a (e.g., each) sequence may target paging any of a SL WTRU-group and a SL service. Detecting CDM sequences may enable an idle SL WTRU to regain (e.g., keep) the synchronization of the SL interface, for example, in a case where there is no other available synchronization source.

Figure 17:
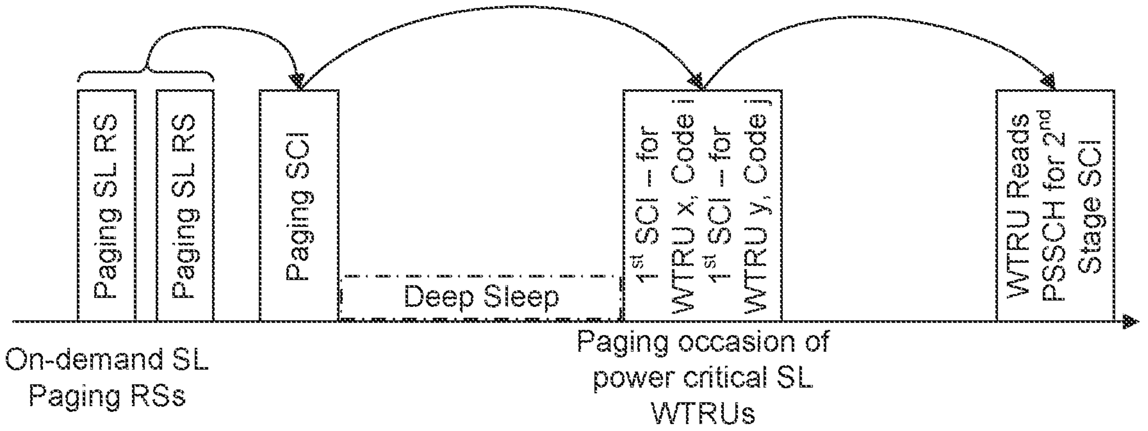
FIG. 17 is a diagram illustrating an example of on demand SL reference signals for a SL paging method.

In a second example, (e.g., in a case where early paging SCI transmission is not enabled), any SL (e.g., active) Tx WTRU, which may be transmitting any of the SL paging occasion and the early paging SCI, may transmit an assisting set of the SL paging reference signals, as described herein FIG. 17 is a diagram illustrating an example of on demand SL reference signals for a SL paging method. For example, the resource sets of the SL paging-specific reference signals may be configured and signaled by the RAN (e.g., serving base station) node. For example, SL paging configuration information (e.g., that may have been received from e.g., the RAN node), may include synchronization information that may indicate resource sets for SL paging-specific reference signals). According to embodiments, an idle SL WTRU may wake up (e.g., slightly) prior to any of (e.g., each of) the configured early paging SCI and a SL paging occasion, to detect the SL paging-specific reference signals, and to determine whether they have been SL paged or not.

Figure 18:
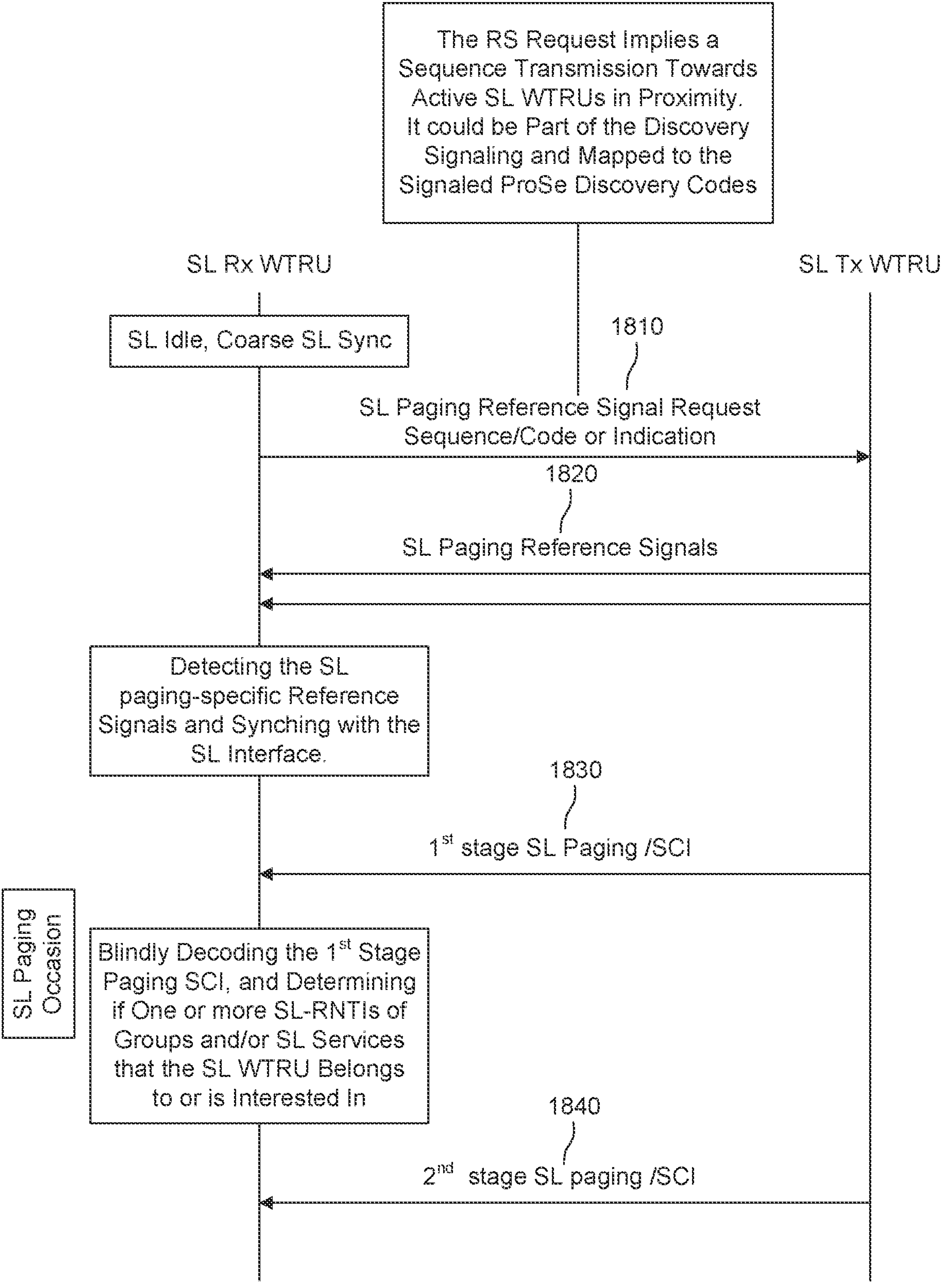
FIG. 18 is a diagram illustrating an example of a SL paging method with on-demand SL reference signals for SL paging.

FIG. 18 is a diagram illustrating an example of a SL paging method with on-demand SL reference signals for SL paging. According to embodiments, the RAN node may transmit the configurations of the SL paging-specific reference signals. For example, the configurations of the SL paging-specific reference signals may be referred to herein as SL paging synchronization information that may be included in SL paging configuration information that may be received from the RAN (e.g., serving base station) node. For example, SL paging configuration information may include any of a default SL paging reference signal pattern, and any number of configuration sets of SL paging reference signal occasions. In a first example, any of a SL synchronization reference WTRU and a SL Tx WTRU (e.g., that may transmit SL paging SCI) may (e.g., always) transmit the configured SL paging reference signal pattern for idle SL WTRUs. In a second example, an idle SL WTRU may transmit a SL paging reference signal (e.g., sequence) request message 1810 that may include an indication of a (e.g., requested) reference signal pattern, (e.g., to be used for recovering from loss of SL synchronization). For example, active SL WTRU(s) may receive (e.g., and decode) the reference signal request message 1810. For example, an active SL WTRU may transmit the SL reference signals 1820 over the indicated reference signal resources. For example, an idle SL WTRU may detect the SL paging-specific reference signals prior to any of first stage paging 1830 and SL paging occasion 1840.

According to embodiments, a source SL WTRU may transmit, e.g., over the PC5 interface, a request for (e.g., transmission of) SL paging specific reference signals (which may be referred to herein as any of a request for SL paging reference signals and a SL reference signal request). The request transmission may be performed (e.g., triggered), e.g., in a case where the idle SL WTRU is about to lose the synchronization with the SL interface. For example, a synchronization timer may be about to expire from the last time the idle SL WTRU may have synchronized with any number of SSBs (e.g., that may be any of Uu SSBs and SL-SSBs), and no (e.g., current) SL-SSBs may be available. For example, an idle SL WTRU may send a request for SL paging reference signals upon a determination that a (e.g., pre-determined amount of) time has elapsed after the idle SL WTRU may have (e.g., last) synchronized with an SSB, in absence of any SL SSB. For example, the channel carrying the SL reference signal request may be allocated as a dedicated resource, over which the idle SL WTRUs may be able to transmit the SL reference signal request (e.g., sequences, transmissions). In another example, a SL WTRU, upon determining being out of sync prior to a SL paging occasion, may perform (e.g., trigger) a discovery procedure, where the request sequence (e.g., transmission) of the SL paging reference signals may be transmitted in broadcast to reachable active WTRU(s). For example, a SL WTRU that may transmit a SL reference signal request may be about to be not synchronized (e.g., may be close to lose synchronization) with the SL interface. For example, the request transmissions may be (e.g., in the form of) transmissions of sequence codes, where there may be a mapping between a (e.g., each) sequence code and a SL reference signal (e.g., pattern). For example, configuration information indicating any of the configurations of the SL reference signal request sequence codes and the mapping to the corresponding SL reference signal patterns may be signaled (e.g., received) from any of the RAN (e.g., serving base station) node and the SL service provider WTRU. For example, any of the configurations of the SL reference signal request sequence codes and the mapping to the corresponding SL reference signal patterns may be indicated in SL paging configuration information according to any embodiment described herein. For example, an active SL WTRU, before transmitting the first stage paging SCI, may transmit the requested SL reference signals (SL CSI-RS for example) for enabling the idle SL WTRU to detect them, sync with the SL interface, and accordingly, be able to blind decode any of the first and second stages paging SCIs.

Figure 19:
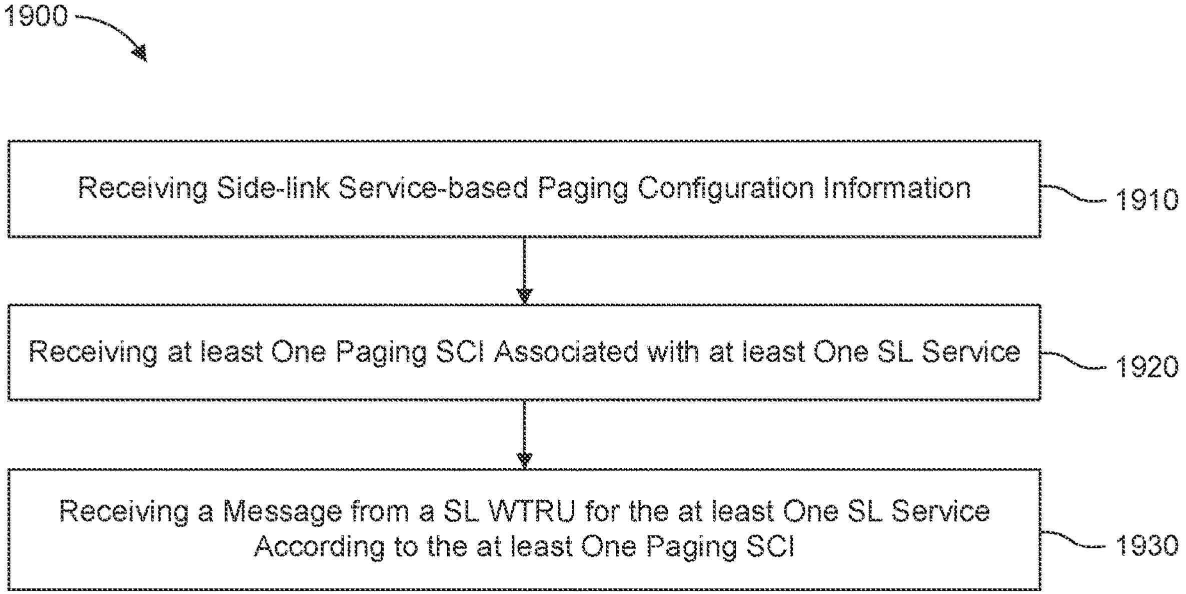
FIG. 19 is a diagram illustrating an example of a SL service-based paging method.

FIG. 19 is a diagram illustrating an example of a SL service-based paging method. For example, the SL service-based paging method 1900 may be for use (e.g., implemented in) a WTRU.

According to embodiments, in a step 1910, SL service-based paging configuration information may be received. SL service-based paging configuration information may indicate a plurality of paging occasions, wherein at least one subset of paging occasions may be associated with at least one SL service. For example, SL service-based paging configuration information may indicate (e.g., include association information indicating) that any number of (e.g., subsets of) paging occasions may be associated with any number of SL services.

According to embodiments, in a step 1920, at least one paging SCI, that may be associated with the at least one SL service, may be received (e.g., blindly decoded), based on the received the SL service-based paging configuration information to determine that the WTRU is paged for the at least one SL service. For example, upon (e.g., successful reception) of at least one paging SCI associated with the at least one SL service, it may be determined that the WTRU may be paged for the at least one SL service. For example, the WTRU may monitor for (e.g., blindly decode) a paging SCI in one paging occasion of the plurality of paging occasions and may determine whether the monitored SCI is associated with the at least one SL service to determine whether the WTRU is paged for the at least one SL service.

According to embodiments, in a step 1930, (e.g., on a condition that he WTRU is paged), a message (e.g., SL service data) may be received from a SL WTRU for the at least one SL service according to the received at least one paging SCI.

For example, SL service-based paging configuration information may be received from any of a serving base station and a SL relay.

For example, a message comprising SL WTRU-based paging configuration information may be transmitted to the SL WTRU.

For example, any of SL service-based paging configuration information and SL WTRU-based paging configuration information may indicate any of SL paging resources of the paging occasions, any number of SL paging modes, any number of SL paging scrambling codes, association information indicating that the at least one subset of paging occasions is associated with the at least one SL service, any number of SL WTRU identifiers, any number of SL WTRU group identifiers, any number of SL service identifiers, any number of SL cast types, and at least one SL carrier identifier.

For example, different paging occasions associated with different SL services may have different periodicities.

For example, a request message may be transmitted to the SL WTRU for requesting group-based SL paging configuration information.

For example, a response message may be received from the SL WTRU. The response message may comprise the (e.g., requested) group-based SL paging configuration information.

For example, group-based SL paging configuration information may be associated with a group of any of WTRUs, SL services and SL sub-services.

For example, any of SL service-based paging configuration information and SL WTRU-based paging configuration information may comprise early SL paging configuration information.

For example, early SL paging configuration information may indicate any of a SL search space over which at least one SL early paging SCI may be received from the SL WTRU, associations of CDM codes with any of the SL WTRU identifiers, the SL WTRU group identifiers, and the SL service identifiers, resource pattern information, and an indication to activate a second stage service specific paging occasion.

For example, the at least one early paging SCI may be received in the indicated SL search space to determine that the WTRU may be early paged.

For example, the message may be received from the SL WTRU according to the received at least one SL early paging SCI.

For example, any of SL service-based paging configuration information and SL WTRU-based paging configuration information may include SL paging synchronization information that may indicate any of a SL paging reference signal pattern, and any number of configuration sets of SL paging reference signal occasions.

For example, the WTRU may wake up to receive at least one SL paging reference signal from the SL WTRU based on the SL paging synchronization information (e.g., for resynchronizing) before the at least one paging SCI may be received.

For example, a request for SL paging reference signals may be transmitted to the SL WTRU e.g., based on a coarse synchronization of the WTRU.

Example of Dynamic (e.g., Power-Based) SL Relay Offloading

Enabling procedures for dynamic offloading of the SL relay are described herein. For example, dynamic offloading of the SL relay may allow to obtain a (e.g., decent) power saving gain at any of the SL relay side and the SL remote WTRU side. For example, with (e.g., multi-hop) SL relaying, a SL relay WTRU may be connected to and performing data relaying for more than one connected remote WTRUs, resulting in a (e.g., significant) power burden at the SL relay side. A dynamic procedure for relay SL WTRUs to offload some of the connected WTRUs without loss of SL service continuity is described herein.

Figure 20:
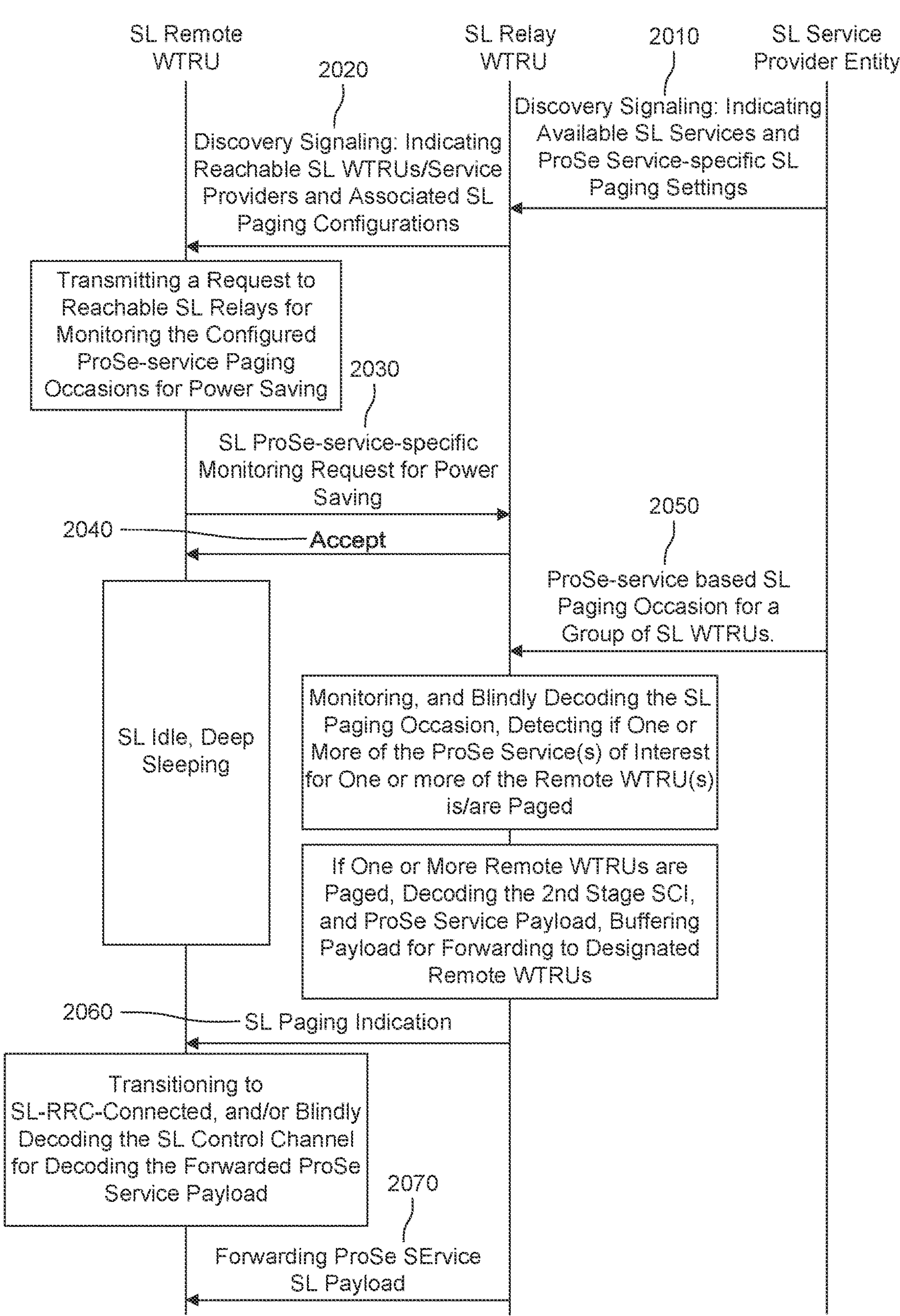
FIG. 20 is a diagram illustrating an example of SL paging monitoring by a SL relay proxy.

FIG. 20 is a diagram illustrating an example of SL paging monitoring by a SL relay proxy.

For example, a SL relay WTRU may receive a message 2010 (e.g., as part of the discovery signaling e.g., comprising SL service-based paging configuration information) indicating any of available SL services and ProSe service-specific SL paging settings. For example, the SL service-based paging configuration information may indicate one or more SL paging configurations (e.g., associated with one of more sets of SL paging occasions (e.g., any of time and frequency resources) to be monitored). For example, any of one or more SL paging configurations and the associated one or more SL paging occasions to be monitored may be associated with one or more SL services.

For example, a SL remote WTRU may receive a message 2020 from the SL relay WTRU (e.g., as part of the discovery signaling) indicating any of reachable SL WTRUs (e.g., SL service providers) and associated SL paging configurations. For example, the message 2010, 2020 may comprise SL paging configuration information indicating one or more (e.g., associated) SL paging configurations. For example, one or more SL paging configurations may be associated with one or more sets of SL paging occasions. For example, the SL paging configuration information may indicate one or more sets of SL paging occasions to be monitored. For example, the set of SL paging occasions to be monitored may be associated with one or more SL services.

For example, the SL remote WTRU may send a request message 2030 to the SL relay WTRU for (e.g., requesting) relaying the monitoring of (e.g., one or more of) the configured paging occasions. For example, the request message 2030 may include information indicating one or more SL paging configurations (e.g., associated with one or more sets of SL paging occasions to be monitored). For example, the one or more SL paging configurations may be associated with any of one or more SL services and a group of WTRUs (e.g., from one or more service providers).

For example, a connected relay WTRU may monitor any of the SL ProSe service-specific and the WTRU-group specific SL paging occasions of the requesting SL remote WTRU(s), allowing to achieve a (e.g., decent) power saving gain at the SL remote WTRU (e.g., SL remote WTRU(s) may not monitor and may not blindly decode the candidate SL paging occasions e.g., for the one or more SL services from the one or more service providers). For example, the request message 2030 may include an indication of a reason for (e.g., requesting) SL paging relaying.

In a first example, a reason for SL paging relaying may be power saving, where the SL remote WTRU may be in proximity (e.g., coverage) of a target SL service provider and may seek to save the power consumption by letting one or more connected SL relays to perform SL paging monitoring (e.g., on their behalf). For example, the request message 2030 may include information indicating that the SL remote WTRU may be any of (i) power limited and (ii) in a power saving mode. For example, the SL relay WTRU(s) may monitor any of the (e.g., bulk) ProSe service-specific and group-specific SL paging occasions on behalf of the SL remote WTRU(s), such that SL remote WTRU(s) may monitor more relaxed common paging occasions in any of one-to-one and one-to-many configuration between the SL relay WTRU and one or more of the connected SL remote WTRU(s).

Information indicating the configuration considered by the SL remote WTRU(s) for the relaxed (e.g., offloaded) paging occasions monitoring may be transmitted (e.g., relayed) by the SL relay WTRU(s) to the service provider(s) of the services of interest for the SL remote WTRU(s). Indicating the relaxed (e.g., offloaded) paging occasions monitoring may allow to improve the efficiency of paging message and corresponding traffic (e.g., SL service payload) (re-) transmission(s). For example, the service provider(s) may limit the number of paging message(s) (re-)transmission(s) for SL remote WTRU(s) that may be in SL idle mode (e.g., may deep sleep, may have offloaded SL paging monitoring).

In a second example, a reason for SL paging relaying may be coverage extension, where the SL remote WTRU may be interested in (e.g., receiving) one or more of the SL services offered (e.g., provided) by a non-reachable SL service provider. For example, the request message 2030 may include information indicating that the SL remote WTRU may be any of out-of-coverage and requesting coverage extensions. For example, a connected SL relay WTRU may monitor the configured ProSe paging occasions, for the services offered by (e.g., available at) the indicated SL service provider, e.g., on behalf of the SL remote WTRU. For example, an indication of a requested SL service provider may be included in the request message 2030.

For example, the SL relay WTRU may exchange information with the SL remote WTRU and SL service provider(s) to (e.g., jointly) negotiate the paging monitoring configuration to any of (1) reduce the overhead associated with the (re-)transmission of any of one or more paging message(s) and corresponding traffic (e.g., SL service payload) to the SL remote WTRU(s) in a case where the SL remote WTRU is in SL idle (e.g., deep sleep) state, and (2) reduce the SL relay WTRU's overhead associated with traffic (i.e., SL service payload) buffering for the one or more SL remote WTRU(s).

For example, a SL paging relaying request 2030 may be (e.g., included in) a discovery message that may be part of the configured discovery signaling. In another example, the SL paging relaying request 2030 may be part of a direct communication request message with the SL relay WTRU. For example, the SL relay WTRU may send a response message 2040 indicating an acceptance of the relaying request. For example, the SL relay WTRU may start monitoring the configured SL paging occasions 2050 which the remote WTRU may be interested in. For example, the SL relay WTRU may receive one or more transmissions (e.g., any of first stage SCI and second stage SCI) in the set of SL paging occasions (e.g., associated with the indicated one or more SL paging configurations). For example, the (e.g., received, monitored) one or more transmissions (e.g., any of first stage SCI and second stage SCI) may indicate whether the second WTRU is being paged for one or more SL services. In a case where (e.g., a first stage SCI indicates that) there is one or more valid SL page in which the SL remote WTRU may be interested, the SL relay WTRU may decode the corresponding second stage SCI, the SL relay WTRU may receive (e.g., and buffer) the respective (e.g., corresponding) SL service payload (e.g., message(s)). For example, the SL relay WTRU may transmit SL paging information 2060 indicating availability of received SL service payload (e.g., message(s)) towards the SL paged SL remote WTRU such that the SL remote WTRU may (e.g., wake up to) receive the SL service payload. SL paging information indicating availability of one or more SL service messages may be referred to herein as SL paging indication. For example, the SL remote WTRU may deep sleep for a period of time and may wake up after the period of time to check for SL paging indication. Different examples for transmitting a SL paging indication 2060 are described herein.

In a first example, the SL remote WTRU and the SL relay WTRU may agree on a one-to-one SL paging occasion, over which the SL relay WTRU may transmit such SL paging indication such that the remote WTRU may wake up and decode the SL paging indication. For example, the SL remote WTRU and the SL relay may exchange messages (e.g., including configuration information), allowing the SL remote WTRU and the SL relay to determine a (e.g., same set of) one-to-one SL paging occasion(s). For example, the configuration information may be included in any of the message 2020, the request message 2030 and any other message exchanged before sending the SL paging indication. For example, the SL remote WTRU may deep sleep until an occurrence of such a one-to-one SL paging occasion(s).

In a second example, the SL paging indication may be sent by the SL relay WTRU as an information element that may be included in a discovery message, which may be detected by (e.g., all) SL remote WTRU(s) in proximity. For example, SL remote WTRUs may wake up (e.g., stop deep sleeping) after the first period of time to perform a discovery procedure, and may receive the SL paging indication that may be included in a discovery message.

In any of the first and the second examples, the SL relay WTRU may receive one or more transmissions in more than one SL paging occasions indicating that the remote WTRU may be paged more than one time for one or more SL services. For example, the received transmissions may indicate that more than one WTRU may be paged for one or more SL services. For example, more than one SL message associated with one or more SL services and directed to one or more remote WTRU(s) may be received. For example, the SL paging indication may aggregate in a single piece of information an indication that the second WTRU may have been paged more than one time. In another example, the SL paging indication may aggregate in a single piece of information an indication that more than one WTRU may have been paged one or more times.

For example, after a SL paging indication transmission, the SL relay WTRU may forward the buffered SL service traffic of interest to one or more remote connected WTRU(s) in any of a scheduled one-to-one and one-to-many SL transmission.

For example, a remote SL WTRU, may receive a SL paging indication indicating that the remote SL WTRU may have been paged for one or more SL services. For example, the SL paging indication may indicate a number of times that the remote SL WTRU may have been paged for (e.g., each of) the one or more SL services. For example, the remote SL WTRU, may use the SL paging indication to request e.g., for (e.g., each of) the one or more SL services one or more SL service payload message(s), e.g., from the corresponding SL service provider(s), based on the number of times the remote SL WTRU may have been paged for the SL service and the type of the SL service.

Embodiments described herein may allow SL remote WTRU(s) to save power by offloading bulk of the paging monitoring functionalities to the SL relay WTRU. For example, this may increase processing and power consumption at those SL relay WTRUs. In an embodiment, the SL relay WTRU(s) may be capable of dynamically offloading the relayed (e.g., monitoring of the) SL paging occasions back to requesting remote WTRU(s), such that SL service continuity may be preserved while managing their own processing and power consumption capabilities. For example, the monitoring of the SL paging occasions may be offloaded back to a requesting remote WTRU based on any of a power consumption of the SL relay WTRU, a monitoring capacity of the SL relay WTRU and a buffering capacity of the SL relay WTRU.

Figure 21:
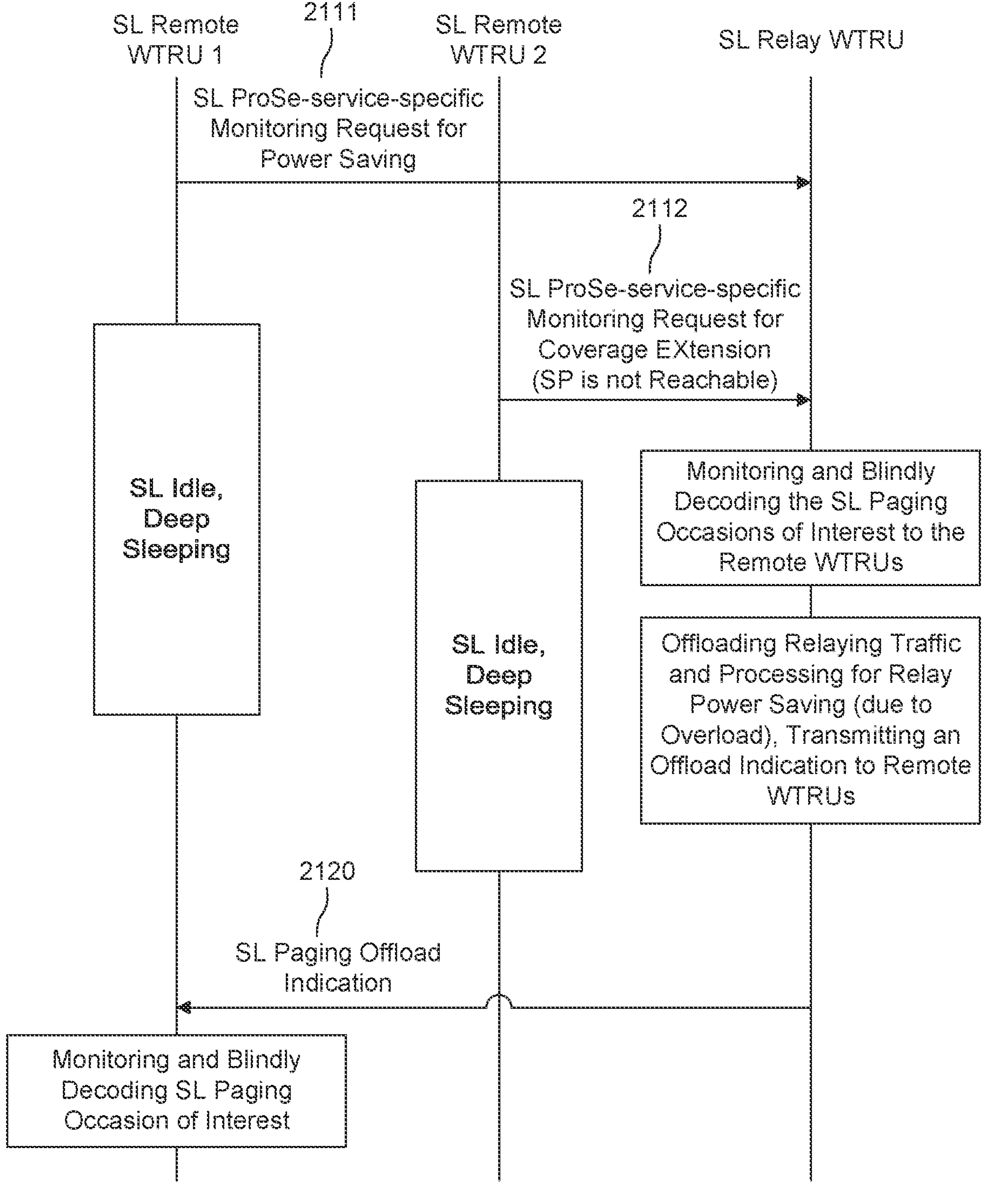
FIG. 21 is a diagram illustrating an example of dynamic relay offloading for power saving.

FIG. 21 is a diagram illustrating an example of dynamic relay offloading for power saving. For example, a first and a second remote WTRUs may respectively transmit a first 2111 and a second 2112 request of SL paging relaying to a relay WTRU, comprising information respectively indicating power saving and service continuity. For example, the first request message 2111 may comprise first information indicating a first request to offload a first monitoring of a first set of paging occasions, and the second request message 2112 may comprise second information indicating a second request to offload a second monitoring of a second set of paging occasions. In a case where the SL relay WTRU is any of getting overloaded with relaying processing, inflicting a significant power consumption, and getting overheated, the relay SL WTRU may transmit a SL paging offloading indication message 2120 to any of the SL (e.g., first, second) remote WTRUs. For example, the SL paging offloading indication message 2120 may comprise information indicating to offload monitoring of (e.g., at least a part of) the (e.g., first, second) set of SL paging occasions back to the SL (first, second) remote WTRU. For example, the SL relay WTRU may stop monitoring at least a part of the paging and relaying traffic associated with a single SL remote WTRU (e.g., the first remote WTRU), which may have formerly requested relaying for power saving, by (e.g., after) transmitting the SL paging offload indication. For example, assigning higher priority to relaying traffic and SL paging monitoring of SL remote WTRUs which may not be in proximity of their SL service providers of interest may allow to preserve SL service continuity. For example, a first and a second remote WTRUs may have sent respectively a first and a second request messages comprising respectively first and second information indicating respectively a first and a second requests to offload monitoring of respectively a first and a second sets of paging occasions associated with respectively a power saving reason and a coverage extension reason. For example, the first information may indicate that the first WTRU may be any of (i) power limited and (ii) in a power saving mode. For example, the second information may indicate that the second WTRU may be any of out-of-coverage and requesting a coverage extension. For example, the first and second sets of paging occasions may overlap (e.g., via a common subset of paging occasions). For example, the SL relay WTRU may stop monitoring a first subset of the first set of paging occasions that may not overlap with (e.g., may not be comprised in) the second set of paging occasions and may keep (e.g., maintain) monitoring a second subset of the first set of paging occasions that may (e.g., any of partially and fully) overlap (e.g., be comprised, be common to) the second set of paging occasions. For example, the SL paging offloading indication message 2120 may comprise information indicating that the monitoring of the first subset of the first set of paging occasions may be offloaded back to the first WTRU. For example, the information may further indicate that the offload of the monitoring of the second subset of the first set of paging occasions may be maintained for the first WTRU.

In an embodiment, a SL WTRU may transmit a SL paging relaying request (e.g., message, transmission), that may include information indicating a reason of the relaying request, which may be any of for power saving and for SL service continuity. For example, the SL paging relaying request may include SL paging (e.g., WTRU) information indicating one or more configurations e.g., indicating any of a paging group ID, a WTRU ID, and (e.g., explicit configured) SL paging occasions. For example, a SL relay WTRU may any of accept and reject the relaying request from any of (e.g., one or more of) the requesting SL remote WTRU(s), e.g., by transmitting information indicating any of an acceptance and a rejection of the relaying request (e.g., through any of acceptance and rejection indication signaling). For example, in a case where the relaying request is accepted from the one or more SL remote WTRU(s), the SL relay WTRU may receive one or more transmissions based on the indicated one or more configurations e.g., by monitoring the SL paging occasions of interest of the one or more SL remote WTRUs. For example, in a case where any number of (e.g., one or more transmissions indicating one or more) SL paging indications are present (e.g., detected, blindly decoded by the SL relay WTRU) for any number of (e.g., one or more) SL remote WTRU(s), the relay SL WTRU may receive (e.g., store in a) buffer the SL traffic of interest of the paged SL remote WTRU and may transmit a (e.g., transmission indicating a) SL paging indication towards the paged SL remote WTRU(s). For example, the SL relay WTRU may forward (e.g., transmit) the buffered SL service traffic to the one or more connected remote WTRUs (e.g., which may have been paged).

Example of Inter-WTRU Coordination for SL Paging Over Multi-Hop Relays

For example, a SL WTRU(s) may be in any of (e.g., RRC) idle and inactive state and may perform any of SL transmissions and SL reception based on SL paging according to any embodiment described herein. For example, the SL WTRU(s) may receive SL paging configuration information according to any embodiment described herein. For example, the SL paging configuration information may indicate a first set of SL paging configurations. For example, the SL WTRU(s) may monitor the SL paging occasions of interest, e.g., of the first of SL paging configurations (e.g., any of WTRU group specific and service specific paging occasions) and may monitor the Uu RAN interface paging occasion. For example, the SL WTRU(s) may not be able to monitor two different paging channels from different sources (e.g., using Uu and SL/PC5 interfaces) due to, e.g., any of beamformed reception, availability of a (e.g., limited) number of RF chains, and different BWP (e.g., carrier) configuration for the Uu and SL (e.g., PC5) interface links with e.g., limited capability to buffer signals for further processing.

For example, the SL paging occasions of interest may not be any of fully and partially aligned with the Uu paging cycle and resources.

For example, in a multi-carrier multi-hop SL relaying network, the alignment of the SL and Uu paging occasions for (e.g., single receiver) WTRU(s) may (e.g., significantly) degrade the paging performance of the SL and Uu interfaces (e.g., respectively). An SL coordination method is described herein such that the alignment (e.g., collision) between the Uu and the SL paging timing configurations may be avoided or at least reduced.

Figure 22:
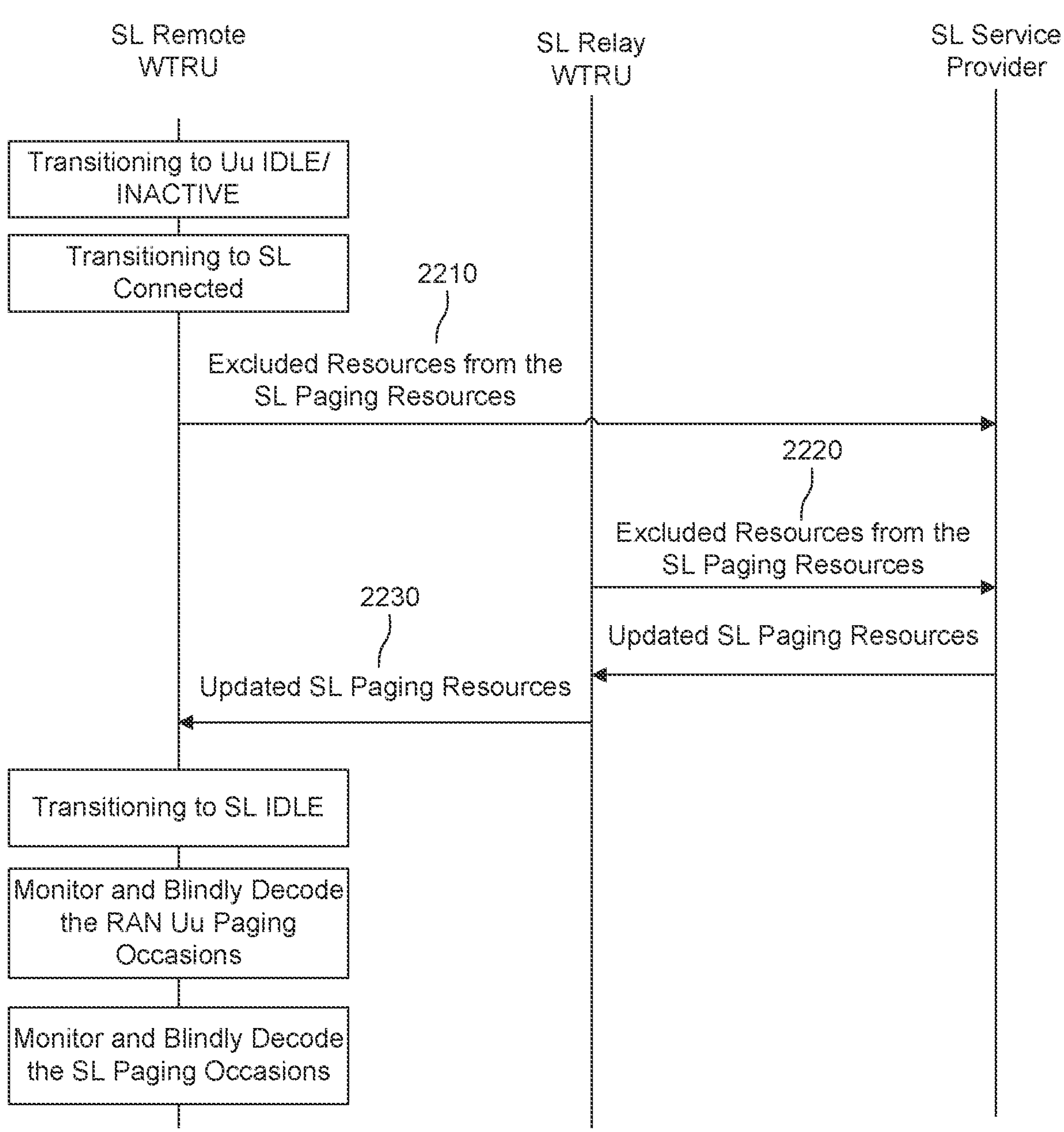
FIG. 22 is a diagram illustrating an example of separation of the SL and Uu paging resources for single receiver WTRU(s)

FIG. 22 is a diagram illustrating an example of separation of the SL and Uu paging resources for (e.g., single receiver) WTRU(s). For example, a SL remote WTRU may announce (e.g., transmit a message 2210 including information indicating) the resource sets (such as e.g., timing resources) to be excluded from the configured SL paging occasions (e.g., resources) of such WTRU. For example, the resource sets may be signaled (e.g., indicated) in terms of (e.g., based on) any of a starting symbol of (e.g., each) slot, a starting time, a periodicity, and an allocation duration, for example, in terms of the number of (e.g., OFDM) symbols. Any other technique allowing to indicate a set of resources to be excluded from another set of resources may be applicable to embodiments described herein. For example, for SL ProSe service specific paging, the relay WTRU(s) may forward (e.g., transmit a message 2220 including information indicating) the list of resources (e.g., SL paging configurations) to be excluded to the SL service providers of interests. For example, any of the relay and the SL service provider may update the SL paging configuration (e.g., any of resources for SL paging, associated SL services, services IDs, scrambling codes) such that the collisions (e.g., intersection, overlap) between the resources to be excluded and the (e.g., current) resources of the SL paging configuration may be reduced (e.g., limited, avoided). For example, any of the relay and the SL service provider may respond back with (e.g., transmit a message 2230 including information indicating) the updated (e.g., improved, optimized) SL paging configuration for the SL remote WTRU. For example, the messages (e.g., transmissions) 2210, 2220, 2230 may be part of (e.g., included in) any of the periodic discovery messages. For example, the SL remote WTRU may be able to monitor (e.g., both) the configured Uu and SL paging resources with e.g., improved performances.

In an embodiment, a SL remote WTRU(s) may transition from an idle (e.g., SL IDLE) state to a connected (e.g., SL connected) state, using any of a discovery, a communication request and a direct communication request. For example, the SL remote WTRU(s) may transmit (e.g., an indication of) the SL paging configurations (e.g., resources) to be excluded e.g., as part of any of a discovery (e.g., message), a communication request signaling (e.g., message), and a (e.g., specific) paging configuration request signal (e.g., transmission, message). For example, the indication of the SL paging configurations (e.g., resources) to be excluded may include information indicating any of the timing and frequency resources that may not be used for SL paging of the SL remote WTRU. For example, SL remote WTRU(s) may receive from any of SL relays and SL service providers, (e.g., a transmission including information indicating) the updated SL paging configurations which may be part of any of a (e.g., direct) communication response message and a paging configuration update message. For example, SL remote WTRU(s) may transition back to an idle state (e.g., SL IDLE mode) and may monitor (e.g., by blindly decoding) RAN Uu and SL PC5 paging occasions.

Example of an Aggregate Discovery Method for Power-Efficient Operation

SL discovery, which may be of any of model A and model B may allow to enable SL communications. For example, a SL WTRU may perform SL discovery in order to any of:

- announce (e.g., transmit information indicating) any of its presence and the SL services it may offer (e.g., provide) to reachable SL WTRUs. For example, according to embodiments described herein, SL WTRU(s) may announce (e.g., transmit information indicating) the SL ProSe service specific paging occasions and settings e.g., during the discovery signaling;
- query (e.g., transmit information requesting indications of) the presence of any of the surrounding SL WTRUs, SL service providers and SL relays.

For example, during the SL discovery (e.g., procedure), the SL WTRU(s) may calculate (e.g., obtain) a reference signal received power (RSRP) level (e.g., of a signal received) from (e.g., each of) the discovered SL WTRU(s), such that, in a case where, for example, any of the discovered SL relays and SL service providers, are in coverage, a SL link may be initiated (e.g., established) with good QoS.

The SL discovery procedure may be power inefficient by involving several periodic wake-up instants, transmission of several signals, discovery resource monitoring and decoding. Performing a discovery may represent a (e.g., significant) power consumption for the SL WTRU. An aggregate discovery method is described herein, where a lower number of discovery instants may be used by the power limited SL WTRU(s) to improve their power consumption, without impacting the overall SL operation.

For example, in a SL deployment, where several SL services may be offered (e.g., provided) from different SL WTRUs or SL service providers, a master SL WTRU (e.g., service provider WTRU) may be any of dynamically elected (e.g., selected), and explicitly preconfigured (e.g., selected via explicit configuration information transmission, indicating that the service provider WTRU may be selected as master WTRU). Explicit master WTRU pre-configuration may be suitable for SL stationary deployments such as SL deployments in large malls, airports, etc. For example, other SL service providers (e.g., SL WTRUs), which may be in coverage of the selected master SL service provider (e.g., WTRU) may be referred to herein as slaves. For example, a master WTRU may determine that a SL service provider WTRU may be in its coverage in a case where a signal strength (e.g., any of an RSS and a RSRP) of a signal received from the SL service provider WTRU satisfy a strength condition. For example, a strength condition may be satisfied in a case where the signal strength is above a (e.g., threshold) value. For example, a slave SL WTRU(s) (e.g., service provider(s)) may signal (e.g., transmit to) the master SL service provider (e.g., information indicating) any of the available SL services they may offer and corresponding SL paging settings of (e.g., SL paging configurations associated with) the offered (e.g., available) SL services. For example, SL paging settings (e.g., SL configuration information) may include indications of any of SL paging group information, SL paging occasion(s), and SL paging scrambling codes which may be associated with any (e.g., each) of the available SL services.

For example, the master SL service provider (e.g., WTRU) may receive SL configuration information from the slave service provider(s) (e.g., WTRU(s)), and may compile (e.g., generate) an aggregate discovery message. For example, the master SL service provider (e.g., WTRU) may determine to aggregate a discovery message from one or more discovery messages received from one or more slave service provider WTRUs on a condition that signal strength(s) of signal(s) received from the one or more slave service provider WTRUs satisfy a strength condition (e.g., above a threshold). For example, the aggregated discovery message may include any of the following information elements (e.g., indications):

- any of the SL ID, offered (e.g., available) SL services and associated paging information (e.g., indicating any of one or more SL paging configurations (e.g., associated with one or more SL paging occasions), paging groups, (e.g., paging) reference signals, paging scrambling codes) of the master SL service provider.
- any of the SL ID, offered (e.g., available) SL services and associated paging information (e.g., indicating any of one or more SL paging configurations (e.g., associated with one or more SL paging occasions), paging groups, (e.g., paging) reference signals, paging scrambling codes) of the slave service provider(s) (e.g., WTRU(s)).

For example, the SL WTRU(s) may discover the master SL service provider, may identify (e.g., obtain) SL information of the master and of (e.g., all) the slave service providers (e.g., WTRU) in proximity, based on a single discovery instance (e.g., message). For example, SL WTRU(s), which may be demanding a SL service from one or more of the slave service providers, may (e.g., directly) monitor and decode the corresponding paging occasions of those SL service providers, (e.g., and may perform on-the-go SL communications (e.g., send a SL connection establishment request towards a SL slave service provider WTRU) e.g., without prior discovery).

In a case where the master and slave service providers are in proximity, (e.g., in coverage of each other's), a SL WTRU may (e.g., safely) assume being in coverage of the slave SL service providers when discovering the master SL provider, e.g., for SL deployments in factories, malls, etc In a case where slave and master SL WTRUs are not in coverage (e.g., of each other's), SL WTRU(s) may not have a similar RSRP level for any (e.g., all) discovered SL service providers (e.g., WTRUs). For example, an additional reference signal (such as e.g., any of a tracking reference signal (TRS) and a CSI-RS) may be transmitted prior to (e.g., each of) the paging occasions of a (e.g., each) service of a (e.g., each) slave service provider. For example, based on the reference signals, the SL WTRUs may be able to calculate the RSRP level of the SL slave service providers (e.g., WTRUs), and accordingly, may select those satisfying a strength condition (e.g., with a RSRP above a threshold) for subsequent paging monitoring and detection. In another example, a dynamic procedure for transmitting the on-demand pre-paging reference signal is described herein. The on-demand pre-paging reference signal transmission method may allow to prevent SL WTRU(s) to monitor the paging occasions of SL slave service provider of a poor RSRP, e.g., not in proximity of the SL WTRU(s). For example, a RSRP threshold may be predefined (e.g., pre-determined) and e.g., signaled (e.g., indicated by transmitted configuration information) from the master SL service provider to the slave ones. For example, a slave service provider (e.g., WTRU) may calculate (e.g., obtain) the received RSRP from the master SL WTRU. In a case where the RSRP received from the master SL WTRU fulfills (e.g., is above) the RSRP threshold, the slave SL service provider (e.g., WTRU) may directly transmit the paging signaling without transmitting the SL paging assisting reference signals. Otherwise, the slave SL service provider (e.g., WTRU) may transmit one or more sets of the paging reference signals prior to the paging occasions, configured for (e.g., each of) the offered SL services. For example, the resources for the paging reference signals transmission by the slave SL service provider(s) (e.g., WTRU(s)) may be signaled (e.g., indicated by configuration information that may be transmitted) as part of the discovery signaling from the master SL service provider (e.g., WTRU).

Figure 23:
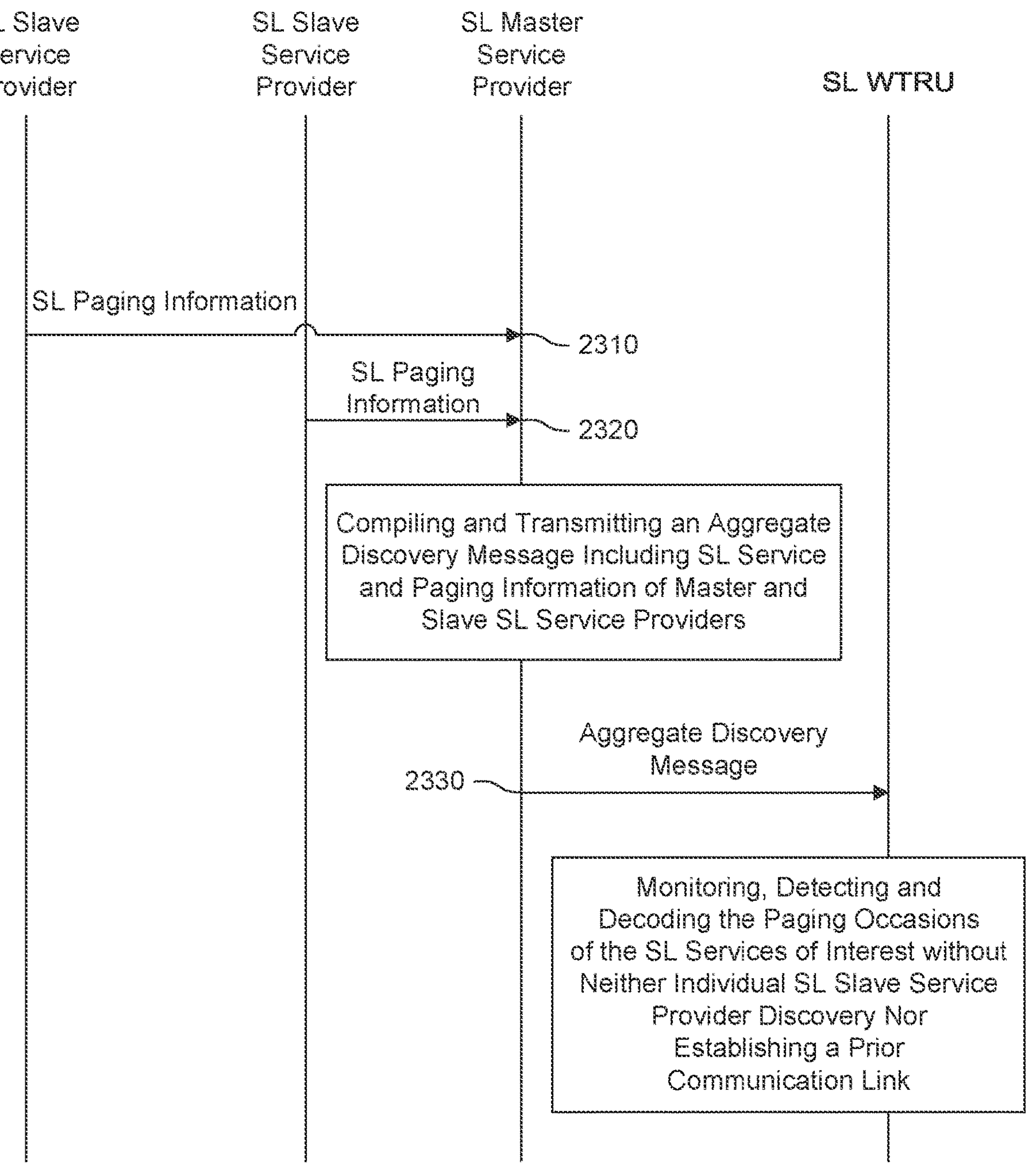
FIG. 23 is a diagram illustrating an example of an aggregate SL discovery method.

FIG. 23 is a diagram illustrating an example of an aggregate SL discovery method. In an embodiment, a first and a second SL slave service providers may respectively transmit a first 2310 and a second 2320 messages comprising SL paging information indicating any of SL WTRU IDs, offered (e.g., available) SL services (e.g., IDs), and SL (e.g., service-specific) paging configuration(s) (e.g., occasions). The first 2310 and the second 2320 messages may be transmitted to a SL master WTRU. For example, the SL master WTRU may compile (e.g., aggregate received SL paging information) and transmit an aggregate discovery message 2330 including (e.g., aggregate) SL paging information that may indicate any of SL WTRU IDs, SL services (e.g., IDs), SL paging configuration(s) (e.g., occasions), and SL paging reference signal presence indication) for the master and (e.g., received) slave SL WTRUs. For example, a SL WTRU may receive the aggregate discovery message 2330 and may determine the in-proximity of one or more SL service providers. For example, on a condition that a RSRP received from the master SL service provider satisfies a strength condition (e.g., is below a (e.g., predefined) threshold), a SL slave service provider may transmit a paging reference signal set prior to (e.g., each of) the ProSe service specific paging occasions. For example, SL WTRUs, which may be demanding (e.g., willing to receive) a particular SL service from a slave SL service provider, may directly monitor, detect, and decode the indicated (e.g., paging) reference signals, and paging occasions without discovering the individual slave SL service providers and without establishing prior SL communication links.

Figure 24:
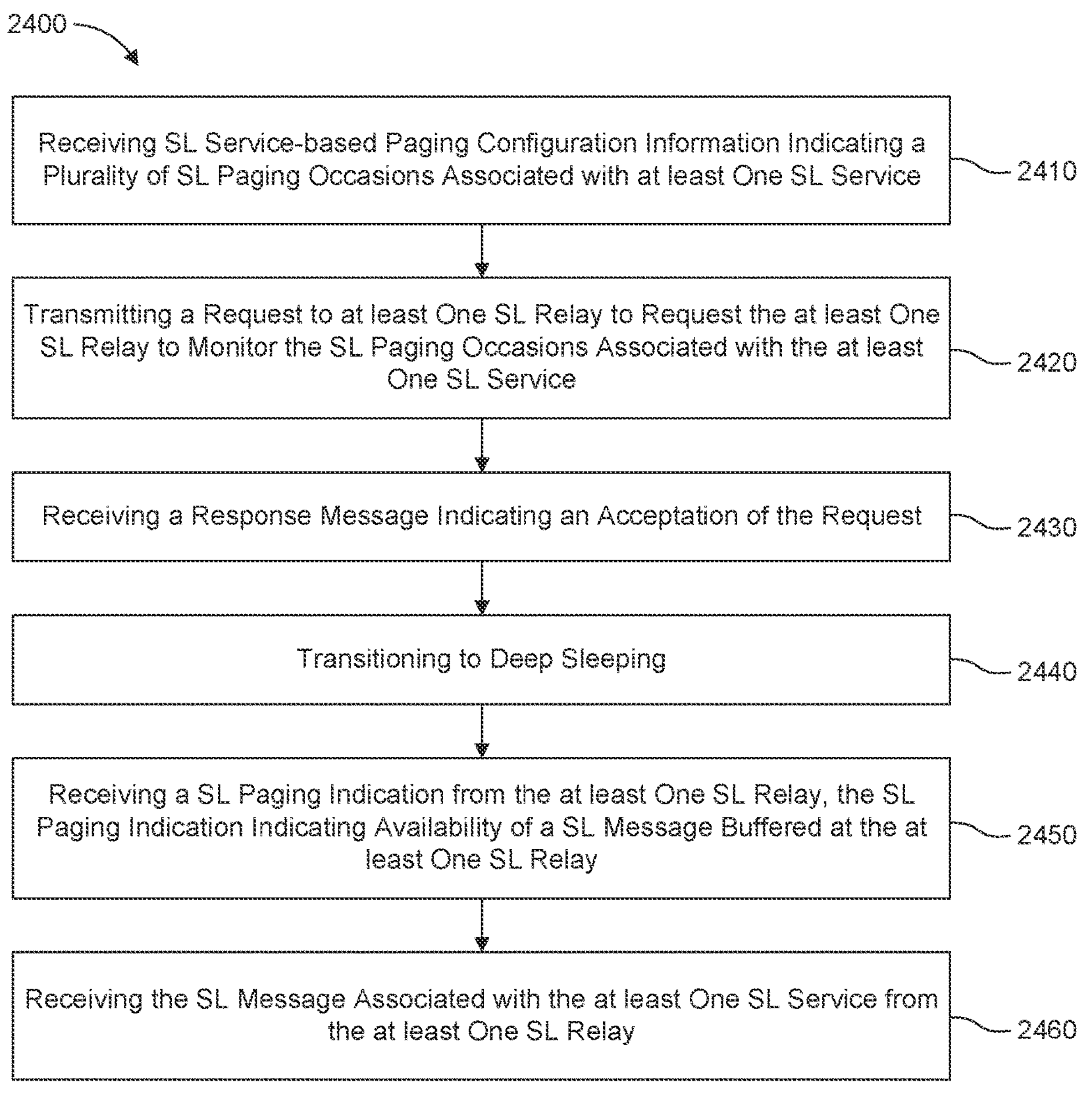
FIG. 24 is a diagram illustrating an example of a SL service-based paging method for use in a SL WTRU.

FIG. 24 is a diagram illustrating an example of a SL service-based paging method 2400 for use in a SL WTRU. For example, in a step 2410, the SL WTRU may receive SL service-based paging configuration information indicating a plurality of SL paging occasions associated with at least one SL service. For example, in a step 2420, the SL WTRU may transmit a request (e.g., message) to at least one SL relay. For example, the request (e.g., message) may comprise information requesting the at least one SL relay to monitor the SL paging occasions associated with the at least one SL service. For example, in a step 2430, the SL WTRU may receive a response message from the at least one SL relay, which may indicate an acceptance of the request. For example, in a step 2440, the SL WTRU may transition to deep sleeping e.g., for a period of time.

For example, in a step 2450, the SL WTRU may receive a SL paging indication (e.g., message, transmission) from the at least one SL relay. For example, the SL paging indication (e.g., message, transmission) may indicate availability of at least one SL message buffered at the at least one SL relay, the at least one SL message may be associated with the at least one SL service. For example, in a step 2460, the SL WTRU may receive the at least one SL message associated with the at least one SL service from the at least one SL relay.

For example, the request (e.g., message) may comprise an indication of a reason for requesting offloading the monitoring of the SL paging occasions.

For example, the reason for requesting offloading the monitoring of the SL paging occasions may be for any of power saving and coverage extension.

For example, the SL paging indication (e.g., message, transmission) may be received in a (e.g., preliminarily determined) SL paging occasion. For example, the period of time (during which the SL WTRU may deep sleep) may correspond to an occurrence of the (e.g., preliminarily determined) SL paging occasion.

For example, the (e.g., preliminarily determined) SL paging occasion may be determined based on configuration information preliminarily received from the at least one SL relay.

For example, the SL paging indication (e.g., message, transmission) may be received in a discovery message. For example, the period of time (during which the SL WTRU may deep sleep) may correspond to an occurrence of a discovery message exchange.

For example, the SL WTRU may receive a SL paging offload (e.g., indication) message indicating offloading the monitoring of the SL paging occasions back to the SL WTRU.

For example, the SL WTRU may monitor (e.g., back) the plurality of SL paging occasions associated with at least one SL service.

Figure 25:
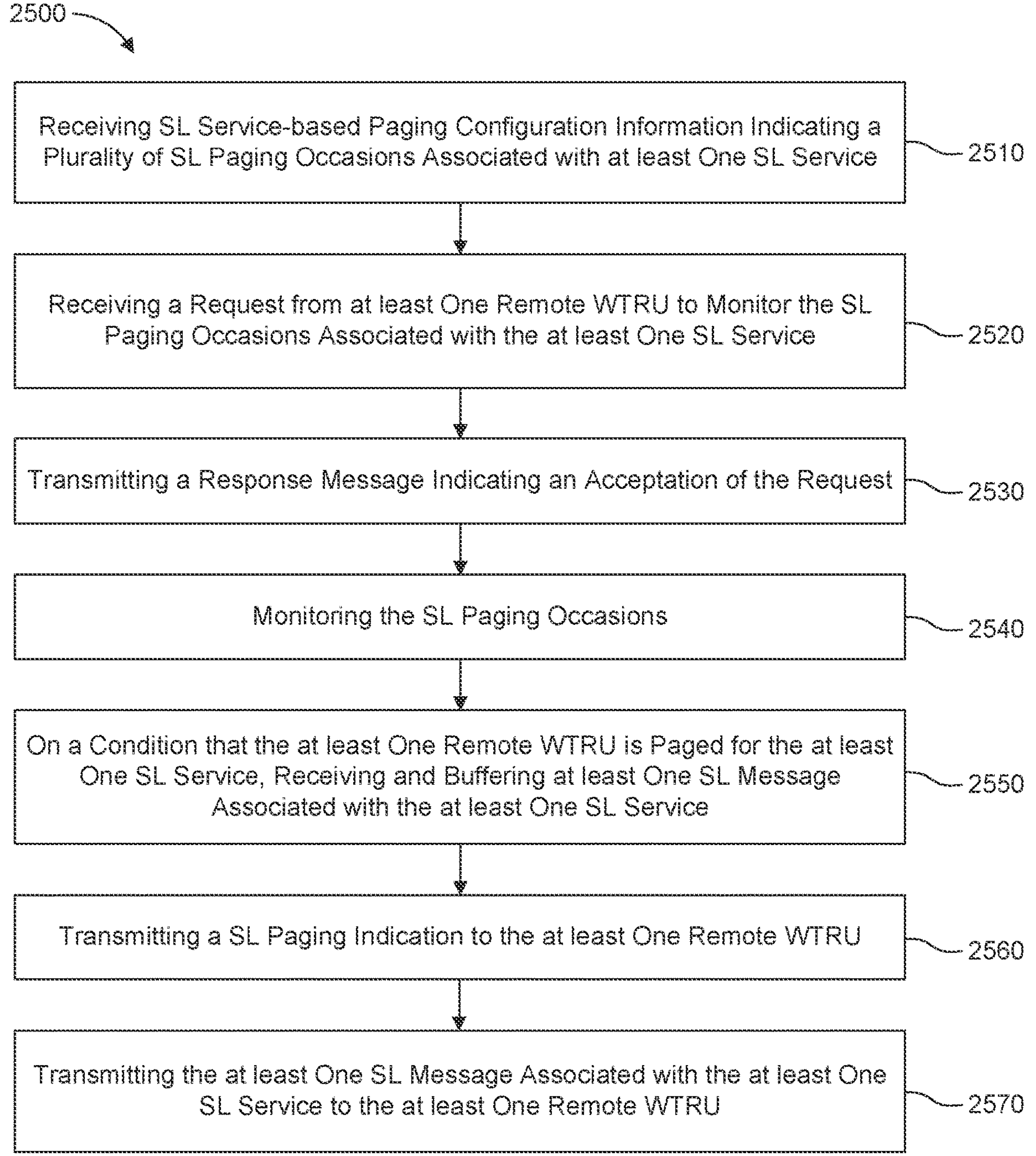
FIG. 25 is a diagram illustrating an example of a SL service-based paging method for use in a SL relay WTRU.

FIG. 25 is a diagram illustrating an example of a SL service-based paging method 2500 for use in a SL relay WTRU. For example, in a step 2510, the SL relay WTRU may receive SL service-based paging configuration information indicating a plurality of SL paging occasions associated with at least one SL service. For example, in a step 2520, the SL relay WTRU may receive a request (e.g., message) from at least one remote WTRU. For example, the request (e.g., message) may comprise information requesting the SL relay WTRU to monitor the SL paging occasions associated with the at least one SL service (e.g., on behalf of the at least one remote WTRU). For example, in a step 2530, the SL relay WTRU may transmit a response message to the at least one remote WTRU, which may indicate an acceptance of the request. For example, in a step 2540, the SL relay WTRU may monitor (e.g., blindly decode) the SL paging occasions to determine whether the at least one remote WTRU is paged for the at least one SL service. For example, the SL relay WTRU may monitor the SL paging occasions for a transmission indicating that the at least one remote WTRU may be paged. For example, in a step 2550, on a condition that the at least one remote WTRU is paged for the at least one SL service, the SL relay WTRU may receive and (e.g., may store in a) buffer at least one SL message associated with the at least one SL service and that may be directed to the at least one remote WTRU. For example, in a step 2560, the SL relay WTRU may transmit a SL paging indication (e.g., message, transmission) to the at least one remote WTRU, the SL paging indication (e.g., message, transmission) may indicate availability of the buffered at least one SL message. For example, in a step 2570, the SL relay WTRU may transmit the at least one SL message associated with the at least one SL service to the at least one remote WTRU.

For example, the SL relay WTRU may forward the received SL service-based paging configuration information to the at least one remote WTRU.

For example, the request (e.g., message) may comprise an indication of a reason for requesting offloading the monitoring of the SL paging occasions.

For example, the reason for requesting offloading the monitoring of the SL paging occasions may be for any of power saving and coverage extension.

For example, the SL paging indication (e.g., message, transmission) may be transmitted in a (e.g., preliminarily determined) SL paging occasion.

For example, the (e.g., preliminarily determined) SL paging occasion may be determined based on configuration information preliminarily received from the at least one remote WTRU.

For example, the SL paging indication may be transmitted in a discovery message.

For example, the SL relay WTRU may transmit a SL paging offload (e.g., indication) message to the at least one remote WTRU, the SL paging offload (e.g., indication) message may include information indicating offloading the monitoring of the SL paging occasions back to the at least one remote WTRU.

For example, the monitoring of the SL paging occasions may be offloaded back to the at least one remote WTRU based on any of a power consumption, a monitoring capacity, and a buffering capacity of the SL relay WTRU.

For example, the at least one remote WTRU may comprise a first remote WTRU and a second remote WTRU, the first remote WTRU may have indicated a power saving reason for requesting offloading the monitoring of the SL paging occasions, and the second remote WTRU may have indicated a coverage extension reason for requesting offloading the monitoring of the SL paging occasions.

For example, the monitoring of the SL paging occasions may be offloaded back to the first remote WTRU for preserving service continuity for the second remote WTRU.

Figure 26:
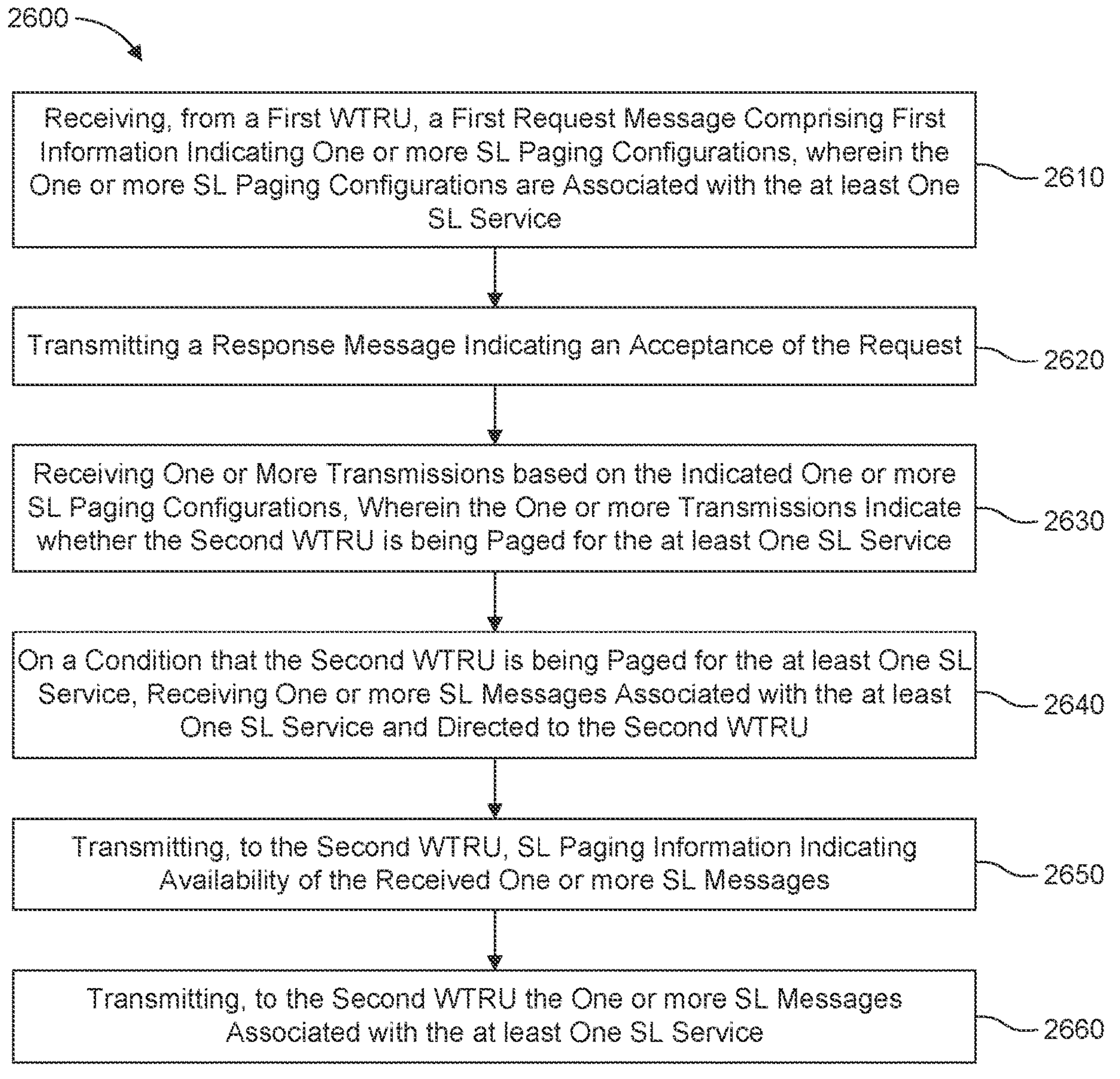
FIG. 26 is a diagram illustrating another example of a SL service-based paging method for use in a SL relay WTRU.

FIG. 26 is a diagram illustrating an example of a SL service-based paging method 2600 for use in a SL relay WTRU. For example, the method 2600 may be implemented in a (e.g., SL relay) WTRU, that may be referred to herein as first WTRU. For example, in a step 2610, the first WTRU may receive from a second (e.g., SL remote) WTRU, a first request message comprising first information indicating one or more SL paging configurations, wherein the one or more SL paging configurations may be associated with at least one SL service. For example, in a step 2620, the first WTRU may transmit a response message indicating an acceptance of the first request message. For example, in a step 2630, the first WTRU may receive one or more transmissions based on the indicated one or more SL paging configurations, wherein the one or more transmissions may indicate whether the second WTRU is being paged for the at least one SL service. For example, in a step 2640, on a condition that the second WTRU is being paged for the at least one SL service, the first WTRU may receive one or more SL messages associated with the at least one SL service and directed to the second WTRU. For example, in a step 2650, the first WTRU may transmit to the second WTRU, SL paging information indicating availability of the received one or more SL messages. For example, in a step 2660, the first WTRU may transmit to the second WTRU, the received one or more SL messages associated with the at least one SL service.

For example, the first WTRU may receive SL service-based paging configuration information indicating the one or more SL paging configurations associated with the at least one SL service.

For example, the first WTRU may transmit to the second WTRU, the SL service-based paging configuration information indicating the one or more SL paging configurations associated with the at least one SL service.

For example, the first information may indicate a first request for offloading first monitoring of a first set of SL paging occasions associated with the one or more SL paging configurations.

For example, the first information may indicate that the second WTRU may be any of out-of-coverage and requesting a coverage extension.

For example, the first information may indicate that the second WTRU may be any of (i) power limited and (ii) in a power saving mode.

For example, the first WTRU may receive from a third WTRU, a second request message comprising second information indicating a second request for offloading second monitoring of a second set of SL paging occasions.

For example, the second information may indicate that the third WTRU may be any of out-of-coverage and requesting a coverage extension.

For example, the first WTRU may transmit to the second WTRU, SL paging offload information indicating to offload the first monitoring of at least a first part of the first set of SL paging occasions back to the second WTRU.

For example, the SL paging offload information may indicate maintaining monitoring offloading of a second part of the first set of SL paging occasions that may (e.g., at least partially) overlap the second set of SL paging occasions.

For example, the first monitoring of the at least a first part of the first set of SL paging occasions may be offloaded back to the second WTRU based on any of a power consumption, a monitoring capacity, and a buffering capacity of the first WTRU.

For example, the first monitoring of the at least a first part of the first set of SL paging occasions may be offloaded back to the second WTRU for preserving service continuity for the third WTRU.

For example, the SL paging information may be transmitted in a SL paging occasion, that may be determined based on configuration information that may be preliminary received from the second WTRU.

For example, the SL paging information may be transmitted in a discovery message.

For example, the one or more transmissions may indicate that the second WTRU may be paged more than one time for the at least one SL service.

For example, more than one SL message associated with the at least one SL service and directed to the second WTRU may be received.

For example, the SL paging information may aggregate in a single piece of information an indication that the second WTRU may have been paged more than one time.

For example, the first WTRU may transmit to the second WTRU, the more than one SL message associated with the at least one SL service.

Figure 27:
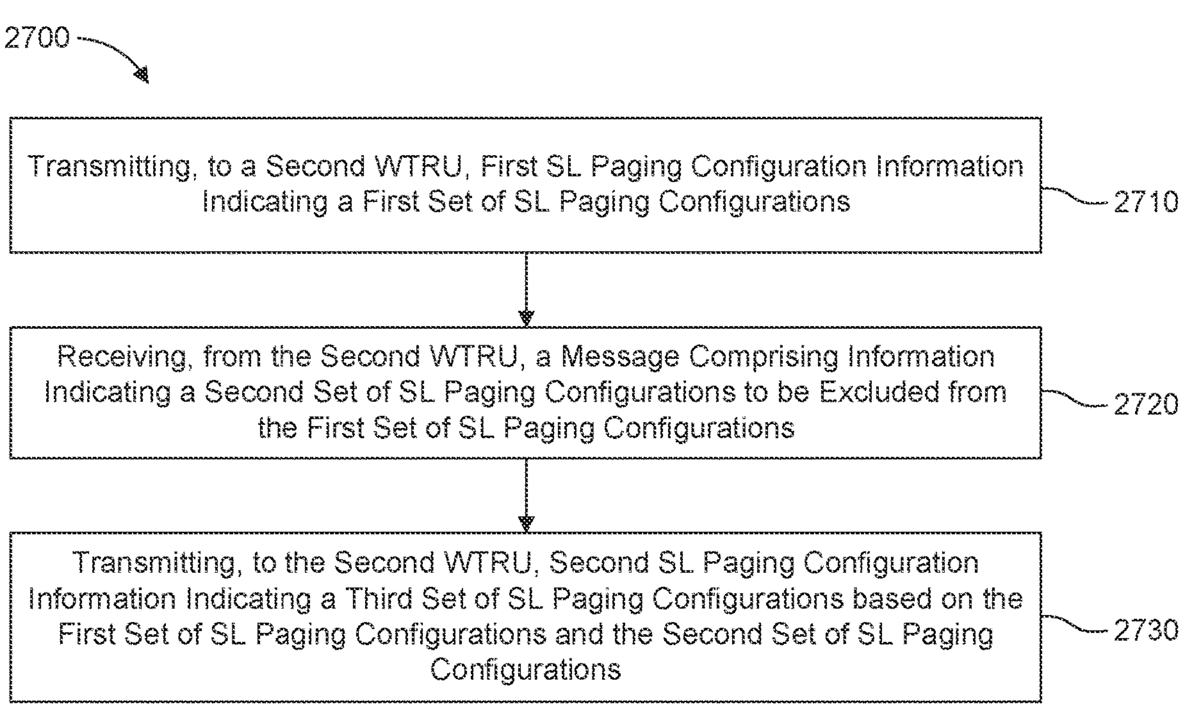
FIG. 27 is a diagram illustrating an example of an inter WTRU coordination method for SL paging to be used in a service provider SL WTRU.

FIG. 27 is a diagram illustrating an example of an inter WTRU coordination method 2700 for SL paging to be used in a service provider SL WTRU. For example, the method 2700 may be implemented in a first WTRU. For example, in a step 2710, the first WTRU may transmit to a second WTRU first SL paging configuration information indicating a first set of SL paging configurations. For example, in a step 2720, the first WTRU may receive from the second WTRU a message comprising information indicating a second set of SL paging configurations to be excluded from the first set of SL paging configurations. For example, in a step 2730, the first WTRU may transmit to the second WTRU second SL paging configuration information indicating a third set of SL paging configurations based on the first set of SL paging configurations and on the second set of SL paging configurations.

For example, the third set of SL paging configurations may correspond to the first set of SL paging configurations from which at least a part of the first set of SL paging configurations may have been removed.

For example, the second set of SL paging configurations and the third set of SL paging configurations may be mutually exclusive sub-sets of the first set of SL paging configurations.

For example, the first set of SL paging configurations may be associated with any of a SL service and a WTRU group.

For example, the information may indicate the second set of SL paging configurations to be excluded from the first set of SL paging configurations by any of a starting symbol, a starting time, a periodicity and a duration.

For example, the duration may be indicated in any of units of time and a number of symbols.

For example, the second SL paging configuration information may be included in any of a direct communication response message and a paging configuration update message.

For example, the message may be any of a discovery message, a direct communication request message and a paging configuration request message.

For example, the first SL paging configuration information may indicate any of one or more SL paging resources of the first set of SL paging configurations, one or more SL paging modes, one or more SL paging scrambling codes, association information indicating that at least a part of the first set of SL paging configurations is associated with at least one SL service, one or more SL WTRU identifiers, one or more SL WTRU group identifiers, one or more SL service identifiers, one or more SL cast types, and at least one SL carrier identifier.

For example, the second SL paging configuration information may indicate any of one or more SL paging resources of the third set of paging configurations, one or more SL paging modes, one or more SL paging scrambling codes, association information indicating that at least a part of the SL paging configuration is associated with at least one SL service, one or more SL WTRU identifiers, one or more SL WTRU group identifiers, one or more SL service identifiers, one or more SL cast types, and at least one SL carrier identifier.

For example, the second SL paging configuration information may be obtained by updating the first SL paging configuration information based on the second set of SL paging configurations to be excluded from the first set of SL paging configurations such that an overlap between the third set of SL paging configurations and the second set of SL paging configurations to be excluded from the first set of SL paging configurations is reduced.

Figure 28:
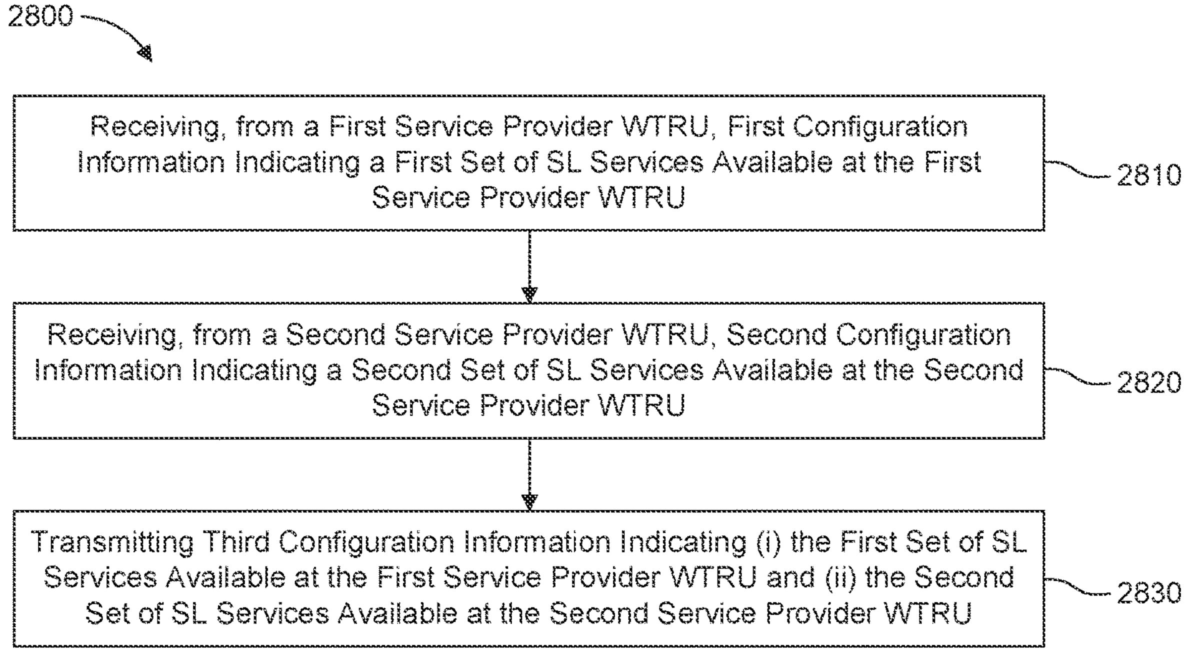
FIG. 28 is a diagram illustrating an example of a SL service aggregate discovery method.

FIG. 28 is a diagram illustrating an example of SL service aggregate discovery method 2800. For example, the method 2800 may be implemented in a (e.g., SL service provider) WTRU.

For example, in a step 2810, the (e.g., SL service provider) WTRU may receive from a first (e.g., SL service provider) WTRU, first configuration information indicating a first set of SL services available at the first (e.g., SL service provider) WTRU. For example, in a step 2820, the (e.g., SL service provider) WTRU may receive from a second (e.g., SL service provider WTRU), second configuration information indicating a second set of SL services available at the second (e.g., SL service provider) WTRU. For example, in a step 2830, the (e.g., SL service provider) WTRU may transmit third configuration information indicating (i) the first set of SL services available at the first (e.g., SL service provider) WTRU and (ii) the second set of SL services available at the second (e.g., SL service provider) WTRU.

For example, any of the first configuration information, the second configuration information and the third configuration information may be included in a discovery message.

For example, the first configuration information may further indicate any of one or more first SL paging configurations, one or more first paging groups, one or more first reference signals, and one or more first paging scrambling codes, associated with the first set of SL services.

For example, the second configuration information may further indicate any of one or more second SL paging configurations, one or more second paging groups, one or more second reference signals, and one or more second paging scrambling codes, associated with the second set of SL services.

For example, the third configuration information may further indicate a third set of SL services available at the (e.g., SL service provider) WTRU For example, the third configuration information may further indicate any of one or more third SL paging configurations, one or more third paging groups, one or more third reference signals, and one or more third paging scrambling codes, associated with the third set of SL services.

For example, the third configuration information may further indicate any of the one or more first SL paging configurations, the one or more first paging groups, the one or more first reference signals, and the one or more first paging scrambling codes, associated with the first set of SL services available at the first (e.g., SL service provider) WTRU For example, the third configuration information may further indicate any of the one or more second SL paging configurations, the one or more second paging groups, the one or more second reference signals, and the one or more second paging scrambling codes, associated with the second set of SL services available at the second (e.g., SL service provider) WTRU For example, the (e.g., SL service provider) WTRU may be a master SL service provider WTRU selected from one or more SL service provider WTRUs in a coverage area For example, the third configuration information may be transmitted on a condition that a first signal strength of a first signal received from the first (e.g., service provider) WTRU and a second signal strength of a second signal received from the second (e.g., SL service provider) WTRU satisfy a strength condition.

For example, the strength condition may be satisfied in a case where the first signal strength and the second signal strength are above a threshold.

Throughout embodiments described herein, (e.g., configuration) information may be described as received by a WTRU from the network, for example, through system information or via any kind of protocol message. Although not explicitly mentioned throughout embodiments described herein, the same (e.g., configuration) information may be pre-configured in the WTRU (e.g., via any kind of pre-configuration methods such as e.g., via factory settings), such that this (e.g., configuration) information may be used by the WTRU without being received from the network.

For the sake of clarity, satisfying, failing to satisfy a (e.g., strength) condition and "configuring (e.g., strength) condition parameter(s) are described throughout embodiments described herein as relative to a threshold (e.g., greater or lower than) a (e.g., threshold) value, configuring the (e.g., threshold) value, etc. . . . ). For example, satisfying a (e.g., strength) condition may be described as being above a (e.g., threshold) value, and failing to satisfy a (e.g., strength) condition may be described as being below a (e.g., threshold) value. Embodiments described herein are not limited to threshold-based strength conditions. Any kind of other (e.g., strength) condition and parameter(s) (such as e.g., belonging or not belonging to a range of values) may be applicable to embodiments described herein.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation.

Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented in a first wireless transmit/receive unit (WTRU), the method comprising:

receiving, from a second WTRU, first information indicating one or more service-specific side link paging configurations of a plurality of service-specific side link paging configurations, wherein each service-specific side link paging configuration is associated with a respective one of a plurality of side link services, and wherein the service-specific side link paging configurations associated with different side link services have at least one of different paging resources, different paging periodicities or different lengths of paging occasions;

receiving one or more transmissions based on the indicated one or more service-specific side link paging configurations, wherein the one or more transmissions indicate whether the second WTRU is being paged for at least one side link service of the plurality of side link services;

on a condition that the second WTRU is being paged, receiving one or more side link messages associated with the at least one side link service and directed to the second WTRU;

transmitting, to the second WTRU, side link paging information indicating an availability of the received one or more side link messages; and transmitting, to the second WTRU, the received one or more side link messages.

2. The method of claim 1, comprising:

receiving, from a side link service provider network element, side link service-based paging configuration information indicating the plurality of service-specific side link paging configurations.

3. The method of claim 2, comprising:

transmitting, to the second WTRU, the side link service-based paging configuration information indicating the plurality of service-specific side link paging configurations.

4. The method of claim 1, wherein the first information indicates a first request for offloading first monitoring of a first set of side link paging occasions associated with the one or more side link paging configurations.

5. The method of claim 4, comprising:

receiving, from a third WTRU, a second request message comprising second information indicating a second request for offloading second monitoring of a second set of side link paging occasions.

6. The method of claim 5, wherein the second information indicates that the third WTRU is any of (1) out-of-coverage, (2) requesting a coverage extension, (3) power limited and (4) in a power saving mode.

7. The method of claim 5, comprising:

transmitting, to the second WTRU, side link paging offload information indicating to offload the first monitoring of at least a first part of the first set of side link paging occasions back to the second WTRU based on (1) the first information indicating that the second WTRU is any of (i) power limited and (ii) in a power saving mode, and (2) the second information indicating that the third WTRU is any of (i) out-of-coverage and (ii) requesting a coverage extension, for preserving service continuity for the third WTRU.

8. The method of claim 7, wherein the side link paging offload information indicates maintaining monitoring offloading of a second part of the first set of side link paging occasions overlapping the second set of side link paging occasions.

9. The method of claim 1, wherein the first information indicates that the second WTRU is any of (1) out-of-coverage, (2) requesting a coverage extension, (3) power limited and (4) in a power saving mode.

10. The method of claim 1, comprising:

receiving configuration information from the second WTRU; and determining a side link paging occasion based on the configuration information, wherein the side link paging information is transmitted in the side link paging occasion.

11. The method of claim 1, wherein the side link paging information is transmitted in a discovery message.

12. The method of claim 1, wherein the one or more transmissions indicate that the second WTRU is being paged more than one time for the at least one side link service.

13. The method of claim 12, wherein more than one side link message associated with the at least one side link service and directed to the second WTRU are received.

14. The method of claim 13, comprising aggregating, in a single piece of information, an indication that the second WTRU has been paged more than one time.

15. A first wireless transmit/receive unit (WTRU) comprising circuitry, including any of a transmitter, a receiver, a processor, and a memory, wherein the circuitry is configured to:

receive, from a second WTRU, first information indicating one or more service-specific side link paging configurations of a plurality of service-specific side link paging configurations, wherein each service-specific side link paging configuration associated with a respective one of a plurality of side link services, and wherein the service-specific side link paging configurations associated with different side link services have at least one of different paging resources, different paging periodicities or different lengths of paging occasions;

receive one or more transmissions based on the indicated one or more service-specific side link paging configurations, wherein the one or more transmissions indicate whether the second WTRU is being paged for at least one side link service of the plurality of side link services;

on a condition that the second WTRU is being paged, receive one or more side link messages associated with the at least one side link service and directed to the second WTRU;

transmit, to the second WTRU, side link paging information indicating an availability of the received one or more side link messages; and transmit, to the second WTRU, the received one or more side link messages.

16. The first WTRU of claim 15, wherein the first information indicates that the second WTRU is any of (1) out-of-coverage, (2) requesting a coverage extension, (3) power limited and (4) in a power saving mode.

17. The first WTRU of claim 15, wherein the first information indicates a first request for offloading first monitoring of a first set of side link paging occasions associated with the one or more side link paging configurations.

18. The first WTRU of claim 17, configured to receive, from a third WTRU, a second request message comprising second information indicating a second request for offloading second monitoring of a second set of side link paging occasions.

19. The first WTRU of claim 18, wherein the second information indicates that the third WTRU is any of (1) out-of-coverage, (2) requesting a coverage extension, (3) power limited and (4) in a power saving mode.

20. The first WTRU of claim 18, configured to transmit, to the second WTRU, side link paging offload information indicating to offload the first monitoring of at least a first part of the first set of side link paging occasions back to the second WTRU based on (1) the first information indicating that the second WTRU is any of (i) power limited and (ii) in a power saving mode, and (2) the second information indicating that the third WTRU is any of (i) out-of-coverage and (ii) requesting a coverage extension, for preserving service continuity for the third WTRU.

* * * * *